US010279469B2

(12) United States Patent
Han

(10) Patent No.: US 10,279,469 B2
(45) Date of Patent: May 7, 2019

(54) MULTI-MOTION-PLATFORM PARALLEL ROBOT CONSTRUCTION METHOD AND PARALLEL ROBOTS FOR SAME

(71) Applicant: Fangyuan Han, Changchun (CN)

(72) Inventor: Fangyuan Han, Changchun (CN)

(73) Assignees: Fangyuan Han, Changchun (CN); BEIJING FINE WAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/576,657

(22) PCT Filed: May 20, 2016

(86) PCT No.: PCT/CN2016/082745
§ 371 (c)(1),
(2) Date: Nov. 22, 2017

(87) PCT Pub. No.: WO2016/188368
PCT Pub. Date: Dec. 1, 2016

(65) Prior Publication Data
US 2018/0126545 A1 May 10, 2018

(30) Foreign Application Priority Data
May 26, 2015 (CN) .......................... 2015 1 0275161

(51) Int. Cl.
*B25J 9/00* (2006.01)
*B23Q 1/54* (2006.01)
*B23Q 5/28* (2006.01)

(52) U.S. Cl.
CPC ............ *B25J 9/003* (2013.01); *B23Q 1/5456* (2013.01); *B23Q 1/5462* (2013.01); *B23Q 5/28* (2013.01); *B25J 9/00* (2013.01)

(58) Field of Classification Search
CPC ...... B23Q 1/5456; B23Q 1/5462; B23Q 5/28; B25J 9/00; B25J 9/003
See application file for complete search history.

(56) References Cited

U.S. PATENT DOCUMENTS

2004/0103739 A1* 6/2004 Brogardh ............. B23Q 1/5462
74/490.01
2007/0255453 A1* 11/2007 Brogardh ............. B23Q 1/5462
700/245

FOREIGN PATENT DOCUMENTS

CN 101973027 A 2/2011
CN 103522283 A 1/2014
(Continued)

OTHER PUBLICATIONS

International Search Report and Written Opinion dated Aug. 25, 2016 in related PCT Application No. PCT/CN2016/082745 (12 pages).

*Primary Examiner* — Muhammad S Islam
(74) *Attorney, Agent, or Firm* — Maschoff Brennan

(57) ABSTRACT

The present application provides a multi-motion-platform parallel robot and a method of constructing the same. The parallel robot comprises a symmetrical basic parallel mechanism and one or more symmetrical branch parallel mechanisms. The basic parallel mechanism comprises a symmetrical basic foundation platform, a symmetrical basic motion platform, and symmetrical main branched-chains. The branch parallel mechanism comprises a symmetrical branch foundation platform, a symmetrical branch motion platform, and symmetrical branch branched-chains. The basic parallel mechanism and the branch parallel mechanism are connected by means of a multiple-output motion pair having symmetrical output ends, and share one set of driving pairs and drive and control devices. The multi-motion-platform parallel robot and it's method of construction can be used for (Continued)

various industrial robots, three-dimensional profile modeling and scaling robots and walking robots, and have the advantages of having a simple structure, being easy to standardize, having a high production efficiency, and the like.

17 Claims, 20 Drawing Sheets

(56) References Cited

FOREIGN PATENT DOCUMENTS

| | | |
|---|---|---|
| CN | 104972453 A | 10/2015 |
| EP | 2740567 A2 | 6/2014 |

\* cited by examiner

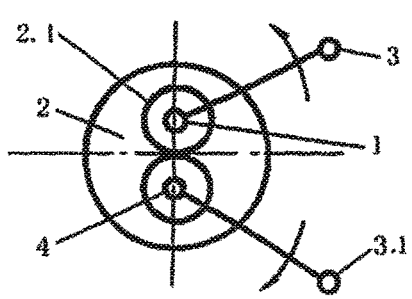
Figure1
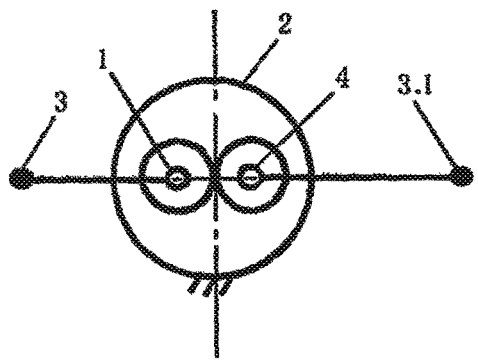
Figure2
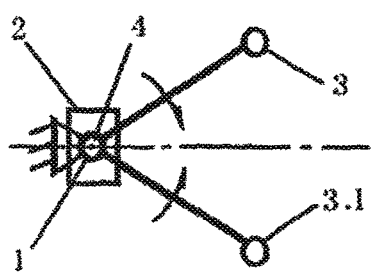
Figure3.1
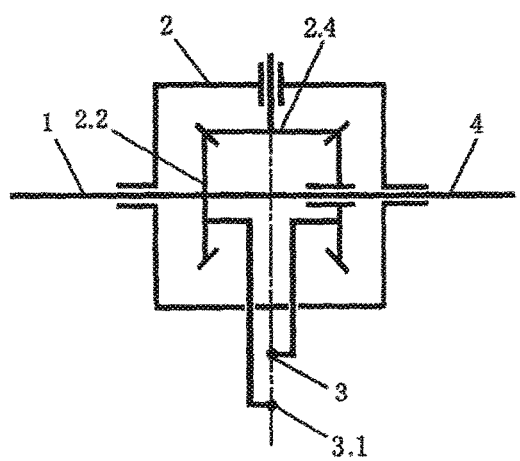
Figure3.2
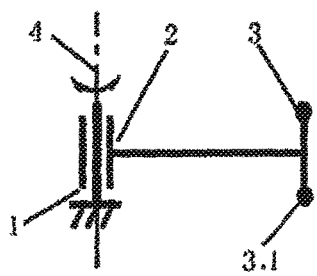
Figure4
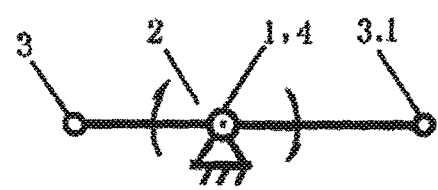
Figure5

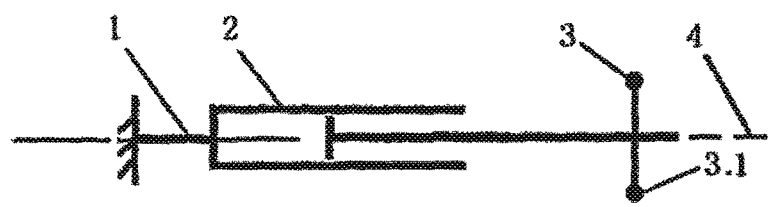
Figure6
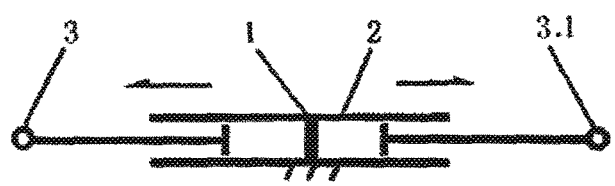
Figure7
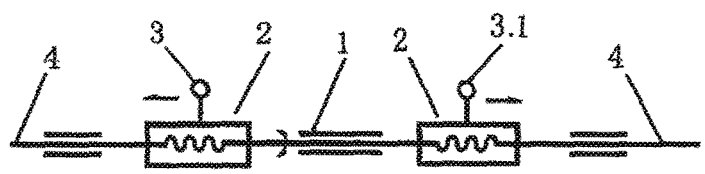
Figure8
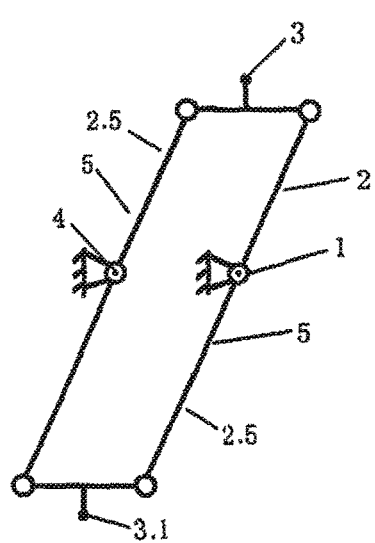
Figure9.1
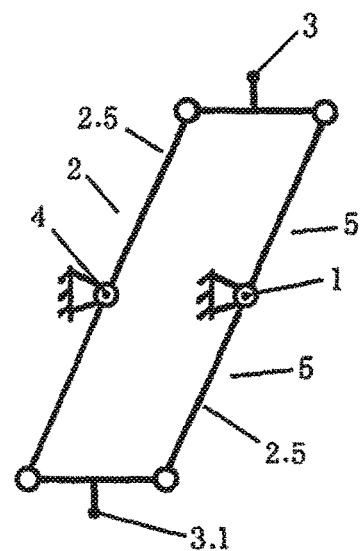
Figure9.2

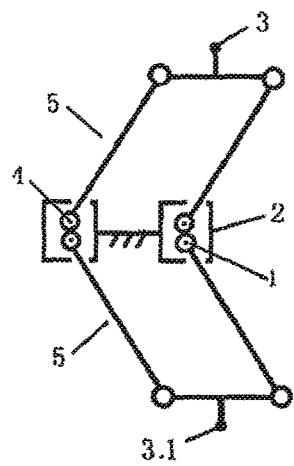
Figure10
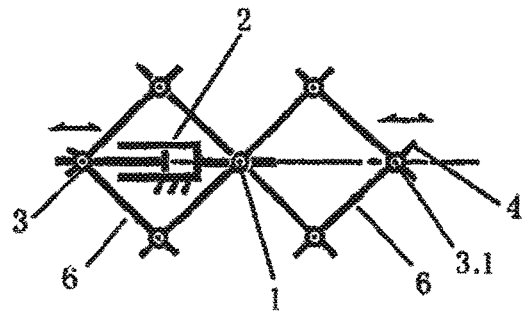
Figure11.1
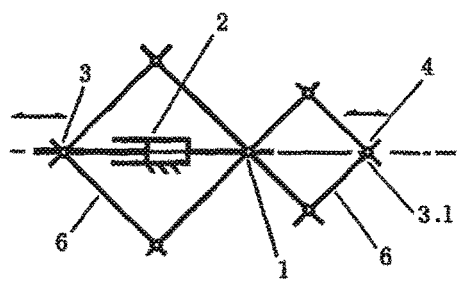
Figure11.2
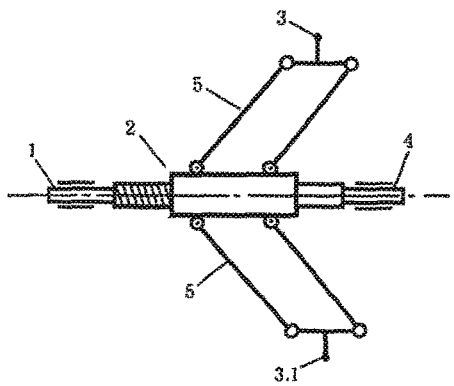
Figure12.1
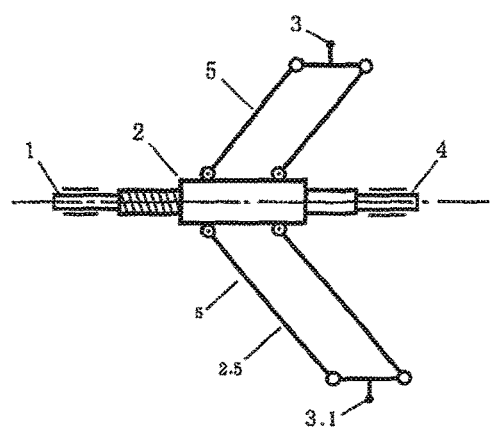
Figure12.2
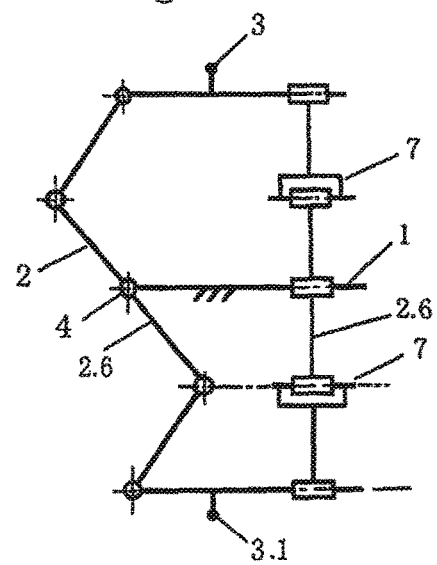
Figure13

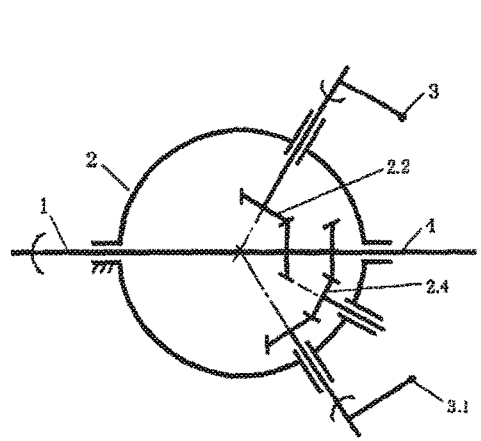
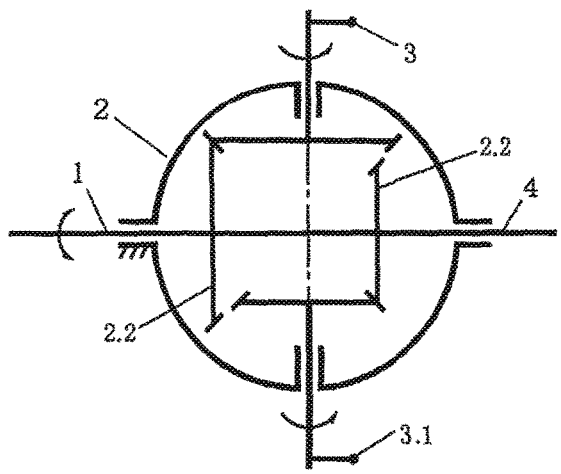
Figure 14    Figure 15
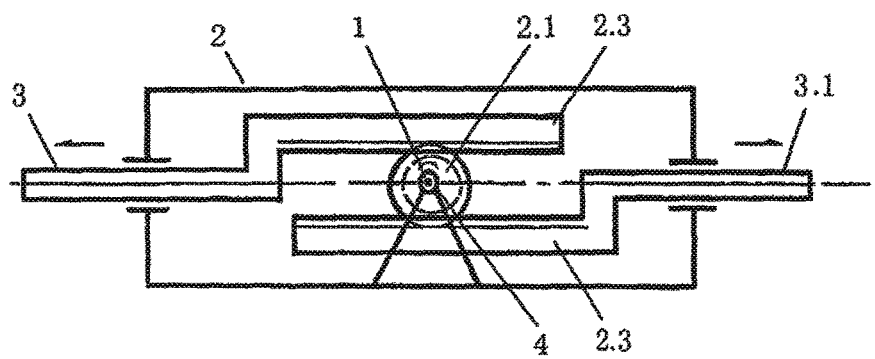
Figure 16
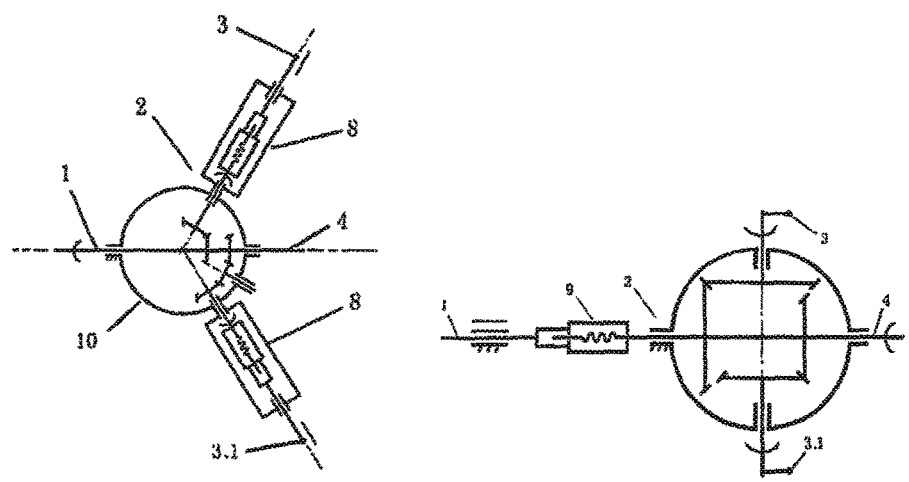
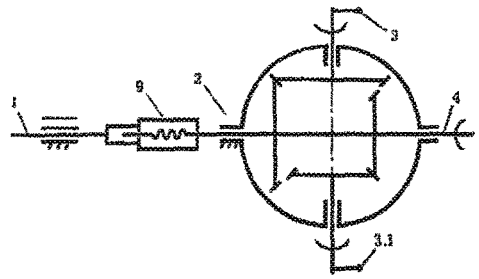
Figure 17    Figure 18

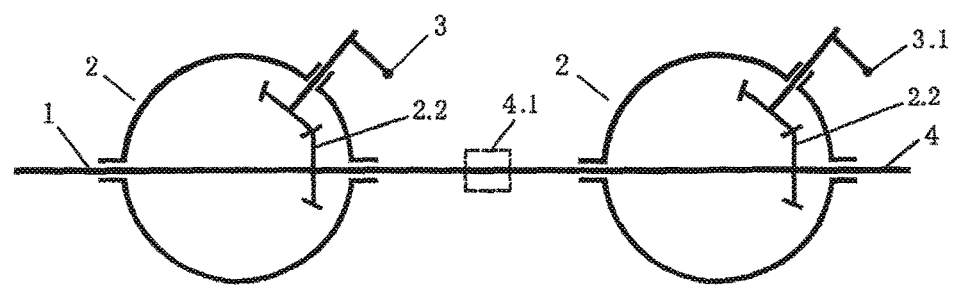
Figure 24
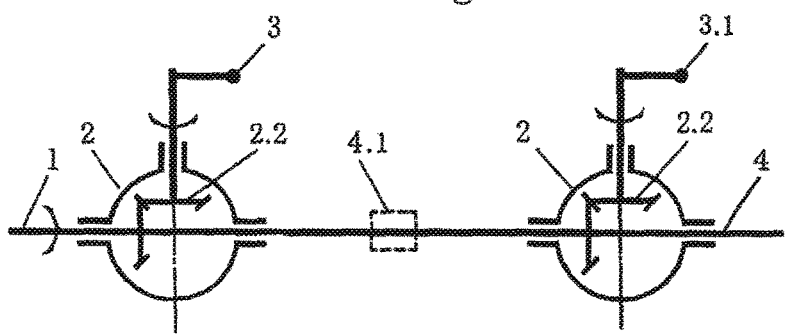
Figure 25
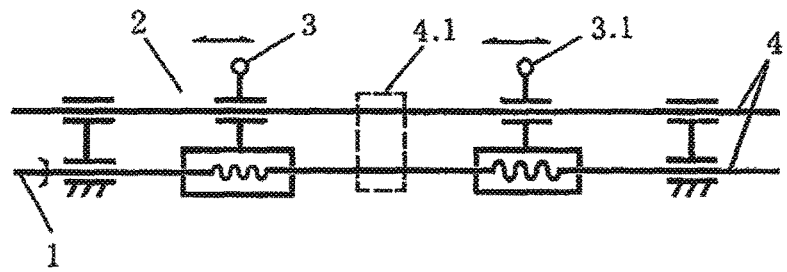
Figure 26
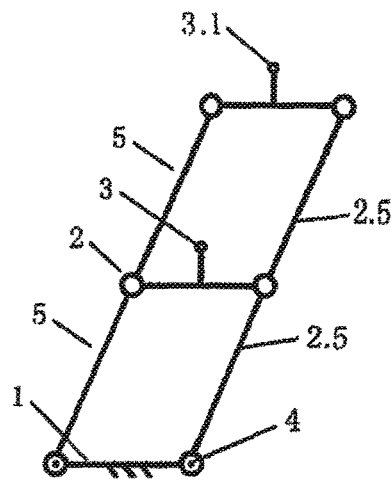
Figure 27
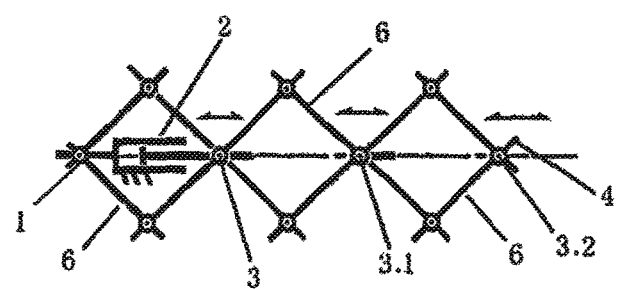
Figure 28.1

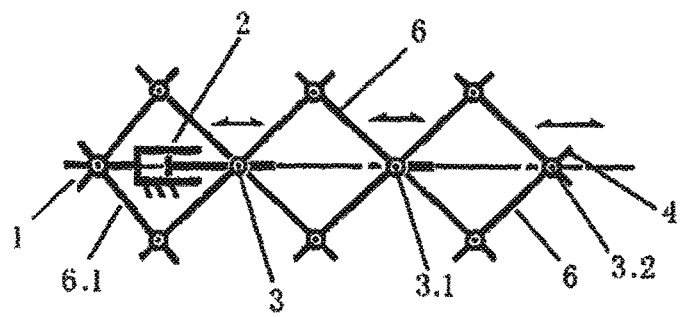
Figure28.2
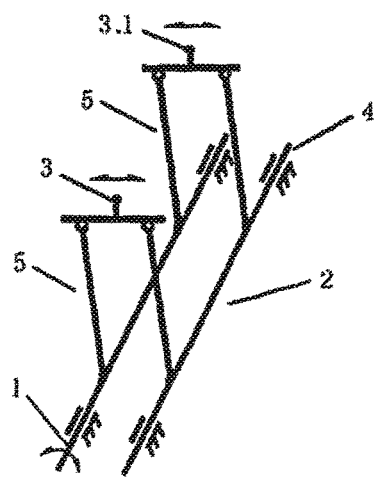
Figure29
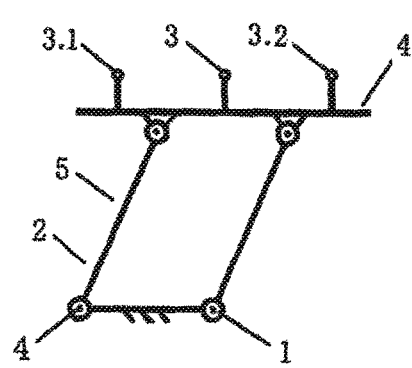
Figure30
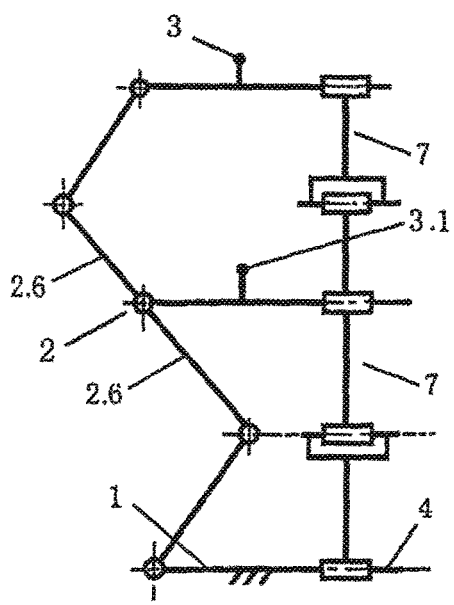
Figure31
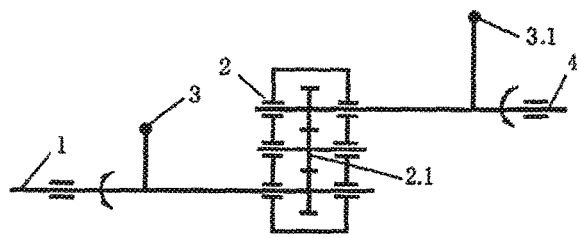
Figure32

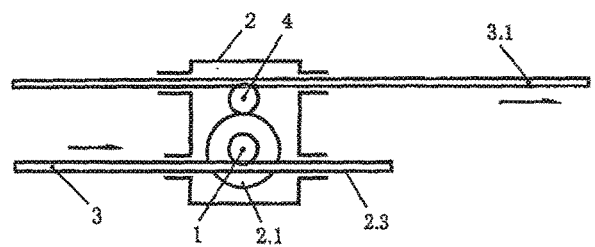
Figure33
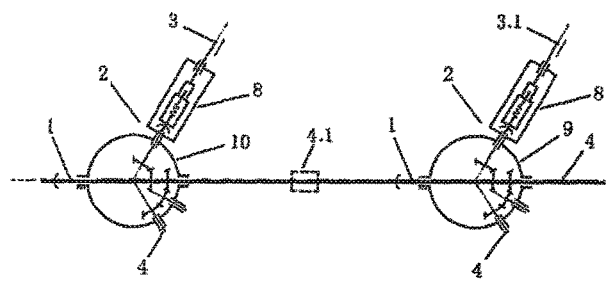
Figure34.1
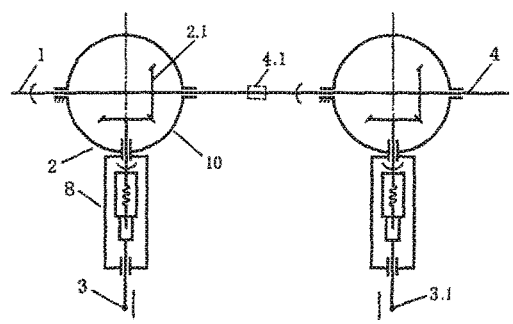
Figure34.2
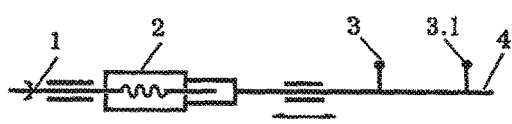
Figure35
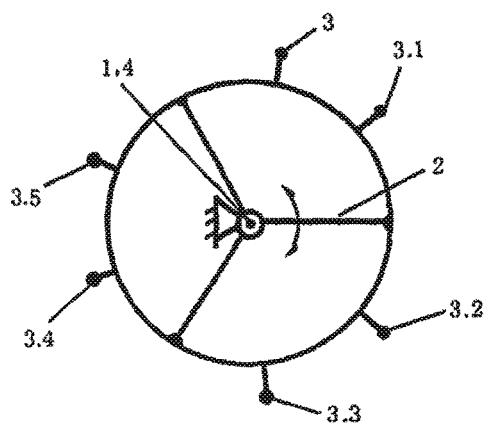
Figure36
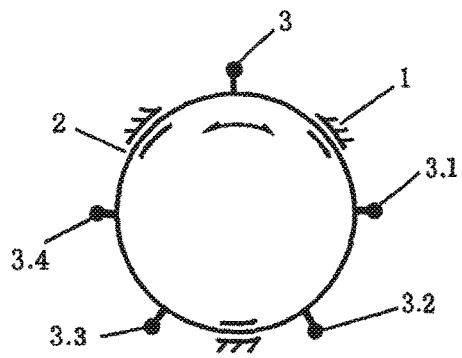
Figure37

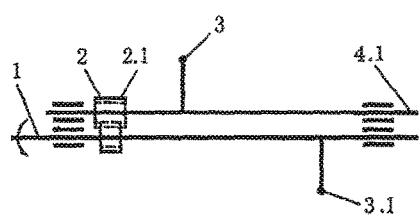
Figure45
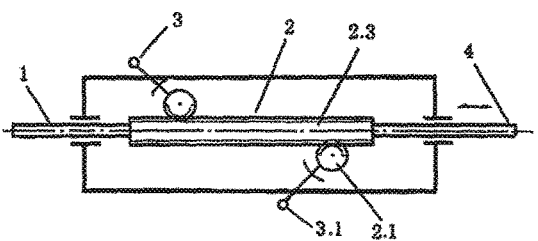
Figure46
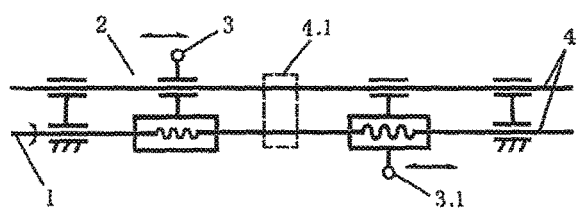
Figure47
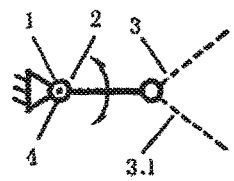
Figure48
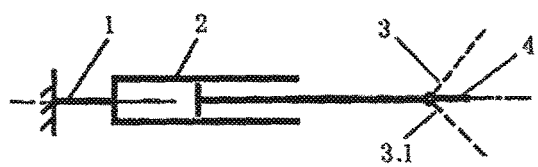
Figure49
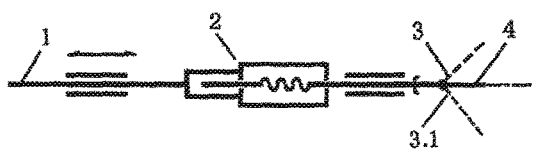
Figure50
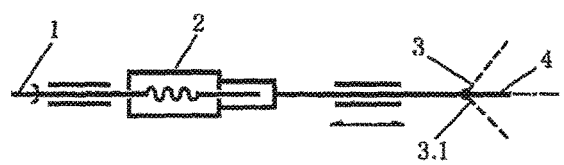
Figure51
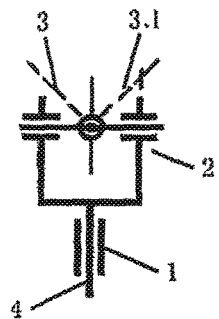
Figure52.1
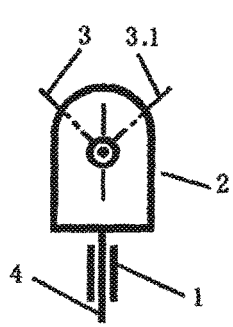
Figure52.2
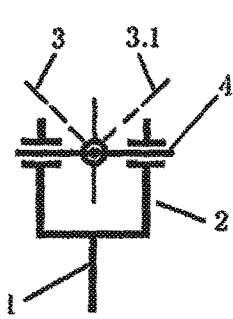
Figure52.3

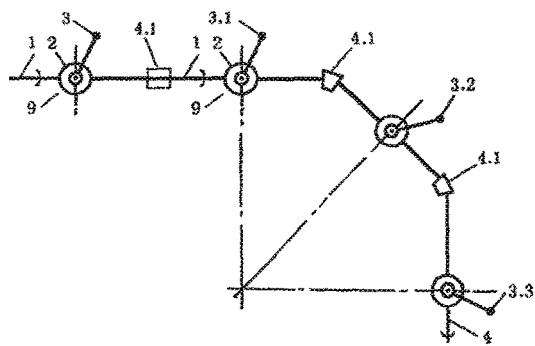
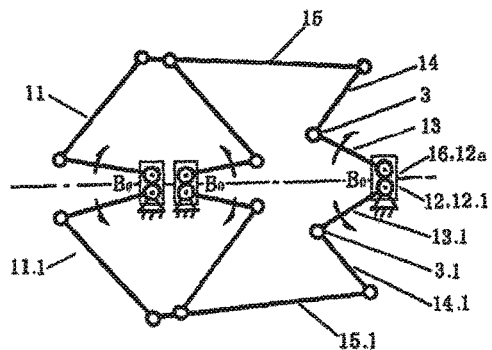
Figure 57　　　　　Figure 58
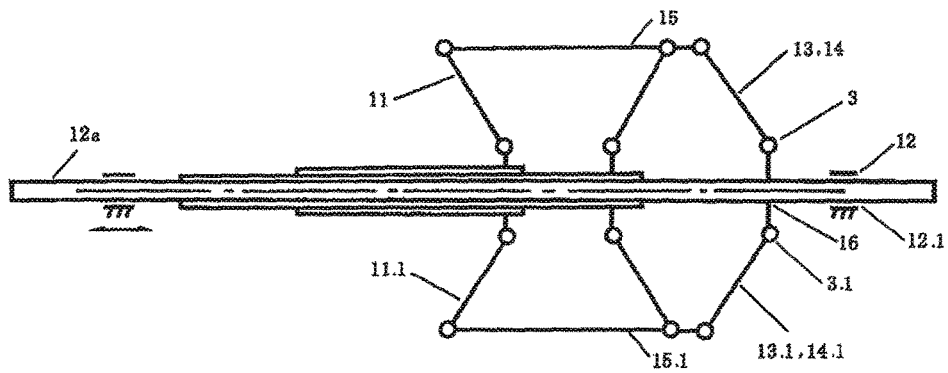
Figure 59
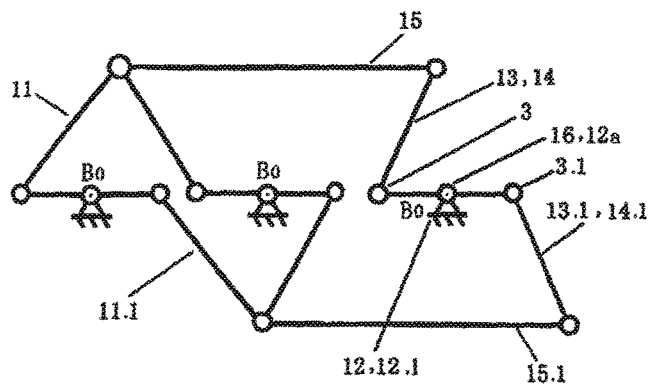
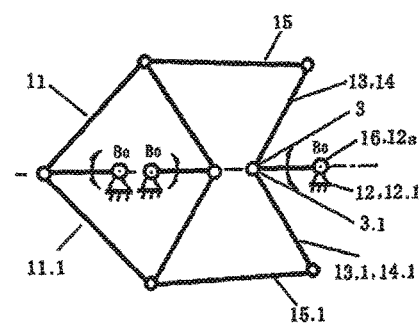
Figure 60　　　　　Figure 61

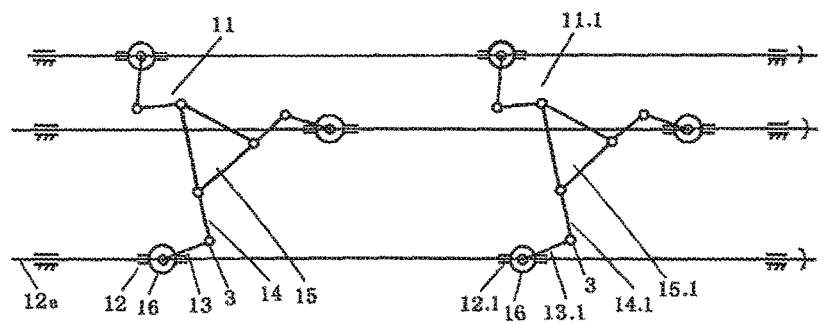
Figure 72
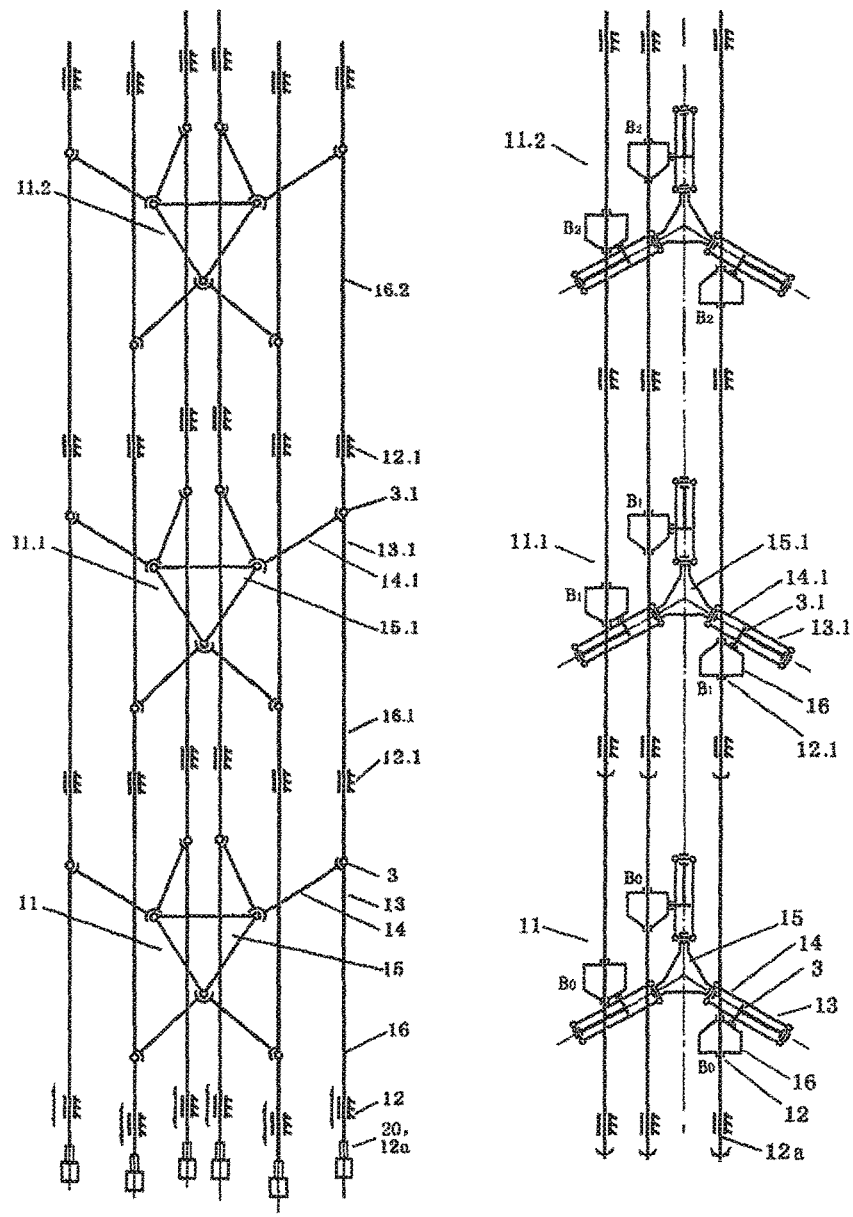
Figure 73
Figure 74

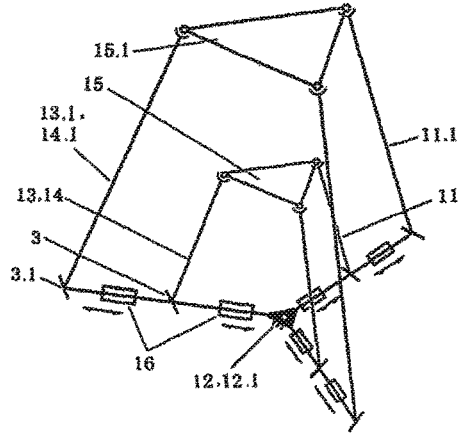
Figure84
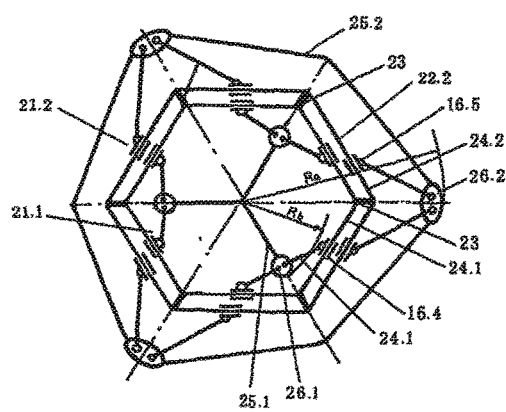
Figure85.1
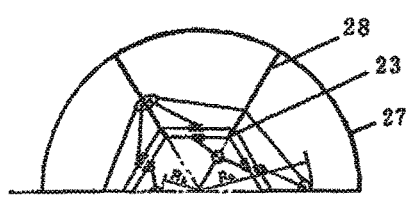
Figure85.2
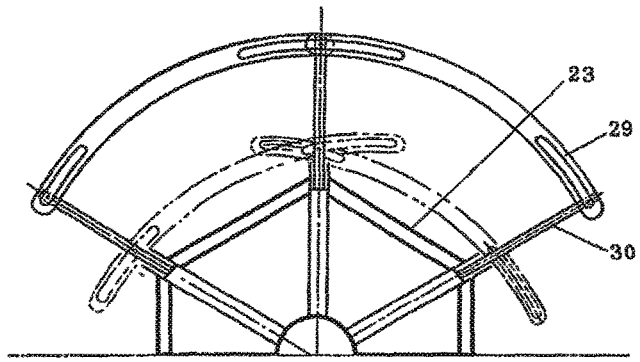
Figure86
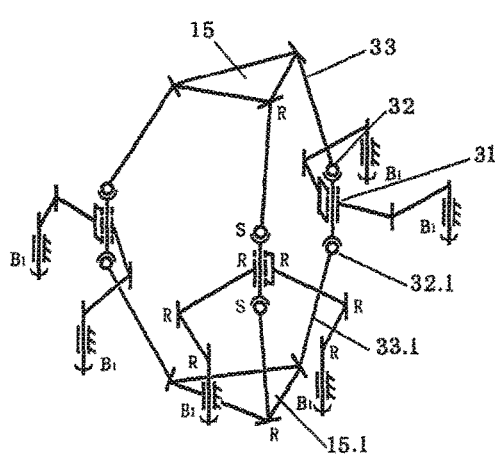
Figure87
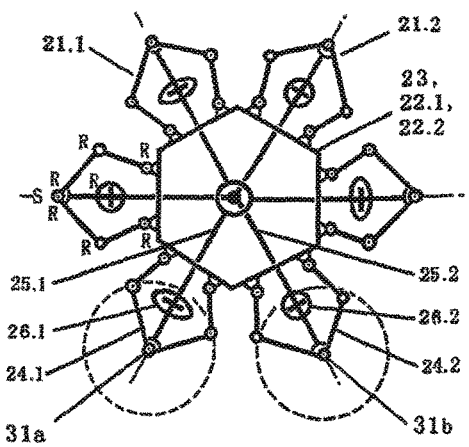
Figure88

MULTI-MOTION-PLATFORM PARALLEL ROBOT CONSTRUCTION METHOD AND PARALLEL ROBOTS FOR SAME

TECHNICAL FIELD

The present application discloses a multiple-movable-platform parallel robot construction method and a parallel robot, and in particular relates to improvements to parallel robot construction methods, belonging to the technical field of robotic mechanisms.

BACKGROUND ART

The structure of current parallel robots comprises a base platform, a movable platform (also called as moving platform, as in the context hereafter), and branch chains connected between the base platform and the movable platform.

Most existing parallel robots each have only one base platform, one movable platform and a group of branch chains connected between the base platform and the movable platform. Such example includes handling (assembling) parallel robots and parallel machine tool robots. Both types of robots have the following defects: for handling (or assembling) parallel robots, one robot can only assemble components for one machine or equipment; and for parallel machine tool robots, one parallel machine tool robot can machine only one component at a time, but cannot conduct the same or substantially the same operation to two or more objects at the same time.

Some existing parallel robots also include parallel robots having two movable platforms. For example, patent reference CN 201320207661 discloses a parallel robot comprising two movable platforms and two groups of branch chains, as well as two sets of corresponding driving and controlling systems which are independent from each other. Defects of this robot are that one object is manipulated by actuators on the two movable platforms and that it has a relatively complex structure. This robot cannot conduct the same or substantially the same operation to two or more objects at the same time.

There are also some walking parallel robots each comprising two parallel mechanisms and two movable platforms. Embodiments of them include walking parallel robots disclosed in patent reference CN 201010292424.1 and patent reference CN 03826959.7. Such a robot has two movable platforms and two groups of branch chains, the structure of it comprises two parallel mechanisms which are independent from each other. Correspondingly, it comprises two sets of driving and controlling systems which are independent from each other. Walking action is achieved by means of the cooperation of two movable platforms (foot arches) which are independent from each other. A defect of such a robot is that the two movable platforms (foot arches) are equipped with two sets of driving and controlling systems which are independent from each other. The robot cannot be operated by only one set of driving and controlling system. The two independent parallel mechanisms can only walk or operate on one plane, but cannot walk on an opposite plane. In other words, if the robot is turned over by 180 degrees, it cannot walk. That is, the robot cannot conduct the same or substantially the same operation in two orientations.

Thus, a common defect in current parallel robots exists in that they do not comprise two or more movable platforms defined below: the movable platforms are associated with each other and possess certain symmetricity, and they can fulfill the same or substantially the same operation or task by means of only one set of driving and controlling system.

Embodiments in the present application overcome the above defect by providing a multiple-movable-platform parallel robot which comprises two or more movable platforms, the movable platforms possessing a certain symmetricity therebetween and being able to conduct the same or substantially the same operation by means of only one set of driving system. In other words, the parallel robot comprises two or more movable platforms having the same or similar motion pattern. Meanwhile, the present application also provides embodiments of a double-sided walking parallel robot, which is also able to walk after it is turned over by 180 degrees, as well as a profiling or scaling type parallel robot.

SUMMARY

The present application discloses embodiments of a multiple-movable-platform parallel robot construction method, a parallel mechanism performing this method, and a parallel robot in which this is applied or this parallel mechanism is incorporated.

The technical solution according to a multiple-movable-platform parallel robot construction method disclosed by the present application is described below.

The parallel robot is composed of a fundamental parallel mechanism and N1 (N1≥1) branch parallel mechanism(s), each parallel mechanism having the same N2 (2≤N2≤6) degrees-of-freedom (DOFs) and the same DOF property.

The fundamental parallel mechanism (which is also called as generating element) comprises a fundamental base platform, a fundamental movable platform and N2 (2≤N2≤6) main chains connecting the fundamental base platform with the fundamental movable platform, each main chain being composed of two or more generalized kinematic pairs which are connected in series; the branch parallel mechanism comprises a branch base platform, a branch movable platform and N2 (2≤N2≤6) branch chains connecting the branch base platform with the branch movable platform.

The construction method comprising the steps of:

(1) Constructing the fundamental parallel mechanism

The fundamental parallel mechanism (11) further meets the following five requirements:

(a) The fundamental base platform is a planar base platform; (b) a first generalized kinematic pair in each main chain is an active pair; each main chain has only one active pair; an input end of the first kinematic pair of the main chain is a revolute pair or a sliding pair; (c) the input end axes of the first generalized kinematic pairs are arranged in one or two or three orientations of: being parallel to the plane of the base platform, lying in the base platform plane, or being perpendicular to the base platform plane; (d) in two or three preceding generalized kinematic pairs of the main chain, at least one generalized kinematic pair is an expandable output kinematic pair; (e) the fundamental movable platform is located at one side of the plane of the fundamental base platform or is co-planar with the fundamental base platform plane; in the main chain, a portion for connecting the expandable output kinematic pair with the fundamental movable platform is called as downstream main chain.

As to the fundamental base platform, the generalized kinematic pair and the expandable output kinematic pair, detailed description of them will be seen from the section of detailed description to the fundamental base platform, the generalized kinematic pair and the expandable output kinematic pair.

(2) Constructing the branch parallel mechanism: comprising the following three steps:

a) Selecting and constructing a symmetrical multiple (double)-output kinematic pair (will be unitarily called as multiple-output kinematic pair) and the branch base platform.

In each main chain of the fundamental parallel mechanism, selecting an expandable kinematic pair, the expandable kinematic pair being also called as boundary kinematic pair; to this expandable kinematic pair, adding an output end which is called as an auxiliary output end, the original output end being called as main output end; totally N1 auxiliary output ends being added, the auxiliary output ends having the same function and symmetrical structure with the main output end; the symmetricity includes equivalent symmetricity, translational symmetricity, rotational symmetricity, reflective symmetricity, slidingly reflective symmetricity, as well as scaled symmetricity.

The expandable kinematic pair becomes a multiple-output kinematic pair (comprising double-output kinematic pair) which has one more output end than the original generalized kinematic pair; in the branch chain, a portion for connecting the boundary generalized kinematic pair with the branch movable platform is called as downstream branch chain; the downstream branch chain is also called as auxiliary branch chain.

A lower end point of the branch chain is a hinge point between the branch chain and the branch base platform; the hinge points of the N2 branch chains form the branch base platform; the branch base platform has the same, similar or substantially the same shape with the fundamental base platform; the symmetricity includes equivalent symmetricity, translational symmetricity, rotational symmetricity, reflective symmetricity, slidingly reflective symmetricity, as well as scaled symmetricity.

As to the branch base platform, multiple (double)-output kinematic pair and symmetricity, detailed description of them will be seen from the section of detailed description to the branch base platform, the multiple-output kinematic pair and symmetricity.

b) Constructing the auxiliary branch chains:

To each newly added auxiliary output end, connecting an auxiliary branch chain or an auxiliary branch rod element (the auxiliary branch chain and the auxiliary branch rod element will both be called as auxiliary branch chain below); the downstream main chain in this auxiliary branch chain is the same or substantially the same with that of the main chain; all the auxiliary branch chains form a group of N2 auxiliary branch chains; the auxiliary branch chain is symmetrical with the downstream main chain; the symmetricity includes translational symmetricity, rotational symmetricity, reflective symmetricity, slidingly reflective symmetricity, as well as scaled symmetricity.

The branch chain is also divided into two portions; with boundary kinematic pair (expandable kinematic pair) as a separation, the portion between the boundary kinematic pair and the branch movable platform is called as downstream branch chain, and the remaining portion of the branch chain is called as upstream branch chain. The downstream branch chain is also called as auxiliary branch chain. The downstream branch chain and the upstream branch chain form the branch chain.

c) Connecting the branch movable platform:

To a tip end of each one of the group of the auxiliary branch chains, a branch movable platform is connected, the branch movable platform has the same, similar or substantially the same shape with the fundamental movable platform, and the branch movable platform is symmetrical with the fundamental movable platform; in this way, a branch parallel mechanism symmetrical with the fundamental parallel mechanism is formed; the symmetricity between the branch movable platform and the fundamental movable platform includes translational symmetricity, rotational symmetricity, reflective symmetricity, slidingly reflective symmetricity, as well as scaled symmetricity.

As to the branch movable platform, detailed description of it will be seen from the section of detailed description to the branch movable platform.

(3) Repeating substeps a), b) and c) of step (2); in this way, one more new symmetrical branch movable platform is obtained, and one more new symmetrical branch parallel mechanism is also obtained; repeating step (2) by N1-1 times; in this way, N1 new symmetrical branch movable platforms and N1 new symmetrical branch parallel mechanisms are obtained.

A multiple-movable-platform parallel robot in which the method of described above is effected, the parallel robot comprising a fundamental parallel mechanism (11) and N1 (N1≥1) branch parallel mechanisms, each parallel mechanism having the same N2 (2≤N2≤6) DOFs and the same DOF property (that is, having the same number of DOF and the same components of the DOF).

(1) The fundamental parallel mechanism has the following structure:

The fundamental parallel mechanism (also called as generating element), comprises a fundamental base platform, a fundamental movable platform and N2 (2≤N2≤6) main chains connecting the fundamental base platform with the fundamental movable platform, each main chain being composed of two or more generalized kinematic pairs which are connected in series;

The fundamental parallel mechanism meets the following five requirements:

(a) The fundamental base platform is a planar base platform; when necessary, the fundamental base platform is represented by B0;

Detailed description to the fundamental base platform will be seen from the section of detailed description to the fundamental base platform.

(b) A first generalized kinematic pair in each main chain is an active pair; each main chain has only one active pair; an input end of the first kinematic pair of the main chain is a revolute pair or a sliding pair.

(c) The input end axes of the first generalized kinematic pairs are arranged in one or two or three orientations of: being parallel to the plane of the base platform, lying in the base platform plane, or being perpendicular to the base platform plane.

(d) In two or three preceding generalized kinematic pairs of the main chain, at least one generalized kinematic pair is an expandable output kinematic pair; the expandable output kinematic pair has (N1+1)*N2 output ends, in which there are N2 main output ends, the main output ends are located on the main chain, and the remaining (N1*N2) output ends are called as auxiliary output ends; the main output end is symmetrical in structure with the auxiliary output end and has the same function, and the expandable kinematic pair is also called as boundary kinematic pair or symmetrical multiple-output kinematic pair; the main chain is divided into two portions by the boundary kinematic pair, in which a portion between the main output end of the boundary kinematic pair and the fundamental movable platform is called as downstream main chain; the main output end is symmetrical auxiliary output end; the symmetricity includes equivalent symmetricity, translational symmetricity, rotational symmetricity, reflective symmetricity, slidingly reflective symmetricity, as well as scaled symmetricity.

In the main chain, except the downstream main chain, the remaining portion is called as upstream main chain. Detailed description to the generalized kinematic pair, the expandable output kinematic pair and the multiple-output kinematic pair will be seen from the section of detailed description to the generalized kinematic pair, the expandable output kinematic pair and the multiple-output kinematic pair.

(e) N2 downstream main chains are connected to the fundamental movable platform, and the fundamental movable platform is located at one side of the plane of the fundamental base platform or is co-planar with the fundamental base platform plane.

Detailed description to the fundamental movable platform will be seen from the section of detailed description to the fundamental movable platform.

(2) The branch parallel mechanisms each have the following structure:

The branch parallel mechanism comprises a branch base platform, a branch movable platform and N2*N1 branch chains connecting the branch base platform with the branch movable platform; the branch parallel mechanism has the following characteristics in structure:

(a) In the expandable output kinematic pair of the main chain, each auxiliary output end is connected with an auxiliary branch chain; a portion between the auxiliary output end of the boundary kinematic pair and the branch movable platform is called as downstream branch chain; the downstream branch chain portion is also called as auxiliary branch chain; the auxiliary branch chain is the same or substantially the same with the downstream main chain of the main chain; their structures are symmetrical, and the symmetricity includes translational symmetricity, rotational symmetricity, reflective symmetricity, slidingly reflective symmetricity, as well as scaled symmetricity.

The branch chain is also divided into an upstream portion and a downstream portion, the remaining portion of downstream branch chain being called as upstream branch chain. The downstream branch chain and the upstream branch chain form the branch chain.

Detailed description to the branch chain will be seen from the section of detailed description to the branch chain.

(b) A lower end point of the branch chain is a hinge point between a branch chain and the branch base platform, called as branch lower-end hinge point; the branch lower-end hinge points of a group of N2 branch chains having the same symmetrical characteristics form a branch base platform; there are totally N1 branch base platforms; the branch base platform is symmetrical with the fundamental base platform, and the symmetricity includes equivalent symmetricity, translational symmetricity, rotational symmetricity, reflective symmetricity, slidingly reflective symmetricity, as well as scaled symmetricity. When necessary, the branch base platforms are represented by B1, B2, B3.

Detailed description to the branch base platform will be seen from the section of detailed description to the fundamental base platform.

(c) The auxiliary branch chains having the same symmetrical characteristics form a group of auxiliary branch chains, and each group of auxiliary branch chains include N2 auxiliary branch chains; there are totally N1 groups of branch chains.

(d) Each group of auxiliary branch chains are connected to a movable platform to form a parallel mechanism, the movable platform being called as branch movable platform (15.1), and the parallel mechanism being called as branch parallel mechanism; N1 groups of auxiliary branch chains are connected to N1 branch movable platforms; the branch movable platform is the same, similar or substantially the same with the fundamental movable platform; the branch movable platform is symmetrical with the fundamental movable platform; there are N1 branch movable platforms, and there are also N1 branch parallel mechanisms; the branch parallel mechanism is also symmetrical with the fundamental parallel mechanism; the symmetricity between the branch movable platform and the fundamental movable platform includes translational symmetricity, rotational symmetricity, reflective symmetricity, slidingly reflective symmetricity, as well as scaled symmetricity; the symmetricity between the branch parallel mechanism and the fundamental parallel mechanism also includes translational symmetricity, rotational symmetricity, reflective symmetricity, slidingly reflective symmetricity, as well as scaled symmetricity.

Detailed description to the branch moving platform and the symmetricity between it and the fundamental base platform will be seen from the section of detailed description to the fundamental base platform the symmetricity between it and the branch moving platform.

By means of the requirements (a), (b), (c) on the fundamental parallel mechanism and the requirement (a) on the branch parallel mechanism, it ensures that one driving system can drive all the parallel mechanisms.

By means of the requirements (d), (e) on the fundamental parallel mechanism and the requirements (b) (c), (d) on the branch parallel mechanism, it ensures the symmetricity between the fundamental parallel mechanism and the branch parallel mechanism.

As to the layout and preferred solutions of the input end axes of the first kinematic pair:

The input end axes of the first generalized kinematic pair have only two orientation manners: perpendicular to the base platform plane and parallel to base platform plane (comprising coinciding). For a 2-DOF multiple-movable-platform parallel robot or planar parallel mechanism which has only two main chains, the orientations of the input end axes of two active pairs form relatively simple combinations, that is, there are three combination patterns: two axes both perpendicular to the fundamental base platform plane; two axes both parallel to or coinciding with the fundamental base platform plane; one of the two axes parallel to or coinciding with the fundamental base platform plane, the other perpendicular to the fundamental base platform plane. However, if the parallel mechanism has relatively more DOFs, more main chains results in more active pairs, and the input end axes have a lot of combined orientation patterns. In general, some simple and useful patterns may be selected for real engineering practice. For example, a pattern in which the axes are starlike, a pattern in which the axes are tangent lines of the same circle (ellipse) or tangent lines of concentric circles in the same plane, a pattern in which the axes are parallel with each other, or a pattern in which all or some of the axes are coinciding. Some important preferred solutions will be described now:

Preferred solution 1 of active pair axes: starlike layout. In the case that not all the input end axes of the first generalized kinematic pair are parallel, a pattern in which the axes arranged to be starlike is preferred. In the starlike pattern, two or more input end axes of the active pair intersect at one point, or a generalized kinematic pair is disposed along each axis, or two generalized kinematic pairs having a coincident axis are disposed along one axis, or two generalized kinematic pairs having axes parallel with each other are disposed on opposite sides of one axis. The starlike pattern comprises Y-shaped pattern. A preferred solution is described below:

In a multiple-movable-platform parallel robot according to certain embodiments in the present application, the input end axes of the first kinematic pair in the main chain are within the base platform plane, and at least three active pairs have their axes intersecting at one point. It can be understood with reference to Embodiment 8 and Embodiment 28.

A multiple-movable-platform parallel robot formed in starlike layout may form reflective symmetricity, translational symmetry, scaled translational symmetry, scaled reflective symmetry, etc. It can also form rotational symmetry.

Preferred solution 2 of active pair axes: ring-like layout. In the combination pattern of the input end axes of the active pairs, in the case that not all the axes are parallel, a preferred solution is that all the axes are tangent lines of the same circle (ellipse) or tangent lines of concentric circles in the same plane.

In a multiple-movable-platform parallel robot according to certain embodiments in the present application, the input end axes of the active pair (i.e., the first kinematic pair input end of the main chain) are within the base platform plane and the axes are tangent lines of the same circle or ellipse or tangent lines of concentric circles in the same plane. In this case, the symmetricity of the movable platform is rotational symmetry or reflective symmetry. Examples can be seen from Embodiments 27, 29.

Preferred solution 3 of active pair axes: the axes are in parallel layout; in the input end axes, in a pattern in which many or all of the axes are parallel, a preferred solution is that all the axes are parallel or coincide with the base platform plane.

In a multiple-movable-platform parallel robot according to certain embodiments in the present application, the input end axes of the active pairs are parallel to or coincide with the base platform plane and are parallel with or coincide with each other. Examples can be seen from Embodiments 5, 13, 15, 17, 19.

Preferred solution 4 of active pair axes: in a layout in which the axes are perpendicular to the base platform plane, for the input end axes, in a layout pattern in which many or all of the axes are perpendicular to the base platform plane, a preferred solution is that all the axes are perpendicular to base platform plane.

In a multiple-movable-platform parallel robot according to certain embodiments in the present application, all the input end axes of the active pairs are perpendicular to the base platform plane. It can be understood with reference to Embodiments 7, 9, 12, 25.

There are also a lot of other combination patterns of the active pair input end axes, so the user can determine the concrete combination pattern based on real usage requirements.

For achieving a grasping or cutting operation, the movable platform of the multiple-movable-platform parallel robot may be mounted with a manipulator, for example, grasping tool, cutting tool, suction cup, electro-magnet, graver, paint brush, 3D printer, dexterous hand, laser head, spray gun, component parts, etc. A movable platform may be mounted with a plurality of manipulators. In this way, the following new parallel robot technical solution is generated:

According to certain embodiments, a multiple-movable-platform parallel robot is characterized in that each moving platform is mounted with a manipulator.

In order to prevent unintentional errors of the multiple-movable-platform during a cutting operation, which errors may result in discarded components, a detecting sensor, for example a pressure or displacement sensor for sensing pressure or distance, is mounted to a moving platform of the multiple-movable-platform parallel robot. The remaining moving platforms are mounted with a grasping tool, a cutting tool or other manipulators. The corresponding manipulating element on the moving platform equipped with the detecting sensor is a concrete body, and when an instruction from the detecting sensor indicates that the concrete body may be hurt, the operation instruction is stopped to prevent wrong operation. In this way, the following new parallel robot technical solution having safety protection function is generated:

The multiple-movable-platform parallel robot can also perform profile machining to a complex-shaped component part. The machining comprises performing component scaling or variant. There is one moving platform mounted with a probe or sensor, and a component part which has already been machined or to be profiled is mounted to a corresponding working table on this moving platform. A probe or sensor is used for sensing the machining boundary of the component part. When the probe contacts the component part or the sensor detects a critical distance, the platform is no more advanced, and manipulators on other movable platforms conduct profiling operation. The probe is a rigid contact which cannot move anymore once it contacts a rigid object. For example, such an operation may be grinding a turbine blade of an aircraft engine which has a complex shape.

In this way, the following new parallel robot technical solution having safety protection function or having profile following function is generated:

According to certain embodiments, a parallel machine tool robot is characterized in that: one moving platform is mounted with a probe or detecting sensor, and the remaining moving platforms are mounted with a manipulator. It can be understood with reference to Embodiment 19.

In the case that the main output end and the auxiliary output end, the fundamental movable platform and the branch movable platform, or the branch chains and the downstream main chains of the multiple-movable-platform parallel robot have scaled symmetrical or special structural layout, the branch movable platform can achieve a type of scaling function. For achieving the scaling function, there are two preferred solutions.

According to certain embodiments, a scaling parallel robot is characterized in that: the multiple-movable-platform parallel robot is a symmetrical double-moving-platform parallel mechanism, the pair of the fundamental movable platform and the branch movable platform and/or the pair of the main output end and the auxiliary output end are scaled symmetrical with each other, and the branch chain is the same or substantially the same with the main chain. It can be understood with reference to Embodiment 26, 28.

According to certain embodiments, a scaling robot is characterized in that: the multiple-movable-platform parallel robot is a double-moving-platform parallel robot, the input end axes of the active pairs are within the base platform plane, and the axes are tangent lines of the same circle or coincide with the radius of the circle, or are tangent lines of two concentric circles on the same plane or coincide with the radii of the circles; the multiple-output kinematic pair comprises a double-output kinematic pair; all the main output ends are at the inner side of the circle or ellipse, and all the auxiliary output ends are at the outer side of the circle or ellipse; the auxiliary branch chain is the same or substantially the same with the downstream main chain; the fundamental movable platform is scaled symmetrical with the branch movable platform scaled symmetrical. The inner and outer sides mentioned here are not limited to be within the base platform plane. During working, the ranges of inner and outer sides cover the sections above and below the base platform plane which are smaller than the radius of the circle. This scaling robot can also be used in scaled profile machining. For example, based on a smaller turbine blade, a larger turbine blade can be produced by scaled profile machining. Thus, a profiling parallel robot having scaling function is generated. It can be understood with reference to Embodiment 27.

In the case that a low-DOF parallel mechanism acts as a generating element, the main chains are generally some types of special chains having relatively complex structure. For simplifying the structure, a passive chain can be added as a redundant chain. After a passive chain is added as a redundant chain, the selection flexibility of the main chains is increased. Examples include using unrestraint 6-DOF chains. In this way, the following technical solution is generated:

According to certain embodiments, in the multiple-movable-platform parallel robot, the fundamental parallel mechanism is a low-DOF parallel mechanism; the fundamental parallel mechanism comprises, in addition to the main chain, a redundant chain connecting the fundamental base platform with the branch base platform; the redundant chains is a passive chain; the number of DOF of the redundant chain is more than or equal to two, and is less than six; the main chain is an unrestraint 6-DOF chain.

Walking parallel robot pattern: a multiple-movable-platform parallel robot can be used as a walking parallel robot. The technical problem in prior art, that is, the walking parallel robot cannot walk after it is turned over by 180 degrees, is solved. It can be understood with reference to Embodiment 29, 30.

According to certain embodiments, in a double-sided walking parallel robot, the fundamental parallel mechanism of each multiple-movable-platform parallel robot is a parallel leg mechanism; each multiple-movable-platform parallel robot comprises a fundamental parallel mechanism and a branch parallel mechanism, the fundamental parallel mechanism being reflectively symmetrical with the branch parallel mechanism; one multiple-movable-platform parallel robot is called as Leg A, and the other is called as Leg B; the fundamental parallel mechanism of Leg A and the fundamental parallel mechanism of Leg B or the branch parallel mechanism of Leg B are located at the same side to form a single-sided parallel walking robot; the branch parallel mechanism of Leg A and another parallel mechanism of Leg B are located at another side to form another single-sided parallel walking robot; the fundamental base platforms of Leg A and Leg B are located in a plane, and the two fundamental base platforms are fixedly connected to each other form a hip joint; all the four movable platforms are of a foot arch structure, which is called as movable platform foot arch; the movable platform foot arch is provided with toes.

The fundamental parallel mechanism of Leg A is composed of the fundamental base platform of Leg A, the main chain of Leg A and the fundamental movable platform foot arch of Leg A; and the fundamental parallel mechanism of Leg B is composed of the fundamental base platform of Leg B, the main chain of Leg B and the fundamental movable platform foot arch of Leg B. Each movable platform foot arch is provided with toes.

The two parallel leg mechanisms are arranged in one of the following ways:

(1) One of the two multiple-movable-platform parallel robots at the left side, and the other one at the right side;

(2) One of the two multiple-movable-platform parallel robots is larger, and the other one is smaller, the smaller one being within the larger one; two movable platforms foot arches located at the same side of the fundamental base platform have different sizes or have different heights or have different sizes and heights;

(3) The two multiple-movable-platform parallel robots are disposed in a cross manner; two movable platforms foot arches (25.2) located at the same side of the fundamental base platform have different sizes or have different heights or have different sizes and heights.

The terms larger and smaller used here may refer to the whole body or to a partial portion, for example, for comparing the sizes of two foot arches.

The double-sided walking parallel robot solves the problem that the walking parallel robot cannot walk after it is turned over by 180 degrees; however, there may be a new problem: the robot cannot walk when it is standing-by-side or the robot cannot recover its walking ability. For solving these problems, the following solution is proposed.

According to certain embodiments, the double-sided walking parallel robot, the smaller one of the two double-moving-platform parallel robots is within the larger one; two movable platforms foot arches located at the same side of the fundamental base platform have different sizes or have different heights or have different sizes and heights.

The hip joints on the base platform plane are provided with a returning ring which is larger than base platform; the returning ring is in the form of a circular ring, for connecting link rods with the hip joints together; the returning ring and the hip joints share the same center; the radius of the returning ring is larger than $L/\cos\theta$, and the radius of the returning ring is not smaller than the larger one of the radius of the circumscribed circle of the toes and the radius of the circumscribed circle of the hip joints;

wherein in the expression $L/\cos\theta$, L is the distance from the mid-point between two neighboring toes to the center of the fundamental base platform, the mid-point between two neighboring toes being call in a simplified way as mid-point of toes; and when drawing a connecting line from the mid-point of toes to the center of the fundamental base platform, $\theta$ is the angle between a connecting line and the fundamental base platform plane.

As to the selection of the radius of the returning ring, the above solution means that a determined double-sided walking parallel robot has three radius: the radius of the circumscribed circle of toes (if there are two different radii, the larger one is selected), the radius of the circumscribed circle of the hip joints, and the radius calculated from expression $L/\cos\theta$. The radius of the returning ring is selected as the maximum one of the three radii.

In a design procedure, the requirements in selection of two neighboring toes are not strict. By using different selection methods, different recovering abilities can be obtained. The hip joints shall comprise moving elements on the base platform plane; for example, in Embodiment 33 shown in FIG. 88, a circle drawn according to the radius of the hip joints shall encircle the areas of dashed lines.

As to the size of the returning ring, the following condition shall be taken into consideration: when a certain point on the returning ring contacts the ground (horizontal ground surface), there are also two toes contacting the ground to form a triangle; now the projection point of the weight center of the robot on the horizontal ground surface is outside the triangle. The returning ring has two functions. First, when the robot is standing-by-side, the returning ring can help the double-sided walking parallel robot to return to a normal upstanding state (or a reversed state) (like a tumbler); second, when the robot is standing-by-side and cannot return to a normal upstanding state, the returning ring can be used as a rolling ring. By changing the position of the weight center of the double-sided walking parallel robot, rolling can be achieved.

As to the selection of the radius of the returning ring, the above solution means that a double-sided walking robot has three radii: the radius of the circumscribed circle of toes, the radius of the circumscribed circle of the hip joints, the radius calculated form expression L/cos θ. The radius of the returning ring can be selected as the maximum one of the three radii. It can be understood with reference to Embodiments 30, 31

A new problem created after a returning ring is added is that the overall size of the walking parallel robot becomes larger and the passing-through ability becomes worse. For solving this new problem, a method is to reduce the height of the walking parallel robot in the case that the radius of the returning ring is determined. For example, the overall height of the walking parallel robot is smaller than 60% of the diameter of the returning ring, so the radius of the returning ring can be made to be the smallest one. Another method for solving the above problem consists in the following solution.

According to certain embodiments, in the double-sided walking parallel robot, the returning ring is substituted by N3 (N3≥2) segments of arched rods; opposite ends of each arched rod is formed with a slot, the slot extending in the direction of a tangent line of the returning ring; neighboring arched rods are overlapping with each other; the N3 arched rods form the returning ring; the rod elements for connecting the hip joints with the arched rods are substituted by N3 contracted mechanisms; each contracted mechanism is one of the following serial mechanisms: PR mechanism (the axis of the revolute pair is perpendicular to the axis of the sliding pair), CR mechanism (the axis of the revolute pair is perpendicular to the axis of the cylinder pair), HR mechanism (the axis of the revolute pair is perpendicular to the axis of the helical pair), RR mechanism (the axes of the two revolute pairs are parallel with each other), RRR mechanism (the axes of the three revolute pairs are parallel with each other); from one or more of above mechanisms, N3 serial mechanisms are selected as a group of contracted mechanisms; the axes of the revolute pairs of the contracted mechanism are perpendicular to base platform plane; one end of each revolute pair of the contracted mechanism movably fits with slots in two neighboring arched rods so that the revolute pair is slidable in the slots, and the other end of the revolute pair is connected with a hip joint.

For example, an RR serial mechanism may be used. The axis of the revolute pair is perpendicular to the base platform plane; a revolute pair is connected to a hip joint at a location near its center. Another revolute pair is connected to the slots of two neighboring arched rods. The slots of the two neighboring arched rods form movable fit with the revolute pair at the end of the serial mechanism RR. The revolute pair is slidable in the slots of the arched rods. Near the revolute pair of the hip joint is a driving pair. The RR mechanism can be rotated around the revolute pair on the base platform. After the driving pair is rotating, the arched rods can be contracted. The diameter of the walking parallel robot is reduced, and the passing-through ability is increased. The contraction mechanism can also be substituted by other structures having similar functions.

The expanded arched rods form a circle; this circle may be concentric with the center of the base platform, or is offset therefrom.

A rolling torque can be formed by means of this offset, so that a driving force is provided to the walking robot which is standing-by-side.

In order to increase the ability that the walking robot keeps the moving platform in a horizontal state and has a larger step length when the robot is walking on a slanted road or is walking upstairs, the following solution is proposed.

According to certain embodiments, in the double-sided walking parallel robot, each parallel mechanism comprises two fundamental parallel mechanisms and two branch parallel mechanisms; on each movable platform (foot arch), at least one toe is mounted with a generalized sliding pair. The angle between the axis of this generalized sliding pair and the normal line of the toes plane is not larger than 30 degrees. The slanted axis can be used for adjusting the distance between toes or reducing interference. This generalized sliding pair includes a revolute pair, a cylinder pair, or a helical pair.

There are many patterns of walking parallel robots; most walking robots disclosed in patent references CN 201010292424.1 and CN 03826959.7 can be used in certain embodiments in the present application.

There are some patterns of combined downstream chains: the connection manners between the chains and the movable platform can be classified into three types according to the relations of neighboring branch chains: double-straight-line shaped, inverted V-shaped, or X-shaped. In the double-straight-line shaped type, two neighboring branch chains are directly connected with the movable platform, each chain being equipped with a movable platform hinge point; the number of the movable platform hinge points equals to the number of the active chains. Examples can be seen from Embodiments 1, 7. In the second type, or inverted V-shaped type, two or three chains are connected with the movable platform via a composite hinge; two neighboring chains are inverted V-shaped, and the inverted V-shaped chains are jointed to one point at the connection to the movable platform; the number of the movable platform hinge points is smaller than the number of the active chains. Two or the three branch chains are arranged in an inverted V-shape. Examples can be seen from Embodiments 18, 27. In the third type, two branch chains are first combined into one branch chain, and are then connected with the movable platform. The combined branch chain is X-shaped, as simply called as X-shaped chains. In the third type, the number of the hinge points connected with the movable platform is reduced, the number of the branch chains near the movable platform is reduced, and the partial interference space of the chains near the movable platform is reduced, and thus a distinctive pattern is formed, which can be used in walking parallel robots. The third type is suitable to be used in a parallel mechanism in which the number of DOF is more than 3. There is also a pattern in which three branch chains are combined into one. The third type forms the following new pattern:

According to certain embodiments, the symmetrical multiple-movable-platform symmetrical parallel robot is characterized in that: it comprises only one branch parallel mechanism; the branch parallel mechanism is reflectively symmetrical with the fundamental parallel mechanism; the number of the main chains is at least three to at most seven; the third generalized kinematic pair of the main chain comprises a double-output kinematic pair; the output ends of the double-output kinematic pair are reflectively symmetrical with each other; at least one pair of neighboring main chains share a double-output kinematic pair, with the original two downstream main chains being combined into a downstream main chain and then being connected with the fundamental movable platform, and the original two auxiliary branch chains being combined into an auxiliary branch chain and then being connected with the branch movable platform; the branch parallel mechanism is reflectively symmetrical with the fundamental parallel mechanism.

In a 6-DOF fundamental parallel mechanism, if there are three pairs of main chains be combined, there will be only three downstream main chains connected with a single fundamental movable platform. Meanwhile, if three pairs of auxiliary branch chains are combined, there will be only three auxiliary branch chains connected with a single branch movable platform. The fundamental parallel mechanism takes the 6-DOF parallel mechanism proposed by Ben-Horin as a prototype. Three planar 2-DOF dollies are substituted by 2-translational-DOF planar parallel mechanisms (for example, 2-RRR, 2-RPR, 2PRR). Three rods having fixed lengths and the kinematic pairs connected with them remain unchanged.

The pattern in which two main chains share one double-output kinematic pair can be used in constructing a 5-DOF multiple-movable-platform parallel robot, or constructing a 4-DOF multiple-movable-platform parallel robot. It can also be used in constructing a walking parallel robot. It can be understood with reference to Embodiments 32, 33.

According to certain embodiments, a double-sided walking parallel robot is characterized in that: it comprises two multiple-movable-platform parallel robots, and the fundamental parallel mechanisms of two multiple-movable-platform parallel robot are each a parallel leg mechanism; the two fundamental base platforms are arranged on a plane and are fixedly connected with each other; the projections of the double-output kinematic pairs of the two multiple-movable-platform parallel robots onto the base platform plane are located in different sector spaces; the movable platform has a foot arch structure; the foot arch is provided with toes; two movable platforms foot arches located at the same side of the fundamental base platform plane have different sizes or have different heights or have different sizes and heights.

Actually, it is feasible only if the projections of the double-output kinematic pairs of the two multiple-movable-platform parallel robots onto the base platform plane are not overlapping each other; for the above solution that the projections are located in different sector spaces, the structure can be made relatively compact. Each double-output kinematic pair has an independent working space, which is not interfered by the components of another multiple-movable-platform parallel robot. It can be understood with reference to Embodiment 33.

The terms and related structures related to in the present application will be described below.

(I) Further Description to the Fundamental Base Platform

In accordance with the structures of the fundamental parallel mechanisms, the fundamental parallel mechanisms are classified into planar fundamental parallel mechanisms and spatial fundamental parallel mechanisms. Accordingly, the fundamental base platforms are classified into two types described below.

The base platform plane of the planar parallel mechanism refers to the plane in which the parallel mechanism lies. In engineering field where the requirements are not strict, it may refer to a plane parallel with the plane in which the parallel mechanism lies. The base platforms of the planar parallel mechanisms may have two types: triangle shape and straight line shape; no matter it is triangular or straight line shaped, it is always in the plane of the planar parallel mechanism, and thus is called as planar base platform.

The fundamental base platforms of the spatial parallel mechanisms may be classified into three types: A, the active pair axis is perpendicular to or coincides with a plane, and the first kinematic pair of the main chain is therefore mounted to this plane. This plane is called as fundamental base platform plane. This base platform is called as planar base platform. B, the active pair axis is parallel (not coincide) with a plane, and the first kinematic pair mounted to this plane via a mount. This plane is called as fundamental base platform plane. This base platform is called as planar base platform. C, the angle between the active pair axis and a reference plane is within +/−20 degrees, and this reference plane is called as fundamental base platform plane. This base platform is called as planar base platform.

An example of the third type is below: the active pair is a sliding pair, the axis of the sliding pair is curved into the form of a circle, and the base platform plane is curved into a cylindrical surface. The fundamental parallel mechanism is located in a small sector of the cylindrical surface, for example, in a sector smaller than 90 degrees. In other sector spaces, several branch parallel mechanisms are arranged in rotationally symmetrical with each other. For the sake of the change in the axis of the sliding pair, the fundamental base platform plane is substituted by a reference plane. In this case, if a revolute pair substitutes the ring-like sliding pair, it is not necessary to use the reference plane as the fundamental base platform plane.

As to the fundamental base platform, further description is made below: 1, a base platform, after symmetrical transformation, is a combination of the fundamental base platform and the branch base platform, and may be still a plane or may become a curved surface, for example, becomes a cylindrical surface. But for a single branch parallel mechanism or fundamental parallel mechanism, if the fundamental base platform is located in a small sector of the cylindrical surface, it still meets the condition of the third type. 2, as to the mounting manner of the active pair, the input end of a reversed double-output kinematic pair or some other double-output kinematic pairs is mounted to a middle portion, and the middle portion is mounted to base platform plane. The input end of the multiple-output kinematic pair is at an end portion, and the end portion is mounted to the base platform plane directly or via a mount mounted.

(II) Further Description to the Generalized Kinematic Pair and the Expandable Kinematic Pair Generalized kinematic pairs include single-output kinematic pairs and multiple (double)-output kinematic pairs. The multiple (double)-output kinematic pair mentioned in the disclosure refers to a kinematic pair having two or more output ends and the output ends possessing certain symmetricity. The multiple (double)-output kinematic pair will be called in a simplified way as multiple-output kinematic pair.

Single-output kinematic pairs include simple single-output kinematic pairs and complex single-output kinematic pairs; the multiple-output kinematic pairs include simple multiple-output kinematic pairs and complex multiple-output kinematic pairs.

Simple single-output kinematic pairs, generally called as kinematic pairs, include revolute pair, sliding pair, Hooke joint, spherical pair, helical pair, cylinder pair, etc. A simple multiple-output kinematic pair is formed by adding an output end to a simple single-output kinematic pair. A complex single-output kinematic pair or a complex multiple-output kinematic pair is a kinematic pair which comprises a plurality of simple kinematic pairs or comprises various higher pairs and has a relatively complex structure.

Expandable generalized kinematic pair is a generalized kinematic pair to which a symmetrical output end can be added; if it needs to add a symmetrical output end expanding from this generalized kinematic pair, this generalized kinematic pair is an expandable generalized kinematic pair.

If there is an additional output end expands from a single-output kinematic pair, this generalized kinematic pair becomes a double-output kinematic pair, and the original generalized kinematic pair is an expandable generalized kinematic pair. If a further auxiliary output end is expanded out, this generalized kinematic pair becomes a three-output kinematic pair, and the original double-output kinematic pair is an expandable double-output kinematic pair, and so on. In this way, a multiple-output kinematic pair having N symmetrical output ends is obtained.

An expandable generalized kinematic pair or multiple-output kinematic pair is composed of an input end, an output end, an input-output converting device and expandable interface and connecting devices.

The first and the second generalized kinematic pairs each have only one input end; the third generalized kinematic pair may have two input ends only when two neighboring chains after the third generalized kinematic pair are combined into one auxiliary branch chain. It is actually formed by combining two single-input and double-output kinematic pairs. It is actually still two single-input and double-output kinematic pairs, and in which an input end corresponds to an auxiliary branch chain, but two input ends share one double-output kinematic pair.

When the main chain is set, the first, second and third generalized kinematic pairs in a chain are clearly set; meantime, the active pair and the active pair input end are also clearly set. For example, given the main chains is an RSS chain, the first, second and third generalized kinematic pairs are respectively R, S and S, the active pair and the active pair input end are R. Thus, in the following description, when the main chain is given, the first, second and third generalized kinematic pairs, the active pair and the active pair input end will not be described specifically, and will not be marked by reference numerals in the figures.

(III) Further Description to the Branch Base Platform

The lower end point of the branch chain is the hinge point between the branch chain and the branch base platform. The hinge points of N2 branch chains form the branch base platform. The branch base platform has the same, similar or substantially the same shape with the fundamental base platform. The branch base platform is symmetrical with the fundamental base platform, and the symmetricity includes equivalent symmetricity, translational symmetricity, rotational symmetricity, reflective symmetricity, slidingly reflective symmetricity as well as scaled symmetricity.

In most conditions, the fundamental base platform and the branch base platform have fixed geometric shapes. Examples can be seen from Embodiment 1, 7, 9, 25. In some conditions, for example, the active pair axes are within the base platform plane and are parallel with each other (with reference to Embodiments 17, 19), the active pairs are sliding pairs; now the active pair axes have various supporting patterns. The fundamental base platform may have various shapes, for example, triangle, square, hexagon, etc. The branch base platform also follows this way. Once the shape of the fundamental base platform is set, the branch base platform may be determined to have the same shape with the fundamental base platform to establish the symmetricity between them.

When the branch base platforms in two or more branch parallel mechanisms are equivalent symmetrical with the fundamental base platform, there is actually only one base platform. Now, the number of the branch base platforms equals to the number of the branch parallel mechanisms.

(IV) Further Description to the Structure of the Symmetrical Multiple-Output Kinematic Pair The symmetrical multiple-output kinematic pair is a key structural component in certain embodiments, which is also a new concept. The multiple-output kinematic pair falls into the scope of composite kinematic pairs. Individual multiple-output kinematic pairs mentioned in the disclosure, also called as multiple-pair component in some references, are actually also composite kinematic pairs. The symmetrical multiple-output kinematic pair mentioned in the disclosure is a composite kinematic pair having one or two input ends, and also having two or more outputs, and the output ends possess certain symmetricity. Ordinarily, the symmetrical multiple-output kinematic pair has one input end, and in some individual conditions, it has two input ends (in applications where two kinematic pairs are combined). In the symmetrical multiple-output kinematic pairs mentioned in the disclosure, some of them are effected by adding symmetricities to existing composite kinematic pairs, while some of them are new kinematic pairs dedicatedly created for certain embodiments; the symmetrical multiple-output kinematic pairs include multiple-output kinematic pairs formed by flexible kinematic pairs or compliable kinematic pairs. All of them are called in a simplified way as multiple-output kinematic pairs. The multiple-output kinematic pair is composed of an input end, two or more output ends, an input-output converting device, expandable interfaces and connecting devices.

In accordance with the axes of the input and output ends and the movement properties, the multiple-output kinematic pairs are classified into two types: fixed output kinematic pairs and varying output kinematic pairs. In accordance with structure complex degree, the multiple-output kinematic pairs may be further classified into two types: simple multiple-output kinematic pairs and complex multiple-output kinematic pairs.

The axis of a fixed output kinematic pair is not changed, and the movement property is also not changed. For example, the fixed output kinematic pair may be a simple revolute pair or sliding pair. In general, a fixed output kinematic pair is a simple kinematic pair. A varying output kinematic pair is a kinematic pair in which the output end axis may vary or the movement property may vary or both may vary. In general, a varying output kinematic pair is a complex kinematic pair. The complex kinematic pairs, in accordance with the number of the input ends, may be classified into: complex single-output kinematic pair, complex double-output kinematic pair, and complex multiple-output kinematic pair. The structures of the three types are similar. One complex output end expanded from one complex single-output kinematic pair may form one complex double-output kinematic pair. Two complex single-output kinematic pairs connected in series may form one complex double-output kinematic pairs. A complex multiple-output kinematic pair may be formed by adding one or more output ends to a complex double-output kinematic pair. The simple kinematic pairs following a similar way: the output end of a simple single-output kinematic pair can be expanded, i.e. by adding an output end of the same type, to become a simple double-output kinematic pair. By further adding a kinematic pair to the output end, a kinematic pair with three or more output ends is formed, which becomes a simple multiple-output kinematic pair. In general, a complex multiple-output kinematic pair is a varying output kinematic pair.

Simple multiple-output kinematic pairs are described below: a particular example of simple multiple-output kinematic pairs is a simple double-output kinematic pair. Simple double-output kinematic pairs are classified into two types. The first type is homo-directional double-output kinematic pair, as can be understood with reference to Kinematic Pair No. 4 (FIG. 4). The second type is reverse (opposite) double-output kinematic pair, as can be understood with reference to Kinematic Pair No. 1 (FIG. 1). A simple multiple-output kinematic pair can be obtained by adding an output end to a simple single-output kinematic pair or a simple double-output kinematic pair. In general, a simple multiple-output kinematic pair is a fixed output kinematic pair.

Complex multiple-output kinematic pairs are described below: no matter it is single-output or multiple-output, complex kinematic pairs include: 1, a complex kinematic pair axis with the direction and movement both unchanged; 2, a complex kinematic pair with only the movement type changed but the movement (axis) direction unchanged; 3, a complex kinematic pair with only the axis direction changed but the movement type unchanged; 4, a kinematic pair in which the movement direction and the movement type are both changed; 5, a kinematic pair in which the axis location is changed but the axis direction is unchanged. The latter types of complex multiple-output kinematic pairs are varying-output complex kinematic pair.

The complex varying output kinematic pair has an input-output converting box, which can be effected by means of gear pair, cam pair, linkage or slanted surface, guiderail, worm rod, parallelogram mechanism, sarrus mechanism and the like. Complex varying output kinematic pairs will be described below emphatically.

1. In ordinary conditions, the complex kinematic pair with the axis direction and movement type both unchanged can be substituted by a simple kinematic pair, and will not be described more.

2. The complex kinematic pair in which only the movement type is changed but the movement direction is unchanged will be called in a simplified way as movement-type-varying complex kinematic pair.

The complex kinematic pairs in which only the movement type is changed but the movement direction is unchanged are mainly helical pair type. Translational movement is converted into rotational movement or vice versa, which is generally achieved by a helical pair. That is, it is effected by means of PHR or RHP (R represents revolute pair, H represents helical pair, P represents sliding pair, as used in the context hereafter). It can be understood with reference to Kinematic Pair No. 8 (FIG. 8). For a certain type of parallel mechanisms, a unitary driving manner, with completely revolute pair driving or completely sliding pair driving, can be formed by using RHP or PHR. Using the unitary form of the driving pairs, the structure can be simplified, and the control can be simplified.

By using gear pairs (including gear racks) or other means, the function that the movement type is changed but the movement direction is unchanged can also be achieved, but the structure is relatively complex.

3. The complex kinematic pair in which only the movement direction is changed but the movement type is unchanged will be called in a simplified way as direction-varying complex kinematic pair.

The changing of the direction-varying complex kinematic pair can be effected via gear pair, cam pair, linkage or slanted surface, guiderail, worm rod and the like, in which gear pair is preferred. Gear pair and cam pair are generally represented by RGR and PGP. G represents one or more gear pairs (generally bevel gear) or cam pairs. Gear pairs also include movable-tooth transmission, timing belt driven by worm gear, etc. Gear pairs can be understood with reference to Kinematic Pair Nos. 14, 24 (FIGS. 14, 24). Linkages can be understood with reference to Kinematic Pair No. 18 (FIG. 18).

4. The complex kinematic pair in which the movement direction and the movement type are both changed will be called in a simplified way as double-changed complex kinematic pair.

Double-changed complex kinematic pairs include gears, for example, Kinematic Pair No. 16 (FIG. 16); tetragons, for example, Kinematic Pair No. 29 (FIG. 20); parallel mechanisms, for example, Kinematic Pair No. 13 (FIG. 13); composite pairs, for example, Kinematic Pair No. 55 (FIG. 55); linkages; cam pairs.

5. In the complex kinematic pair in which the location of the output end axis is changed, the axis direction is not changed, and the axis location is translationally moved. For example, Kinematic Pair No. 32 (FIG. 32) shows that the axis of the revolute pair is translationally moved, and Kinematic Pair No. 33 (FIG. 33) shows that the axis of the sliding pair is translationally moved.

The function of the complex multiple-output kinematic pair is mainly effected by means of an input-output converting box (device). The input-output converting box is a simple mechanical movement converting device, and belongs to commonly known technique. There are various concrete structures for it, which will be described after classified in accordance with its symmetricity.

(V) The Symmetricity of the Symmetrical Multiple-Output Kinematic Pair and Classified Description Now, various multiple (double)-output kinematic pairs related to in certain embodiments will be described in details in accordance with the symmetricity of the output end of the multiple-output kinematic pair. The multiple-output kinematic pairs are classified in accordance with the symmetricity of the output end into: reflectively symmetrical type, translationally symmetrical type, rotationally symmetrical type, slidingly reflectively symmetrical type and scaled symmetrical type.

In accordance with the definition above, symmetrical multiple-output kinematic pairs fall within the scope of composite kinematic pairs. A symmetrical multiple-output kinematic pair is a composite kinematic pair having one or two input ends and two or more output ends, with the output ends possessing certain symmetricity. Each multiple-output kinematic pair has the same components. That is, it is composed of an input end 1, a movement converting device 2, a main output end 3, an auxiliary output end 3.1, and an expandable interface 4. In the drawings and the following description, the components will not be described unless necessary, and only the movement converting device or the like are referred to. For some figures, there is neither reference numeral nor reference to the other portion of the description.

It is noted that, for a determined multiple-movable-platform parallel robot, the expandable interface 4 of the multiple-output kinematic pair may be not necessary. However, on the one hand, in the method of certain embodiments, if a multiple-movable-platform parallel robot is expandable for conducting nest symmetrical transformation, an expandable interface is necessary; on the other hand, for a multiple-output kinematic pair or a single-output kinematic pair, even if an expandable interface portion is included, no more component is added. Thus, for the purpose of providing more general meaning, each multiple-output kinematic pair is described as comprising an expandable interface.

For convenient description, a sequential number is given to each symmetrical multiple-output kinematic pair. For example, the translationally symmetrical multiple-output kinematic pair illustrated in FIG. 1 is numbered as No. 1, and is called as No. 1 translationally symmetrical multiple-output kinematic pair, or simplified as Kinematic Pair No. 1 or translational pair No. 1; the translationally symmetrical multiple-output kinematic pair illustrated in FIG. 2 is numbered as No. 2, and is called as No. 2 translationally symmetrical multiple-output kinematic pair, simplified as Kinematic Pair No. 2 or translational pair No. 2; and so on. There are 57 symmetrical multiple-output kinematic pairs, the numbers of which are the same as the numbers of the figures.

The multiple-output kinematic pairs are classified in accordance with their output ends as: reflectively symmetrical type, translationally symmetrical type, rotationally symmetrical type, slidingly reflectively symmetrical type, equivalent symmetrical type and scaled symmetrical type. Now various multiple-output kinematic pairs will be described with reference to the drawings in accordance with symmetricity.

Reflectively symmetrical type: FIG. 1-FIG. 20 show reflectively symmetrical type double-output kinematic pairs.

Kinematic Pair No. 1 (FIG. 1): FIG. 1 shows a reflectively symmetrical type double-output kinematic pair composed of revolute pairs. It is composed of an input end 1, a movement converting device 2 (in the larger circle in this figure), a main output end 3, an auxiliary output end 3.1, and an expandable interface 4; two gears 2.1 mashing with each other form the movement converting device 2; wherein one gear axis is the input end 1; two output ends are on opposite sides of a horizontal symmetrical line between the two gears. The two output ends are reflectively symmetrical with each other. The gear axis is an expandable interface 4.

Kinematic Pair No. 2 (FIG. 2): FIG. 2 shows another reflectively symmetrical type double-output kinematic pair formed by revolute pairs. Two gears 2.1 mashing with each other form the movement converting device 2, wherein one gear axis is the input end 1, the two output ends swing up and down about a line connecting the centers of the two gears, the two output ends are reflectively symmetrical with each other, one is main output end 3, and the other is auxiliary output end 3.1. The gear axis is an expandable interface 4. The movement directions of the two output ends are opposite to each other.

Kinematic Pair No. 3 (FIG. 3.1, FIG. 3.2): FIG. 3.1 is a third reflectively symmetrical type double-output kinematic pair formed by revolute pairs. The function of it is the same with the reflectively symmetrical type double-output kinematic pair of FIG. 1. FIG. 3.2 is the structural view of the movement converting device 2 of the kinematic pair. The movement converting device 2 is composed of two coaxial bevel gears 2.2 and one intermediate gear 2.4. In the two coaxial bevel gears 2.2, one is active, and the other is passive; two coaxial bevel gears are meshing with the intermediate gear 2.4; two output ends are connected to the two bevel gears. The two output ends 3 and 3.1 have opposite movement directions. For convenient expression in the figure, the output ends are scaled symmetrical with each other.

Kinematic Pair No. 4 (FIG. 4): FIG. 4 is a fourth reflectively symmetrical type double-output kinematic pair composed of a revolute pair. The axis of the revolute pair is the input end 1; two output ends are reflectively symmetrical with each other, one is the main output end 3, and the other is the auxiliary output end 3.1. A connecting line between the two output ends is parallel with the axis of the revolute pair. The expandable interface 4 is also a revolute pair axis (dashed line in the figure). The two output ends have the same movement direction.

Kinematic Pair No. 5 (FIG. 5): FIG. 5 is a fifth reflectively symmetrical type double-output kinematic pair composed of a revolute pair. The axis of the revolute pair is input end 1; the two output ends are at opposite sides of the input end to be reflectively symmetrical. A connecting line between the two output ends is perpendicular to the axis of the revolute pair. The expandable interface 4 is the axis of the revolute pair. The two output ends 3 and 3.1 have the same movement direction. This double-output kinematic pair is also a rotationally symmetrical double-output kinematic pair, having a rotation angle range of 180 degrees.

Kinematic Pair No. 6 (FIG. 6): FIG. 6 is a reflectively symmetrical type double-output kinematic pair composed of one sliding pair. Left side is the input end 1; the two output ends are reflectively symmetrical with each other, one is the main output end 3, and the other is the auxiliary output end 3.1. A connecting line between the two output ends is perpendicular to the axis of the sliding pair. The expandable interface 4 is on the axis of the sliding pair. The two output ends have the same movement direction.

Kinematic Pair No. 7 (FIG. 7): FIG. 7 is a reflectively symmetrical type double-output kinematic pair composed of two opposing sliding pairs. Axes of the two sliding pairs coincide with each other, and the movement converting device 2 achieves movement coupling (mechanical or electrical coupling). The two output ends are located on the axes of the two sliding pairs, one at left side, and the other at the right side; the two output ends are reflectively symmetrical with each other, one is the main output end 3, and the other is the auxiliary output end 3.1. The input end 1 is located at middle. The two output ends have opposite movement directions. The expandable interface is on the axis of sliding pair.

Kinematic Pair No. 8 (FIG. 8): FIG. 8 is a reflectively symmetrical type double-output kinematic pair composed of two PHR mechanisms. The two PHR mechanisms are reversely opposing to each other to share one revolute pair, and all the kinematic pairs have a coincident axis. The revolute pair is an active pair, and is the input end 1. The two output ends are located on the axes of the two sliding pairs, a main output end 3 at the left side, and an auxiliary output end 3.1 at the right side; the two output ends are reflectively symmetrical with each other, and the two output ends have opposite movement directions. The movement converting device 2 is effected by two RHs. The axis of the sliding pair is the expandable interface 4.

Kinematic Pair A No. 9 (FIG. 9.1): FIG. 9.1 is a first reflectively symmetrical type double-output kinematic pair formed by two parallelogram kinematic pairs. It is composed of an input end 1, a movement converting device 2, a main output end 3, an auxiliary output end 3.1, and an expandable interface 4. The movement converting device 2 is effected by two parallelogram mechanisms 5. The two parallelogram kinematic pairs are on the same plane. The two parallelogram kinematic pairs share two pairs of revolute pairs, and share two middle horizontal rod elements; two side rods 2.5 are collinear, and two parallelogram kinematic pairs are reflectively symmetrical with each other.

Kinematic Pair B No. 9 (FIG. 9.2): FIG. 9.2 is a variant of FIG. 9.1. The side rod 2.5 of the lower parallelogram kinematic pair is longer, and the two parallelogram kinematic pairs form a scaled reflectively symmetrical type double-output kinematic pair.

Kinematic Pair No. 10 (FIG. 10): FIG. 10 is a second reflectively symmetrical type complex double-output kinematic pair formed by two parallelogram kinematic pairs. Two parallelogram kinematic pairs 5 are on the same plane. Two pairs of revolute pairs of the two parallelogram kinematic pairs are meshed by gear pairs; the movement converting device 2 is effected by two parallelograms and two pairs of gear pairs. The expandable interface 4 is gear axis. Two parallelogram kinematic pairs are reflectively symmetrical with each other.

Kinematic Pair A No. 11 (FIG. 11.1): FIG. 11.1 is a third reflectively symmetrical type complex double-output kinematic pair formed by two parallelogram kinematic pairs. Two parallelogram kinematic pairs 6 are on the same plane, one at the left side and the other at the right side. Diagonal lines of the two parallelograms are collinear and are thus called as middle axis; neighboring apexes on the middle axis of the two parallelograms share one revolute pair. A sliding pair is connected between two apexes on the left parallelogram middle axis, the sliding pair being an active pair. The input end 1 is at the right side of the active pair, the left side apex is the main output end 3, and the right side apex is the auxiliary output end 3.1. The two output ends are reflectively symmetrical with each other. A further possible pattern can be formed by substituting the parallelogram in Kinematic Pair A No. 11 with a rhombus one.

Kinematic Pair B No. 11 (FIG. 11.2): FIG. 11.2 is a variant of FIG. 11.1. The linkage of the left parallelogram kinematic pair is longer, and the two parallelogram kinematic pairs form a scaled reflectively symmetrical type double-output kinematic pair. A further possible pattern can be formed by substituting the parallelogram in Kinematic Pair B No. 11 with a rhombus.

Kinematic Pair A No. 12 (FIG. 12.1): FIG. 12.1 comprises one RH mechanism and two parallelogram mechanisms. The axis of the revolute pair in the RH mechanisms coincident with the axis of the helical pair; upper and lower sides of the H pair are respectively connected with a parallelogram kinematic pair 5; two parallelogram kinematic pairs 5 are on a plane; the axes of all the revolute pairs in the two parallelogram kinematic pairs are perpendicular to the axis of the helical pair; the revolute pair fitting with the helical pair is the input end 1. The helical pair and the two parallelogram kinematic pairs form the movement converting device 2. The two output ends 3 and 3.1 are located one two outside horizontal sides of two parallelogram kinematic pairs.

Kinematic Pair B No. 12 (FIG. 12.2): FIG. 12.2 is a variant of FIG. 12.1: the side rod 2.5 of the lower parallelogram kinematic pair is longer; the output ends of the two parallelogram kinematic pairs are scaled reflectively symmetrical with each other.

Kinematic Pair No. 13 (FIG. 13): FIG. 13 is a reflectively symmetrical type complex double-output kinematic pair composed of two Sarrus mechanisms 7. The two Sarrus mechanisms 7 comprise an upper one and a lower one; the two middle pairs of revolute pairs are shared by the two Sarrus mechanisms, the middle horizontal rod is shared by the two Sarrus mechanisms 7, and the two middle side rods 2.6 are collinear. In the two middle revolute pairs, one acts as the input end; the main output end 3 is on the upper Sarrus mechanism, the auxiliary output end 3.1 is on the lower Sarrus mechanism, and the two output ends are reflectively symmetrical with each other. If the two Sarrus mechanisms have different sizes, by enlarging the dimensions of the lower Sarrus mechanism structure in scale, the output ends of the two Sarrus mechanisms will be scaled reflectively symmetrical with each other.

Kinematic Pair No. 14 (FIG. 14): FIG. 14 is a reflectively symmetrical type complex double-output kinematic pair composed of revolute pairs and gear pairs. It is composed of an input end 1, a movement converting device 2 (in the larger circle in this figure), a main output end 3, an auxiliary output end 4, and an expandable interface 5. The horizontal axis is an active pair axis, the active pair axis is connected with two bevel gears 2.2, one meshed with an upper bevel gear 2.2 to form an upper main output end 3, and the other bevel gear is coupled with another bevel gear via an intermediate gear 2.4 to form an lower auxiliary output end 3.1. These meshing gears form the movement converting device 2. Two output ends are on opposite sides of the active gear axis. The main output end 3 is reflectively symmetrical auxiliary output end 3.1. The gear axis of the active gear is the expandable interface 4. If the main output end 3 or the auxiliary output end 3.1 of Kinematic Pair No. 14 is cancelled, Kinematic Pair No. 14 becomes an arbitrary-direction-varying single-output kinematic pair. By connecting two or more arbitrary-direction-varying single-output kinematic pairs in series, a translationally symmetrical multiple-output kinematic pair is formed.

Kinematic Pair No. 15 (FIG. 15): FIG. 15 is also a reflectively symmetrical type complex double-output kinematic pair composed of revolute pairs and gear pairs. FIG. 15 has a mechanism similar to FIG. 14, but has a slightly changed structure: the two output ends 3 and 3.1 have a coincident axis, and the output end axis is perpendicular to the active pair axis; one intermediate gear is removed, and two active bevel gears 2.2 are opposed to each other. Other aspects can be seen from FIG. 14. If the main output end 3 or the auxiliary output end 3.1 of Kinematic Pair No. 15 is cancelled, Kinematic Pair No. 14 becomes an orthogonal direction-varying single-output kinematic pair. By connecting two or more orthogonal direction-varying single-output kinematic pairs in series, a translationally symmetrical multiple-output kinematic pair is formed.

Kinematic Pair No. 16 (FIG. 16): FIG. 16 is a reflectively symmetrical type complex double-output kinematic pair formed of one gear and two gear racks. It is composed of an input end 1, a movement converting device 2 (gear rack transmission), a main output end 3, an auxiliary output end 4, and an expandable interface 5. Two gear racks 2.3 comprise an upper one and a lower one. A gear 2.1 is meshed between them. The revolute pair on which the gear is mounted is the input end 1; in the two gear racks, one is the main output end 3, and the other is the auxiliary output end 3.1. The two output ends are reflectively symmetrical with each other. The two output ends perform opposite translational movements. If two gear racks are driven by the same gear, the two output ends will have opposite movement directions and the same speed. If the two gear racks are not parallel with each other, the angle between the axes of the two output ends may be of any degrees; the two output ends form rotational symmetricity. If the two gear racks are driven by two coaxial gears having different radii, the two output ends will have opposite movement directions and different speeds; the two output ends form scaled reflective symmetricity.

Kinematic Pair No. 17 (FIG. 17): FIG. 17 is formed by connecting in series an RHP complex kinematic pair to each of the two output ends of the complex double-output kinematic pair of FIG. 14; each the output end of the complex double-output kinematic pair share one revolute pair with the input end of the RHP complex kinematic pair. The output ends are still s reflectively symmetrical with each other. Input is rotation, and output is translation; the directions and the movement properties of the output ends are all changed. The complex double-output kinematic pair of FIG. 15 can be modified in a similar way.

Kinematic Pair No. 18 (FIG. 18): FIG. 18 is formed by connecting in series an PHR complex kinematic pair to the input end of Kinematic Pair No. 15 (the complex double-output kinematic pair in FIG. 15); the input end of Kinematic Pair No. 15 and the output end of the RHP complex kinematic pair share one revolute pair. The output end of Kinematic Pair No. 15 is fixed. The input end becomes translational, the output ends are still rotational, and the directions and the movement properties of the output ends are all changed. The complex double-output kinematic pair of FIG. 14 can be modified in a similar way.

Kinematic Pair No. 19 (FIG. 19): FIG. 19 is formed by conducting reflectively symmetrical treatment to a PRRP linkage 2.7. The output ends and the input end are all sliding pairs. The two output ends are reflectively symmetrical with each other.

Kinematic Pair No. 20 (FIG. 20): FIG. 20 is a reflectively symmetrical type double-output kinematic pair composed of two RHP mechanisms. The two RHP mechanisms are reversely opposing to each other to share one sliding pair, and all the kinematic pairs have a coincident axis. The sliding pair is an active pair, and is the input end 1. The two output ends are located on the axis of sliding pair, one is the main output end 3 at the left side, and the other is the auxiliary output end 3.1 at the right side; the two output ends are reflectively symmetrical with each other, and the two output ends have the same movement direction. The movement converting device 2 is effected by two PHs. The axis of the sliding pair is the expandable interface 4.

The reflectively symmetrical double-output kinematic pairs can also be regarded as a rotationally (rotated by 180 degrees) symmetrical multiple-output kinematic pair.

Translationally symmetrical type: FIG. 21-FIG. 32 show translationally symmetrical type multiple-output kinematic pairs.

Kinematic Pair No. 21 (FIG. 21): FIG. 21 is a translationally symmetrical type simple multiple-output kinematic pair composed of a sliding pair. The axis of the sliding pair is provided with three output ends. The main input end 3 is translationally symmetrical with two auxiliary output ends 3.1, 3.2.

Kinematic Pair No. 22 (FIG. 22): FIG. 22 is a translationally symmetrical type simple multiple-output kinematic pair composed of revolute pairs. The axis of the revolute pair is provided with three output ends. The main input end 3 is scaled translationally symmetrical with two auxiliary output ends 3.1, 3.2.

Kinematic Pair No. 23 (FIG. 23): FIG. 23 is a translationally symmetrical type multiple-output kinematic pair composed of gears and a gear rack. The axis of the gear rack 2.3 has two gears 2.1; the left gear is provided with a main output end 3, and the right gear is provided with an auxiliary output end 3.1. The two output ends are translationally symmetrical with each other.

Kinematic Pair No. 24 (FIG. 24): FIG. 24 is translationally symmetrical type complex multiple-output kinematic pair composed of gear pairs. This is a complex arbitrary-direction-varying multiple-output kinematic pair. A circular gear box is the movement converting device 2. A pair of meshing bevel gears 2.2 provides a main output end 3. The right side circular gear box is another complex direction-varying single-output kinematic pair, and a pair of meshing bevel gears provides another output end 3.1. The two gear boxes are movement converting devices 2. Two complex direction-varying single-output kinematic pairs are rigidly connected in series by the active pair axes; the active pair axes are collinear; the two output ends are translationally symmetrical with each other. The rigid connection portion (block in dashed line in the figure) is an expandable interface connecting device 4.1. If the axes are relatively long, the expandable interface connecting devices can be connected by a coupler. The left side circular gear box is a complex arbitrary-direction-varying single-output kinematic pair (the structure of it can be understood with reference to FIG. 14); the input end axis and the output end axis intersect at one point; the angle between the input end axis and the output end axis may be of any degrees (does not comprise 0 degree or 180 degrees).

Kinematic Pair No. 25 (FIG. 25): FIG. 25 is a special pattern of FIG. 24: the axes of two output ends are perpendicular to the input end axis and are parallel with each other. The two output ends are translationally symmetrical with each other. It is called as complex orthogonal direction-varying multiple-output kinematic pair, having the same reference numerals with FIG. 24. The left side circular gear box is a complex orthogonal direction-varying single-output kinematic pair (the structure of them can be understood with reference to FIG. 15): the input end axis and the output end axis intersect at one point, and the angle between the input end axis and the output end axis is 90 degrees.

Kinematic Pair No. 26 (FIG. 26): FIG. 26 comprises two serially connected RH mechanisms. The two serially connected sliding pairs (or cylinder pairs) are parallel with each other, and a helical pair is connected to a sliding pair. Two output ends expand from the two sliding pairs. The revolute pair is the input end. The two output ends are located on two sliding pairs, one at left side, and the other at the right side; one is the main output end 3, and the other is the auxiliary output end 3.1; the two output ends are reflectively symmetrical with each other. The two output ends have the same movement direction. The axis of the revolute pair and the axis of the sliding pair form the expandable interface 4. When two helical pairs are different with each other, the two output ends are scaled symmetrical with each other.

Kinematic Pair No. 27 (FIG. 27): FIG. 27 is a first scaled translationally symmetrical type double-output kinematic pair formed by two parallelogram kinematic pairs 5. The two parallelograms 5 are coplanar, and comprise an upper one and a lower one; two middle pairs of revolute pairs are shared by two parallelogram kinematic pairs; the middle horizontal rods are shared by two parallelogram kinematic pairs; two side rods 2.5 are collinear; two parallelogram kinematic pairs 5 form the movement converting device 2; two parallelogram kinematic pairs are translationally symmetrical with each other. A revolute pair on the lowermost horizontal rod element is the input end 1 (fixed end), the output end on the middle horizontal rod element is the main output end 3, and the output end on the uppermost horizontal rod element is the auxiliary output end 3.1; the main output end is scaled translationally symmetrical auxiliary output end. That is, the displacement of the auxiliary output end is larger than the displacement of the main output end by determined times. Axes of the two revolute pairs on the lowermost horizontal rod element form an expandable interface. Axes of the two revolute pairs on the middle horizontal rod element can also act as an expandable interface.

Kinematic Pair A No. 28 (FIG. 28.1): FIG. 28.1 is a second translationally symmetrical type multiple-output kinematic pair formed by parallelogram kinematic pairs. Three parallelogram kinematic pairs 6 are on the same plane. They are the left one, the middle one and the right one. The diagonal lines of three parallelograms 6 are collinear, called as middle axis. neighboring apexes on the middle axis of two parallelograms share one revolute pair. A sliding pair is connected between two apexes on the middle axis of the left parallelogram, and the input end 1 is at the left side of the sliding pair. viewed in a direction from left to right, the second apex on the middle axis is the main output end 3. The third and fourth apexes are auxiliary output ends 3.1, 3.2. The auxiliary output ends are scaled translationally symmetrical with the main output end.

Kinematic Pair B No. 28 (FIG. 28.2): FIG. 28.2 is a translationally symmetrical type multiple-output kinematic pair formed by rhombuses. Diagonal lines of the rhombus are perpendicular to each other, and two pairs of neighboring sides equal to each other. The left side is a rhombus, and the right side is a rhombus or parallelogram. The rhombuses and parallelograms are on the same plane. The diagonal lines are collinear, as called as middle axis; neighboring apexes on the middle axes of two rhombuses share one revolute pair. A sliding pair is connected between the apexes on two sides of the same length on the rhombus middle axis; the left side is sliding pair the input end 1. viewed in a direction from left to right, the second apex on the middle axis is the main output end 3. The third and fourth apexes are auxiliary output ends 3.1, 3.2. The auxiliary output ends are scaled translationally symmetrical with the main output end. This multiple-output kinematic pair has completely the same function with Kinematic Pair A No. 28 and has a similar structure, so they are classified into the same type. Kinematic Pair B No. 28 can also be composed completely of rhombuses. The rhombus can also act as a reflectively symmetrical kinematic pair, as can be understood with reference to FIG. 11.1.

Kinematic Pair No. 29 (FIG. 29): FIG. 29 is a third translationally symmetrical type double-output kinematic pair formed by parallelogram kinematic pairs. The planes of two parallelograms 5 are parallel with each other (not coplanar), with one at front and the other at back. The lower two pairs of revolute pairs of the two parallelograms 5 are mounted to two parallel axes; the output ends are respectively mounted to the upper horizontal rod elements of the two parallelograms; the front one is the main output end 3, and the back one is the auxiliary output end 3.1. The auxiliary output end is translationally symmetrical with the main output end. If the side rods of the front and back parallelograms have different lengths, the auxiliary output end is scaled translationally symmetrical with the main output end. The lower axes of the two revolute pairs are expandable interfaces 4.

Kinematic Pair No. 30 (FIG. 30): FIG. 30 is a fourth translationally symmetrical type multiple-output kinematic pair formed by a parallelogram kinematic pair 5. The lower horizontal rod of the parallelogram is fixed, a revolute pair on the lower horizontal rod element is the input end 1 (fixed end), and the upper horizontal rod element is provided with three output ends, one being the main output end 3, and the other two being auxiliary output ends 3.1, 3.2.

Kinematic Pair No. 31 (FIG. 31): FIG. 31 is translationally symmetrical type complex double-output kinematic pair composed of Sarrus mechanisms 7. Two Sarrus mechanisms 7 comprise an upper one and a lower one. Two middle pairs of revolute pairs are shared by the two Sarrus mechanisms, and two middle rod elements 2.6 are collinear. In the lowermost two revolute pairs, one acts as the input end; the main output end 3 is on the lower Sarrus mechanism, the auxiliary output end 3.1 is on the upper Sarrus mechanism, and the two output ends are scaled translationally symmetrical with each other.

Kinematic Pair No. 32 (FIG. 32): FIG. 32 is a gear box composed of translational type complex double-output kinematic pair. The gear box is the movement converting device 2, the left side revolute pair is the input end, and the axis of this revolute pair is connected with a main input end. The axis of the right side revolute pair is connected with an auxiliary output end 3.1. The two output ends are translationally symmetrical with each other. The two output ends perform translational movements in the same direction. The main output end is parallel with the auxiliary output end but is not collinear with it. The movement converting device 2 is composed of a gear set. The two output ends form translationally symmetricity or scaled translational symmetricity.

Kinematic Pair No. 33 (FIG. 33): FIG. 33 is a translational type complex double-output kinematic pair composed of a gear set and two gear racks. The two gear racks 2.3 comprise an upper one and a lower one, with a middle gear set 2.1 meshed therebetween. The revolute pair on which the gear is mounted is the input end 1, the lower gear rack is connected with the main output end 3, and the upper gear rack is connected with the auxiliary output end 3.1. The two output ends are translationally symmetrical with each other. The two output ends perform translational movements in the same direction. The movement direction of the main output end is parallel with the auxiliary output end but is not collinear with it. The movement converting device 2 (gear rack transmission) forms a speed variator by means of a gear set. The two output ends are translationally symmetrical with each other. If two gear racks have different movement speeds, the two output ends form scaled translationally symmetricity.

Kinematic Pair No. 34.1 (FIG. 34.1): FIG. 34.1 is a complex double-changed arbitrary-direction multiple-output kinematic pair, which is formed on the basis of FIG. 25 by connecting in series an (RHP) complex kinematic pair to the two output ends respectively. The revolute pair of the output end of FIG. 25 here is coaxial with the revolute pair of (RHP), and actually there is the same pair. Two output ends are translational output. The two output ends are translationally symmetrical with each other. The complex kinematic pair formed by combination of the left side circular gear box and the (RHP) complex kinematic pair is a complex arbitrary double-changed single-output kinematic pair: the input end axis and the output end axes intersect at one point; the angle between the input end axis and the output end axes may be of any degrees (does not comprise 0 degree or 180 degrees). The above translational transformation can be conducted for multiple times to form multiple-output kinematic pairs.

Kinematic Pair No. 34.2 (FIG. 34.2): FIG. 34.2 is a complex double-changed orthogonal multiple-output kinematic pair, as a special pattern of Kinematic Pair No. 34.1: the output end axes are parallel with each other and are perpendicular to the input end axis. The complex kinematic pair formed by combination of the left side circular gear box and the (RHP) complex kinematic pair is a complex orthogonal double-changed single-output kinematic pair: the input end axis and the output end axes intersect at one point, and the angle between the input end axis and the output end axes is 90 degrees. The above translational transformation can be conducted for multiple times to form multiple-output kinematic pairs.

Kinematic Pair No. 35 (FIG. 35): FIG. 35 is a translationally symmetrical type multiple-output kinematic pair composed of an RHP mechanism. All the kinematic pairs have a coincident axis. The revolute pair is the input end 1; the revolute pair is an active pair and is the input end 1. Two output ends are located on the axis of the sliding pair, one being the main output end 3 at the left side and the other being the auxiliary output end 3.1 at the right side; the two output ends are translationally symmetrical with each other, and the two output ends have the same movement direction. The movement converting device 2 is achieved by an RH mechanism. The axis of the sliding pair is the expandable interface 4.

Rotationally symmetrical type: FIG. 41-FIG. 50 show rotationally symmetrical type multiple-output kinematic pairs.

Kinematic Pair No. 5 (FIG. 5) is not only a reflectively symmetrical kinematic pair, but also a rotationally symmetrical kinematic pair.

Kinematic Pair No. 36 (FIG. 36): FIG. 36 is a rotationally symmetrical kinematic pair having a plurality of output ends. A ring-like revolute pair comprises a plurality of output ends uniformly disposed on the same radius, and the angles between neighboring output ends are the same (although it is also feasible if they are different); one is the main output end 3, and the remaining ones are auxiliary output ends 3.1, 3.2, 3.3, 3.4, 3.5. The main output end is rotationally symmetrical auxiliary output ends.

One application of Kinematic Pair No. 36 is that: a plurality of same type Kinematic Pairs No. 41 are mounted around the same axis (called as mid-axis); all the output ends are on a cylindrical surface the axis of which is the mid-axis. The cylindrical surface is divided into three or more same sector spaces; each ring-like revolute pair has only one output end on each sector, so there are many same output ends; each sector space is mounted with a parallel mechanism, with parallel mechanisms in different sector spaces being rotationally symmetrical with each other.

Another application of Kinematic Pair No. 36 is that: a plurality of Kinematic Pairs No. 36 having different radii are mounted around the same axis (called as mid-axis); the output ends of different ring-like revolute pairs are on circles having different radii. The radius of the circle on which the output ends of the lowermost ring-like revolute pair lie is the largest one, while the radius of the circle on which the output ends of the uppermost ring-like revolute pair lie is the smallest one. For other ring-like revolute pairs, in an upward direction, the radius of the circle on which the output ends lie become smaller in sequence. All the output ends are on a plane which is perpendicular to the mid-axis. This plane is coplanar with or above the uppermost ring-like revolute pair plane. This plane is divided into three or more same sector spaces; each ring-like revolute pair has one output end on each sector, so there are many same output ends; each sector space is mounted with a parallel mechanism, with parallel mechanisms in different sector spaces being rotationally symmetrical with each other.

Kinematic Pair No. 37 (FIG. 37): FIG. 37 is a rotationally symmetrical kinematic pair formed by a circular-ring-shaped sliding pair having a plurality of output ends. The circular ring is supported on a sliding track; the one circular-ring-shaped sliding pair has a plurality of output ends uniformly disposed on the same radius; the angles between neighboring output ends are the same (although it is also feasible if they are different). One is the main output end 3, and the remaining ones are auxiliary output ends 3.1, 3.2, 3.3, 3.4. The main output end is rotationally symmetrical auxiliary output ends.

Kinematic Pair No. 37 has the same function with Kinematic Pair No. 36, so the two are interchangeable. For example, the two applications of Kinematic Pair No. 36 can also be used in Kinematic Pair No. 42. However, the axis of Kinematic Pair No. 37 is changeable, while the axis of Kinematic Pair No. 36 is unique. After Kinematic Pair No. 37 substitutes Kinematic Pair No. 36 and acts as an active pair, its axis is changed. The fundamental base platform is also changed, but still meets the basic requirement that the fundamental base platform is planar.

Kinematic Pair No. 38 (FIG. 38): FIG. 38 is a formed by transformation of a rotation-type translationally symmetrical multiple-output kinematic pair (FIG. 22). At the mid-point between two output ends, the straight line axis becomes bent lines, where a coupler is mounted, the coupler being an expandable interface connecting device 4.1. For example, a pair of meshing bevel gears forms a coupler (represented in the figure by a small trapezoid). When there are a plurality of output ends, the axes are still on a plane. The main output end 3 is rotationally symmetrical auxiliary output ends 3.1, 3.2. The output end movement plane is perpendicular to the axis of the revolute pair.

Kinematic Pair No. 39 (FIG. 39): FIG. 39 is a rotationally symmetrical kinematic pair formed by sliding pairs and having a plurality of output ends. FIG. 39 is formed by transformation of a translationally symmetrical multiple-output kinematic pair (with reference to FIG. 21). At the mid-point between two output ends, the straight line axis becomes bent lines, or where a coupler is mounted, the coupler being an expandable interface connecting device 4.1. For example, a pair of meshing gear and gear rack forms a coupler (represented in the figure by a small trapezoid, with reference to Kinematic Pair No. 16). When there are a plurality of output ends, the axes are still on a plane. The main output end 3 is rotationally symmetrical auxiliary output ends 3.1, 3.2. The output end conduct translational movements.

Kinematic Pair No. 40 (FIG. 40): FIG. 40 is formed by transformation of a complex direction-varying rotation-type translationally symmetrical multiple-output kinematic pair (FIG. 25). At the mid-point between two output ends, the straight line axis becomes bent lines, where a coupler is mounted, the coupler being an expandable interface connecting device 4.1. For example, a pair of meshing gear and gear rack form a coupler (represented in the figure by a small trapezoid). When there are a plurality of output ends, the axes of the revolute pairs are still on a plane. The main output end is rotationally symmetrical auxiliary output ends. The output end movement plane is parallel with the axis of the revolute pair.

Kinematic Pair No. 41 (FIG. 41): FIG. 41 is formed on the basis of Kinematic Pair No. 15 (FIG. 15) by adding two output ends. The added output ends are in the original output end plane, and the angles between them and the main output end are respectively 90 degrees and 270 degrees. For the four output ends, the angle between every two neighboring output ends is 90 degrees. The input-output converting device is added by two pairs of bevel gears. The output end movement plane is parallel with the active pair axis. Two or more Kinematic Pairs No. 41 connect the active pair axes via a coupler to form a complex kinematic pair having eight or more output ends.

Slidingly reflectively symmetrical type: FIGS. 61-65 show slidingly reflectively symmetrical type double-output kinematic pairs.

Kinematic Pair No. 42 (FIG. 42): FIG. 42 is a slidingly reflectively symmetrical type simple double-output kinematic pair formed by revolute pairs. The main output end 3 is slidingly reflectively symmetrical with the auxiliary output end 3.1.

Kinematic Pair No. 43 (FIG. 43): FIG. 43 is a slidingly reflectively symmetrical type simple double-output kinematic pair formed by sliding pairs. The main output end 3 is slidingly reflectively symmetrical with the auxiliary output end 3.1.

Kinematic Pair No. 44 (FIG. 44): FIG. 44 is a slidingly reflectively symmetrical type complex double-output kinematic pair formed by complex arbitrary-direction-varying revolute pairs.

Kinematic Pair No. 45 (FIG. 45): FIG. 45 is formed by transformation to Kinematic Pair No. 34.1. by performing reflective transformation to the auxiliary output end of Kinematic Pair No. 34.1, the output end 3.1 is changed to be below the active pair axis to form a slidingly reflectively symmetrical type complex double-output kinematic pair. This complex double-output kinematic pair has a plurality of expandable interfaces.

Kinematic Pair No. 46 (FIG. 46): FIG. 46 is a slidingly reflectively symmetrical type double-output kinematic pair formed by gear-gear rack complex kinematic pairs.

Kinematic Pair No. 47 (FIG. 47): FIG. 47 has a structure similar to FIG. 26. by performing reflective transformation to the output end 3.1 of FIG. 26, the output end 3.1 is changed to be below the axis to become a scaled slidingly translationally symmetrical double-output kinematic pair.

Equivalent symmetrical type: FIG. 71-FIG. 75 show equivalent symmetrical type double-output kinematic pairs; equivalent symmetry means having two coincided output ends. In other words, one output end can be connected to two rod elements (dashed line in the figure). Kinematic Pair Nos. 71 to 75 all have this feature and will not be described one by one.

Kinematic Pair No. 48 (FIG. 48): FIG. 48 is an equivalent symmetrical type double-output kinematic pair formed by revolute pairs. In Embodiment 4, this double-output kinematic pair is used.

Kinematic Pair No. 49 (FIG. 49): FIG. 49 is an equivalent symmetrical type double-output kinematic pair formed by a sliding pair; two output ends coincide to create equivalent symmetry. In other words, one output end can be connected to two rod elements (dashed line in the figure). In Embodiment 4, this double-output kinematic pair is used.

Kinematic Pair No. 50 (FIG. 50): FIG. 50 is a translationally symmetrical type multiple-output kinematic pair composed of an RHP mechanism. All the kinematic pairs have a coincident axis. The revolute pair is the input end 1; the revolute pair is an active pair, and is the input end 1. Two output ends are located on the axis of the sliding pair, one main output end 3 at the left side, one auxiliary output end 3.1 at the right side; the two output ends are translationally symmetrical with each other, and the two output ends have the same movement direction. The movement converting device 2 is effected by two RHs. The axis of the sliding pair is the expandable interface 4.

Kinematic Pair No. 51 (FIG. 51): FIG. 51 is translationally symmetrical type multiple-output kinematic pair composed of an RHP mechanism. All the kinematic pairs have a coincident axis. The revolute pair is the input end 1; the revolute pair is an active pair, and is the input end 1. The two output ends are located on the axis of the sliding pair, one main output end 3 at the left side, one auxiliary output end 3.1 at the right side; the two output ends are translationally symmetrical with each other, and the two output ends have the same movement direction. The movement converting device 2 is effected by two RHs. The axis of the sliding pair is the expandable interface 4.

Kinematic Pair A No. 52 (FIG. 52.1): FIG. 52.1 is an equivalent symmetrical type double-output kinematic pair formed by a Hooke joint. The fixed axis of the Hooke joint is a horizontal axis, and two output ends expand from a swing axis of the Hooke joint (swinging in a vertical plane). The two output ends 3, 3.1 coincide to form equivalent symmetry.

Kinematic Pair B No. 52 (FIG. 52.2): FIG. 52.2 is an equivalent symmetrical type double-output kinematic pair formed by another Hooke joint. The fixed axis of the Hooke joint is a vertical axis, and two output ends expand from a swing axis of the Hooke joint (swinging in a horizontal plane). The two output ends 3, 3.1 coincide to form equivalent symmetry.

Kinematic Pair C No. 52 (FIG. 52.3): FIG. 52.3 is an equivalent symmetrical type double-output kinematic pair formed by a spherical hinge. The spherical hinge is formed by three orthogonal revolute pairs. The fixed axis of the spherical hinge is a vertical axis, and output ends expand from the third revolute pair. The third revolute pair swings in a vertical plane. The two output ends 3, 3.1 coincide to form equivalent symmetry.

Composite multiple-output kinematic pairs: a composite multiple-output kinematic pair has a plurality of multiple-output kinematic pairs obtained by subsequently conducting symmetrical transformation; or the number of output ends of a complex multiple-output kinematic pair kinematic pair formed by a plurality of multiple-output kinematic pairs connected in series is three or more.

Kinematic Pair No. 53 (FIG. 53): FIG. 53 is a complex multiple-output kinematic pair obtained by adding an output end to Kinematic Pair No. 2 (FIG. 2). By expanding the axis of two bearings of Kinematic Pair No. 2, and adding an output end to the axis at the same side, it becomes a complex multiple-output kinematic pair. In FIG. 53, there are totally six output ends. One is the main output end 3, and the remaining ones are auxiliary output ends 3.1 to 3.5. The auxiliary output ends are obtained by conducting symmetrical transformation to the main output end by a plurality of times. There are many methods for forming the five auxiliary output ends: 1. In the three output ends above the axis, the right two are obtained by translational transformation; the right two auxiliary output ends are translationally symmetrical with the main output end; the lower three output ends are formed by reflective transformation to the upper three output ends. 2. The above three output ends are obtained by translational transformation, and the lower three output ends are 180-degree rotationally symmetrical with the upper three output ends. 3. The two bottom-right output ends are obtained by slidingly reflective transformation to the upper-left main output end, and the two upper-right output ends are obtained by slidingly reflective transformation to the bottom-left output ends. The bottom-left auxiliary output ends are obtained by reflective transformation to the main output end.

Kinematic Pair No. 54 (FIG. 54): FIG. 54 is formed by further conducting translational transformation one time to two complex double-changed reflectively symmetrical kinematic pairs shown in FIG. 15. That is, two Kinematic Pairs No. 14 are connected in series to form a complex kinematic pair having four output ends. This kinematic pair comprises reflective transformation, translational transformation, rotational transformation, as well as slidingly reflective transformation.

Kinematic Pair No. 55 (FIG. 55), FIG. 55 is formed by further conducting reflective transformation one time to the complex double-changed translationally symmetrical kinematic pair shown in FIG. 34.2. A complex kinematic pair having four output ends is formed. When conducting reflective transformation, the structure of the gear pair can be understood with reference to the structure of Kinematic Pair No. 15. This kinematic pair comprises reflective transformation, translational transformation, rotational transformation, as well as slidingly reflective transformation.

Kinematic Pair No. 56 (FIG. 56) is formed on the basis of Kinematic Pair No. 38 by adding an output end. At the right side of the main output end 3 of Kinematic Pair No. 38, a translational output end 3.1 is added, and the original two auxiliary output ends become 3.2, 3.3. The main output end 3 is translationally symmetrical auxiliary output end 3.1; the main output end 3 is rotationally symmetrical auxiliary output end 3.2. By applying a plurality of Kinematic Pairs No. 56, robots having multiple symmetricities can be generated.

Kinematic Pair No. 57 (FIG. 57) is formed on the basis of Kinematic Pair No. 40 by adding an output end. At right side of the main output end of the Kinematic Pair No. 40, a translational output end 3.1 is added, and the original two auxiliary output ends become 3.2, 3.3. Thus, a kinematic pair with four output ends is obtained. If there is a reflectively symmetrical output end at the side below the main output end of Kinematic Pair No. 57, and there is a reflectively symmetrical auxiliary output end at the side below each auxiliary output end, Kinematic Pair No. 57 will have eight output ends. In the eight output ends, seven auxiliary output ends are symmetrical with the main output end. It comprises reflective symmetricity, translational symmetricity, rotational symmetricity and slidingly reflective symmetricity. By suitably design the dimensions of the output end the structure, scaled symmetry will be created. Thus, by applying a plurality of Kinematic Pairs No. 57, robots having multiple symmetricities can be generated.

The above multiple-output kinematic pairs are illustrated as having two or a few output ends. Actually, symmetrical transformation can be conducted in sequence to these kinematic pairs. In this way, more output ends can be obtained. Some different multiple-output kinematic pairs disclosed above can also be connected in series to form more output ends, and thus to form multiple-output kinematic pairs which are more complex.

There are a variety of symmetrical multiple-output kinematic pairs, and it is not able to list them one by one. All the multiple-output kinematic pairs that follow the definition of certain embodiments fall within the protection scope of certain embodiments.

(VI) About Chains and Branch Chains

As to chains: the number of chains mentioned in the disclosure is the number of chains expanded from the base platform, is also the number of the active pairs, called as the number of active chains; the number of branch chains connected with the movable platform may be the same or different, and the number of branch chains connected with the movable platform is smaller than or equals to the number of active chains. A chain is generally composed of a kinematic pair and linkages. However, in various references, when the chains are expressed customarily by capital letters for kinematic pairs, only capital letters are expressed while the linkages are not; the disclosure uses this expression manner.

As to auxiliary branch chains and the expansion of auxiliary branch chains: the auxiliary branch chains comprise three types: large-sized auxiliary branch chains, middle sized auxiliary branch chains, small-sized auxiliary branch chains. A large-sized auxiliary branch chain is connected to the output end of the first kinematic pair; the large-sized auxiliary branch chain is the same or substantially the same branch chain with the main chains, and thus is called as large-sized auxiliary branch chain. Most embodiments are about large-sized auxiliary branch chains. A small-sized auxiliary branch chain is a branch chain connected with the third generalized kinematic pair. It comprises two less kinematic pairs than the main chain, is the branch chain having the minimum number of kinematic pairs, and thus is called as small-sized auxiliary branch chain. Not all the multi-platform symmetrical parallel robots have a small-sized auxiliary branch chain. Sometimes a small-sized auxiliary branch chain itself is a linkage, for example, Embodiment 11 (FIG. 68), and thus it is unitarily called as auxiliary branch chain in the disclosure. The auxiliary branch chain comprises only one linkage, and is related to the belonging relationship of a boundary kinematic pa. If a boundary kinematic pair belongs to a downstream branch chain, the downstream branch chain of Embodiment 11 is a single kinematic pair chain. A middle sized auxiliary branch chain is a branch chain connected with the second generalized kinematic pair. It has one less kinematic pair than the large-sized auxiliary branch chain, and has one more kinematic pair than the small-sized auxiliary branch chain, and thus is called as middle sized auxiliary branch chain. It can be understood with reference to Embodiment 10 (FIG. 67). A multiple-movable-platform parallel robot may comprise one type, or two types or three types of auxiliary branch chains. The auxiliary branch chain is the same or similar.

In the same branch chain, the upstream branch chain corresponding to the large-sized auxiliary branch chain is the smallest one, and only is a multiple-output kinematic pair, for example, Embodiment 1. Similarly, the upstream branch chain corresponding to the small-sized auxiliary branch chain is the largest one, and has three generalized kinematic pairs, for example, Embodiment 11. Similarly, the upstream branch chain corresponding to the middle-sized auxiliary branch chain has two generalized kinematic pairs, for example, Embodiment 10.

As to expression that the auxiliary branch chain (also called as downstream branch chain) is the same or substantially the same with the downstream main chains: same refers to be composed of the same kinematic pairs, having the same connecting sequence, and the lengths of the components connecting the kinematic pairs being also the same. Substantially the same refers to be composed of the same kinematic pairs, having the same connecting sequence, but the lengths of the components connecting the kinematic pairs being somewhat different from each other. Assembling it is required that the components of robots or parallel machine tool robots have the same length, the walking parallel robots may also be substantially the same or the same.

The symmetricity between the auxiliary branch chain and the downstream main chain, the symmetricity between the auxiliary branch chain and the downstream main chain and the symmetricity between the auxiliary branch chain and the downstream branch chain are the same as the symmetricity of the main output end and the auxiliary output end where they are located at. The symmetricities are also classified into two types: strict symmetricity and loose symmetricity.

(VII) About Symmetricities

It is noted that the term symmetricity used in certain embodiments is not the same concept with the symmetricity used in the field of parallel robot mechanisms. The symmetricity used in the field of parallel robot mechanisms means that a parallel mechanism has the same chains, and thus it defines the instinct property of a parallel mechanism. The term symmetricity used in certain embodiments refers to the relationship of the fundamental parallel mechanism and the branch parallel mechanism, refers to the relationship of the fundamental movable platform and the branch movable platform, refers to the relationship of the main output end and the auxiliary output end of a multiple-output kinematic pair, and refers to the relationship of the downstream main chain and the auxiliary branch chain. Thus, it defines in nature the relationship of two parallel mechanisms.

The term symmetricity used in certain embodiments reflexes is in nature similar to the symmetricity in the field of geometry, and is a type of transformation. However, it is not completely the same with the symmetricity in the field of geometry. An example can be seen from Embodiment 1, its symmetrical double-output kinematic pairs act as the first kinematic pairs, and are active pairs. Theatrically, if they are symmetrical, the two active pairs both need driving; however in engineering field, it may drive only one revolute pair. As another example, the symmetricity of a double-sided walking parallel robot may be loose symmetricity. Most important characteristics of the term symmetricity used in certain embodiments is that, between the parallel mechanisms, there is a mechanical connection to provide a continuous and precise transmission path for energy, movement and information.

The term scaled symmetricity used in certain embodiments comes from a concept of fractal geometry. Scaled symmetricity is symmetricity with different dimensions, is symmetricity after enlarged or shrunk, is symmetricity formed from self similarity, and is symmetricity with similarity between one portion and another portion. In references, it is called as telescope symmetricity or symmetricity with self similarity, or is called as scaled symmetricity. The disclosure uses the term scaled symmetricity. For example, for two similar triangles, although they have different sizes, they are scaled symmetrical. Scaled symmetricities are classified into scaled reflectively symmetricity, scaled translational symmetricity, scaled rotational symmetricity and scaled slidingly reflective symmetricity.

The term symmetricity used in certain embodiments refers to symmetricity at home position, and the symmetricities include reflective symmetricity, translational symmetricity, rotational symmetricity, slidingly reflective symmetricity and scaled symmetricity, and also include symmetricities obtained by forming the above symmetricities in sequence (multiplied) by limited times. Symmetricities between the fundamental base platform and the branch base platform and symmetricities between output ends further comprise equivalent symmetry.

The term symmetricity used in certain embodiments is a definition to a structure in an initial state. As to the symmetricity in other times, the symmetricity may be varied. For example, the symmetricity at one time may be changed into other structural symmetricity at different times. The symmetricity may be overall symmetricity or phase-change symmetricity. Examples can be seen from the symmetricities in Embodiments 3, 4.

The term symmetricities used in the disclosure further include the symmetricity between the upstream main chain and the downstream branch chain. Such symmetricity is not mentioned above. Actually, the symmetricity between the upstream main chain and the downstream branch chain is included in the symmetricity between output ends and the symmetricity between parallel mechanisms. The symmetricity between the upstream main chain and the downstream branch chain, and the symmetricity includes equivalent symmetricity, reflective symmetricity, translational symmetricity, rotational symmetricity, slidingly reflective symmetricity and scaled symmetricity.

The symmetricities mentioned in the disclosure comprise strict symmetricity and loose symmetricity. Assembling robots and parallel machine tools belong to strict symmetricity, and walking parallel robots pertain to loose symmetricity. Loose symmetricity further comprises a condition that the translation distances are different. Scaled symmetricities also include strict symmetricity and loose symmetricity. Strict profiling or strict scaling profiling belong to strict symmetricity, and verified profiling belongs to loose symmetricity.

As to the symmetrical transformation of the fundamental parallel mechanism, 可 it is possible to perform symmetrical transformation in three directions (at the same time). (1) performing symmetrical transformation in the normal line direction of the base platform plane, for example, translational transformation in Embodiments 9, 10; (2) performing symmetrical transformation in a direction in the base platform plane, for example, translational transformation in Embodiments 15, 16; (3) performing symmetrical transformation along a plane which forms an angle with the base platform plane, for example, rotational transformation in Embodiment 21.

Three transformations or two transformations or one transformation can be conducted in sequence and repetitively. By conducting transformations along three directions at the same time, a lot of symmetrical parallel mechanisms can be created, and may even fill the whole Euclidean space.

(VIII) About Generating Element

The basis of certain embodiments is a proper generating element. When a generating element is given, by applying the method disclosed in the present application, parallel mechanisms having all DOF combination patterns (57 types) can be obtained. The 57 types of DOF combinations, with different chain structures and different symmetrical manners, a large amount of multiple-movable-platform parallel robots can be generated. Embodiment of the disclosure are aimed at describing the invented methods and invented structures precisely and completely. For describing clearly and conveniently, on the one hand, the generating element is not selected form very simple parallel mechanisms. For example, 1-RS&1-RRR (1T1R) 2-DOF parallel mechanism will not be used as a generating element. On the other hand, four-arthropod parallel mechanisms having complex structures are also not selected, because it is not convenient to describe the method and structure. In the selection of generating elements, two-arthropod parallel mechanisms and planar parallel mechanisms are general used. That is, the mechanism shall be used for fully describing the structure and method, but the structure shall not be too complex. As supplementary to generating element embodiments, some relatively typical generating elements are given below, which comprises multi-arthropod parallel mechanisms.

The 5-RRR (RR) 5-DOF symmetrical parallel mechanism proposed in Reference "Advanced Spatial mechanisms" (Zhen Huang, Higher Education Press, 2006.5, simplified as Reference 1 below) in FIGS. 12-4, the three-dimensional cylindrical movement parallel mechanisms proposed in Reference "Model Synchronization of Parallel Mechanisms" (Xianwen Kong, etc., China Machine Press, 2013.11, simplified as Reference 2 below) in FIG. 8.12, FIG. 8.13 and FIG. 8.14, and the 5-DOF parallel mechanisms proposed in Reference 2 in FIG. 12.7 and FIG. 13.7 can be used as generating elements. Since the active pair axis is parallel to or perpendicular to the fundamental base platform plane, they can be sued as generating elements directly. When the parallel mechanism proposed in Reference 1 in FIG. 12-4 is used as a generating element, it has two translational transformation manners. One manner is that: by properly enlarging the regular pentagonal where the first kinematic pair of the main chain are located, relatively sufficient interference space can be provided to the chains, so translational transformation can be conducted in a direction perpendicular to the fundamental base platform plane. This manner can be seen from Embodiments 9, 10 and 11. Another manner is that: when the input end of the main chain is connected in series with an orthogonal direction-varying multiple-output kinematic pair (see Kinematic Pair No. 25 below), translational transformation can be conducted on the fundamental base platform plane, as can be seen from Embodiments 15, 16.

Reference 2 in FIG. 6.10, FIG. 6.11, FIG. 6.12 and FIG. 6.13 (C pair can be substituted by PR pair) proposed three translational parallel mechanisms. Some of them can be used as generating elements directly. Some of them can be used as generating elements by connecting in series a complex direction-varying or complex double-changed multiple-output kinematic pair. For example, by connecting in series a Kinematic Pair No. 17, reflectively symmetrical transformation can be achieved. by connecting in series a Kinematic Pair No. 34, translationally symmetrical transformation can be achieved.

The parallel mechanisms proposed in Reference "Discuss on Mechanism DOF" (Zhen Huang, etc., Science Press, 2011.8, simplified as Reference 3 below) in FIG. 7.2, FIG. 7.3, FIG. 7.6, FIG. 7.11 and FIG. 7.33, the parallel mechanisms proposed in Reference "Mathematic Basis of Robot Mechanisms" (Jingjun Yu, etc., China Machine Press, 2008.7, simplified as Reference 4 below) in FIG. 10.21, FIG. 10.25, FIG. 10.40-FIG. 10.43 and FIG. 10.45, and the parallel mechanisms proposed in Reference "Development in Modern Mechanisms" (Huijun Zou, Feng Gao, Higher Education Press, 2007.4, simplified as Reference 5 below) in FIG. 2.34 to FIG. 2.37, Table 2.8 (except No. 6 and No. 10), FIG. 4.29, FIG. 4.31 to FIG. 4.40 and FIG. 4.42 to FIG. 4.49 can all be used as generating element directly, wherein the mechanisms disclosed in FIG. 4.43, FIG. 4.46 and FIG. 4.49 of Reference 5 have been used in certain embodiments of the present application (Embodiment 9, 7, 19). Reference 4 and Reference 5 comprise many parallelogram kinematic pairs. Mechanisms disclosed in FIG. 7.6 of Reference 3 and FIG. 12-4 of Reference 1 have similar structures and can also be used for conducting symmetrical transformation.

The three-dimensional spherical rotation parallel mechanism proposed in FIG. 7.10 of Reference 2 can be used as a generating element. In most three-dimensional spherical rotation parallel mechanisms, by applying Kinematic Pair No. 14 reflective multiple-movable-platform parallel robots can be achieved, and by applying Kinematic Pair No. 24, translational multiple-movable-platform parallel robots can be achieved.

The translational three-rotational parallel mechanism proposed in FIG. 10.9 of Reference 2 and the 5-DOF parallel mechanism proposed in FIG. 11.7 of Reference 2 can both be used as a generating elements. By connecting in series Kinematic Pair No. 14, reflective multiple-movable-platform parallel robots can be achieved, and by connecting in series Kinematic Pair No. 24, translational multiple-movable-platform parallel robots can be achieved.

Most of the three-translational and one-rotational parallel mechanisms proposed in FIG. 9.10 of Reference 2 can be directly used as generating elements for conducting reflective transformation. The revolute pair is a generating element for an active pair, and translational transformation can be achieved by connecting in series a Kinematic Pair No. 25. With the cooperation of Kinematic Pair No. 40, rotational transformation can be achieved. Sliding pair is the generating element for an active pair, and translational transformation can be achieved by connecting in series a Kinematic Pair No. 34; with reference to Kinematic Pair No. 40 and Kinematic Pair No. 25, rotational transformation can also be achieved by them.

For any parallel mechanism, if the first kinematic pair of each chain is an active pair and is the unique active pair of this chain, this parallel mechanism can be used as a generating element. All of them can be used for generating branch parallel mechanisms having various symmetrical characteristics.

Based on the property of the symmetricity, the newly generated branch parallel mechanism can also be used as a generating element to form a new branch parallel mechanism. The branch base platform can also expand from the auxiliary output end. As an example that can be seen from Embodiment 15, the right side branch parallel mechanism can be used as the fundamental parallel mechanism to conduct reflective transformation. In this way, a reflective the branch parallel mechanism is obtained, and this branch parallel mechanism is the sliding reflective parallel mechanism of the original fundamental parallel mechanism. Embodiment 20 can also be formed by conducting transformation of the branch parallel mechanism of Embodiment 2 by rotating it by 90 degrees. It can be understood with reference to the description to Embodiment 12.

(IX) Other Instructions

1. Unification and standardization of active pairs: for the same multiple-movable-platform parallel robot, it is preferred that the active pairs are of the same type of kinematic pairs. In this way, It is convenient to produce and control, and convenient to achieve standardization. If the kinematic pairs are not of the same type, a varying output kinematic pair can be connected in series, so that the input kinematic pairs become the same type.

2. Numbering of generalized kinematic pairs: the kinematic pairs are numbered from the base platform, the kinematic pair mounted to the base platform is the No. 1 kinematic pair; the kinematic pair connected with No. 1 kinematic pair is No. 2; and so on.

3. Definition of the orientation of the fundamental parallel mechanism: assuming that the fundamental parallel mechanism base platform is in a planar horizontal state, and the definition to upper, lower, left and right is based on this horizontal position. That is, even if it is rotated, the base platform is still regarded as horizontal, and the original description to upper, lower, left and right is still effective. When the fundamental parallel mechanism is located above the base platform, the lower end of the main chain refers to the end of the main chain that is connected with the base platform, and the upper end of the main chain, or called as tip end, refers to the end of the main chain that is connected with the moving platform.

4. For convenient expression, in the embodiments of the disclosure, the movable platform in many cases is in the form of a triangular movable platform; especially, in a 6-DOF parallel mechanism, a triangular movable platform is also used. Actually, in other possible patterns, various other types of movable platforms can be used, like point movable platform, line segment type movable platform, planar movable platform and table-like moving platform. For example, the movable platform of a parallel machine tool robot can be of a two-layer movable platform.

5. Differences and interconnections between expandable kinematic pairs, multiple-output kinematic pairs and boundary kinematic pairs: expandable kinematic pair refers to a kinematic pair before it expands from the auxiliary output end; after expanding from the auxiliary output end, it becomes a multiple-output kinematic pair, and an auxiliary output end can further expand from this multiple-output kinematic pair, and thus this multiple-output kinematic pair is still an expandable kinematic pair. A boundary kinematic pair must be a multiple-output kinematic pair, but is used in different conditions; when a downstream branch chain is mentioned, is corresponds to a boundary kinematic pair. For a determined branch parallel mechanism, the three concepts do not need to be distinguished. The components of the three all comprise an expandable interface, without loss of generality.

6. Two parallel leg mechanisms of a double-sided walking parallel robot: the two pairs of base platform planes are parallel to or located on a plane; the expression "are parallel to or located on a plane" is an expression used in engineering field. Actually, two pairs of base platform planes are substantially parallel with each other and relatively near each other; thus when they are fixedly connected together, a double-sided walking parallel robot can be formed. Here "relatively near" means that the distance between the two fundamental base platform planes is smaller than one fifth or less of the height of the double-sided walking parallel robot. When there is provided with a height difference, the heights of the inner and outer legs can be coordinated or the interference between chains can be reduced.

Operation procedure: it is classified into two conditions: time sharing operation and simultaneous operation.

Examples of simultaneous operation may be made to an assembling robot and a profiling parallel machine tool.

The operation procedure of a multiple-movable-platform parallel robot will be described with the 3T0R assembling robot of Embodiment 16 (FIG. 73) as an example. In the multiple-movable-platform parallel robot, there are totally one set of driving systems and one set of control system, the same main chains and the same fundamental movable platform. For a given object position, by applying a mathematic model for kinetics, the displacement of the active pair of the fundamental parallel mechanism is calculated; in accordance with this displacement, the driving system is provided with an instruction via the control system; the active pair is moved to a given position; the fundamental movable platform moves to the object position. Meanwhile, the branch movable platforms are all moved to their object positions. The branch movable platform achieves the same operation with the fundamental movable platform same. The operation of the parallel machine tool is similar to that of the assembling robot.

The operation of the profiling parallel machine tool is described below. On the operation table of the fundamental parallel mechanism on which the probe is mounted, a finished element (called as standard part) has already been mounted, a blank for an element to be machined (called as blank below) is mounted to an operation table of another branch parallel mechanism; a cutting tool is mounted to the movable platform of said another branch parallel mechanism. A control (manual or automatic control) probe moves to be closer to the standard part slowly, and the cutting tool moves to be closer to the blank slowly and starts the machining and cutting to the blank; the probe contacts the standard part, the cutting tool stops to be advanced. Changing the probe position, moving it slowly to approach the standard part, and starting the machining to another portion of the blank. The machining to the blank is finished when the probe has contacted with all portions of the standard part.

Time sharing operation will be described with the double-sided walking parallel robot as an example.

Normal upstanding state: when the movable platforms of two fundamental parallel leg mechanisms (foot arches) are at a lower position, the two leg mechanisms are alternatively lifted up (foot moving phase) and put down (foot standing phase) to finish a walking action. Although another pair of parallel leg mechanisms are also moved, they do not finish any operation, i.e., they are "idle".

Reversed state: when the walking parallel robot is turned over by 180 degrees resulted in an unforeseen condition, two branch parallel mechanisms are located at a lower position, and two fundamental parallel mechanisms are located at an upper position. In this way, two branch parallel leg mechanisms are alternatively lifted up and put down to finish a walking action. Two fundamental parallel leg mechanisms are in "idle" state.

Standing-by-side state: when the base platform plane is in a state of nearly perpendicular to the horizontal plane (this is also an unforeseen state), and it cannot recover the normal upstanding state or recover the reversed state, neither of the parallel leg mechanisms on opposite sides of the base platform plane can finish a walking action. Now, the side ring of the walking parallel robot reaches the ground, and the toes contact with a side wall (or a supporting object). A method can be used for changing the weight center of the walking parallel robot; for example, the weight center can be changed by leg movement, the weight center can be changed by changing the position of the center of the ring by means of contracted returning ring; thus, the robot achieves rolling, or toes moving, applying a force to the side wall or supporting object, and so achieves the rolling of the walking parallel robot so that it comes back to the normal upstanding or reversed state. In this way, the walking parallel robot can move in various conditions. Thus, the walking parallel robot can finish a walking task in various states.

Significances and advantages of certain embodiments will be described below:

Certain embodiments in the present application may be mainly used in the field of industrial robots; it can perform welding, machining and assembling, handling, panting, detecting, stacking, punching, membrane applying, scrubbing, grinding and polishing, and laser treating and other complex operations to a plurality of operation objects at one time.

The present application discloses the following meaningful work: 1. There provides a method for generating a multiple-movable-platform parallel robot for parallel mechanism that meet some requirements. The method is applicable in some existing parallel mechanisms, and can perform one or two symmetrical operations. For example, existing Delta mechanisms, if not modified, can only be used for conducting reflectively symmetrical transformation, but cannot be used for conducting translationally symmetrical transformation on a base platform plane. 2. There provides an orthogonal direction-varying and orthogonal double-changed multiple-output kinematic pair and a corresponding method; in this method, the orthogonal direction-varying and orthogonal double-changed multiple-output kinematic pair is connected in series to the input end of the main chain of the generating element; by the generating element, many types of symmetrical transformations can be conducted. The transformations include four basic symmetrical transformations and scaled symmetrical transformation. Examples can be seen from Embodiment 15, in which translational transformation in another direction can be conducted. 3. There provides an arbitrary-direction-varying and arbitrary double-changed multiple-output kinematic pairs and a corresponding method; in this method, the arbitrary-direction-varying and arbitrary double-changed multiple-output kinematic pair is connected in series to the input ends of some parallel mechanism chains; after connection in series, these parallel mechanisms become generating elements which can be used for conducting many types of symmetrical transformations. By means of this idea, an original parallel mechanism that does not meet the requirements can be converted into a fundamental parallel mechanism that meets the requirements to achieve symmetrical transformation. In this way, any parallel mechanism, in which all the first kinematic pairs are active pairs or only the first kinematic pair is an active pair, can be used as the fundamental parallel mechanism. Examples can be seen from Embodiment 16, in which translational transformation can be conducted for a Delta parallel mechanism. 4. There provides the structure and device of a scaled multiple-movable-platform parallel robot, and thus it becomes possible that the generating element is used for conducting many types of scaled symmetrical transformations, and a possible pattern is provided for achieving multi-dimensional scaling and machining. Examples can be seen from Embodiment 25. 5. There provides the concept and structure of a scaled symmetrical multiple-output kinematic pair, in which operational patterns of generating elements for conducting many types of scaled symmetrical transformations are increased. For example, Kinematic Pair No. 26, Kinematic Pair No. 27. 6. There provides the concept, structure and examples of symmetrical multiple-output kinematic pair, by means of which, conditions for generating various multiple-movable-platform parallel robots are created.

In summary, embodiments of the present application have the following advantages: relatively broad applications and a low error rate; easy to be repaired; simple structure; convenience in standardization; high productivity; relatively low cost. For example, certain embodiments of the present application, when applied in parallel machine tools or assembling robots, two or more parts can be machined at the same time by means of one set of driving system and one set of control system; the working efficiency is increased significantly; conditions for parallel assembling line are also created. If applied in profiling parallel machine tools, one or more products exactly the same with a real body can be produced by profiling in accordance with the real body. If applied in scaling parallel machine tools, one or more enlarged or shrunk products can be produced in accordance with the real body. If applied in walking parallel robots, by means of one set of driving system and one set of control system, the robot can still walk in the condition that the robot is turned over by 180 degrees, so the ability of coping with complex conditions is increased greatly.

BRIEF DESCRIPTION OF THE DRAWINGS

FIG. 1 to FIG. 57 are schematic views of Kinematic Pair No. 1 to Kinematic Pair No. 57. Corresponding relations between them are listed below: FIG. 1 is a schematic view of Kinematic Pair No. 1; FIG. 2 is a schematic view of Kinematic Pair No. 2; FIG. 3.1 and FIG. 3.2 are schematic views of Kinematic Pair No. 3; FIG. 4 is a schematic view of Kinematic Pair No. 4; FIG. 9.1 and FIG. 9.2 are schematic views of Kinematic Pair No. 9; FIG. 57 is a schematic view of Kinematic Pair No. 57.

FIG. 58 to FIG. 88 are schematic views of 33 embodiments.

FIG. 58 to FIG. 65 are schematic views of reflectively symmetrical type Embodiment 1 to Embodiment 8. FIG. 58 is a schematic view of Embodiment 1; FIG. 59 is a schematic view of Embodiment 2; FIG. 60 is a schematic view of Embodiment 3; FIG. 61 is a schematic view of Embodiment 4; FIG. 62 is a schematic view of Embodiment 5; FIG. 63 is a schematic view of Embodiment 6; FIG. 64 is a schematic view of Embodiment 7; FIG. 65 is a schematic view of Embodiment 8.

FIG. 66 to FIG. 76 are schematic views of translationally symmetrical type Embodiment 9 to Embodiment 19. FIG. 66 is a schematic view of Embodiment 9; FIG. 67 is a schematic view of Embodiment 10; FIG. 68 is a schematic view of Embodiment 11; FIG. 69 is a schematic view of Embodiment 12; FIG. 70 is a schematic view of Embodiment 13; FIG. 71 is a schematic view of Embodiment 14; FIG. 72 is a schematic view of Embodiment 15; FIG. 73 is a schematic view of Embodiment 16; FIG. 74 is a schematic view of Embodiment 17; FIG. 75 is a schematic view of Embodiment 18; FIG. 76 is a schematic explosive view of Embodiment 19.

FIG. 77 to FIG. 78 are schematic views of rotationally symmetrical type Embodiment 21 to Embodiment 22. Embodiment 20 has the same schematic view with FIG. 59 (Embodiment 2); FIG. 77 is a schematic view of Embodiment 21; FIG. 78 is a schematic view of Embodiment 22.

FIG. 79 and FIG. 80 show rotationally symmetrical type embodiments. FIG. 79 is a schematic view of Embodiment 23; FIG. 80 is a schematic view of Embodiment 24.

FIG. 81 to FIG. 84 are schematic views of scaled symmetrical type Embodiment 25 to Embodiment 28. FIG. 81 is a schematic view of Embodiment 25; FIG. 82 is a schematic view of Embodiment 26; FIG. 83 is a schematic view of Embodiment 27; FIG. 84 is a schematic view of Embodiment 28.

FIGS. 85.1 and 85.2 and FIG. 86 are schematic views of double-sided symmetrical type walking parallel robot Embodiment 29 and Embodiment 30. FIG. 85.1 is a schematic top view of Leg A and Leg B of Embodiment 29; FIG. 85.2 is a schematic top view of Leg A and Leg B of Embodiment 29 mounted with fixed returning rings. FIG. 86 is a schematic top view of adjustable returning ring portions of a double-sided walking parallel robot of Embodiment 30. Embodiment 31 has a view shown in FIG. 86.

FIG. 87 is a schematic explosive view of reflectively symmetrical type Embodiment 32 in which downstream chains are combined. FIG. 88 is a schematic top view of walking parallel robot Embodiment 33 in which downstream chains are combined.

LIST OF REFERENCE NUMERALS AND SIGNS

Figure 19:
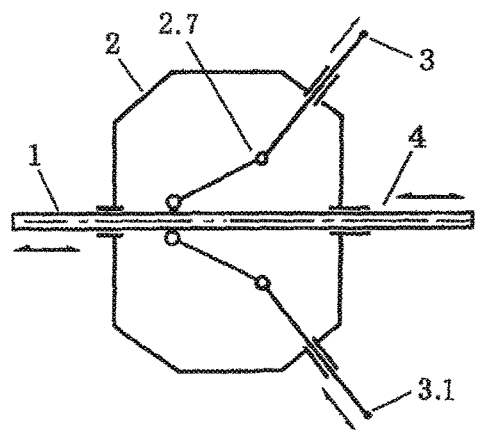
Figure 20:
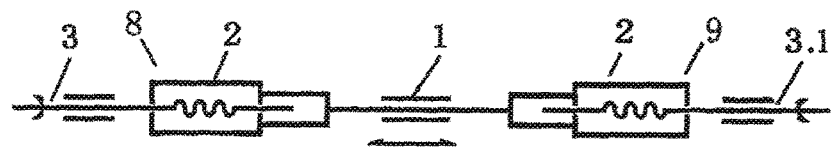
FIG. 20 is a schematic view of Kinematic Pair No. 20, and so on. Ultimately

Reference numerals of multiple-output kinematic pairs: input end of multiple-output kinematic pair (simplified as input end) 1; movement converting device of multiple-output kinematic pair (simplified as converting device) 2; gear 2.1; bevel gear 2.2; gear rack 2.3; intermediate gear 2.4; parallelogram side rod 2.5; Sarrus mechanism side rod 2.6; linkage mechanism 2.7; main output end of multiple-output kinematic pair (simplified as the main output end) 3; auxiliary output end of multiple-output kinematic pair (simplified as the auxiliary output end), or the first auxiliary output end is represented by 3.1, and when the same multiple (double)-output kinematic pair has a plurality of output ends, represented respectively by 3.2, 3.3, 3.4, 3.5; in the same branch parallel mechanism, if the expanding points of the symmetrical multiple-output kinematic pairs are different, the symmetrical multiple-output kinematic pairs are different, and the main output ends are also different; the main output ends are represented respectively by 3a, 3b, 3c, corresponding auxiliary output ends are represented respectively by 3a.1, 3b.1, 3c.1; expandable interface device of multiple (double)-output kinematic pair (simplified as interface device) 4, interface connecting devices 4.1; parallelogram A-type mechanism 5, with output end on one side; 6, parallelogram B-type mechanism 6, with output end on a revolute pair; Sarrus mechanism 7; RHP movement-converting complex kinematic pair 8; PHR movement-converting complex kinematic pair 9; single-input and single-output (or double-output) output complex kinematic pair 10 with direction-varying gears (like the structure of Kinematic Pair No. 14);

Reference numerals in embodiments: fundamental parallel mechanism 11; branch parallel mechanism or first branch parallel mechanism 11.1; second branch parallel mechanism 11.2; third the branch parallel mechanism 11.3; and so on; fundamental base platform 12; hinge point of fundamental base platform represented by reference numeral B0; there is only one fundamental base platform; active pair of or active pair input end in main chain 12a; when all the active pairs are the same, 12a represents the active pairs (or the input ends of the active pair); the branch base platform 12.1; when there are a plurality of branch base platforms, first branch base platform 12.1, second branch base platform 12.2, third the branch base platform 12.3; and so on; hinge points of branch base platform are represented directly by reference numerals B1, B2, B3, but most reference numerals are not marked in the figures; main chains 13; when the main chains of the fundamental parallel mechanism are different, they are distinguished by left, middle and right or are represented by reference numeral 13a; branch chain 13.1; when there are a plurality of branch parallel mechanisms, the branch chains in different branch parallel mechanisms are distinguished by branch chain 13.1 and branch chain 13.3, and so on; if the branch chains of the same branch parallel mechanism are different, they are distinguished by left, middle and right or are represented by reference numeral 13a.1; downstream main chains or downstream main rod element 14; if the downstream main chains of the fundamental parallel mechanism are different, they are distinguished by left, middle and right, or represented by reference numeral 14a; auxiliary branch chain or downstream branch rod element or downstream branch chain 14.1; when there are a plurality of branch parallel mechanisms, the auxiliary branch chains or downstream auxiliary branch chains are distinguished by downstream auxiliary branch chain 14.1, downstream auxiliary branch chain 14.2, downstream auxiliary branch chain 14.3, and so on; if the auxiliary branch chains of the same branch parallel mechanism are different, they are distinguished by left, middle and right, or are represented by reference numeral 14a.1, or are only described without any reference numeral; fundamental movable platform 15; there is only one fundamental movable platform; branch movable platform 15.1; when there are a plurality of branch movable platforms, they are distinguished by branch movable platform 15.1, branch movable platform 15.2, branch movable platform 15.3, and so on; symmetrical multiple-output kinematic pair 16; expandable kinematic pair 16a; boundary kinematic pair 16b; if the expanding points of the symmetrical multiple-output kinematic pairs of the same branch parallel mechanism are different, they are represented by 16.1, 16.2 and 16.3; for a walking parallel robot, Leg A multiple-output kinematic pair 16.4; for a walking parallel robot, Leg B multiple-output kinematic pair 16.5; manipulator 17; detecting sensor or probe 18; servo-motor 19; servo-motorized push rod 20.

Reference numerals of double-sided walking parallel robots: Leg A 31.1; Leg A fundamental parallel mechanism 21.1; Leg A branch parallel mechanism 21.3; Leg B 31.2; Leg B fundamental parallel mechanism 21.2; Leg A fundamental base platform 22.1; Leg A fundamental base platform 22.1; Leg B fundamental base platform 22.2; Leg B fundamental base platform 22.2; hip joint (four base platforms, as two pairs, fixedly connected together) 23; Leg A chain 34.1; Leg A main chain 24.1; Leg B chain 24.2; Leg B main chain 34.2; Leg A foot arch 25.1; Leg A fundamental movable platform foot arch 25.1; Leg B foot arch 25.2; Leg B fundamental movable platform foot arch 25.2; Leg A toe 26.1; Leg A fundamental movable platform toe 26.1; Leg B toe 26.2; Leg B fundamental movable platform toe 26.2; returning ring 27, 28; link rod 28, 29; arched rod 29, 30; contracted mechanism 30;

Common or shared multiple-output kinematic pair 31; when there are two multiple-movable-platform parallel robots, the common multiple-output kinematic pairs are represented by 31a, 31b; common main output end 32, common auxiliary output end 32.1; common downstream main chain 33; common auxiliary branch chain 33.1.

DETAILED DESCRIPTION OF PREFERRED EMBODIMENTS

Now some typical embodiments will be described with reference to the drawings, including typical embodiments of reflectively symmetrical type, translationally symmetrical type, rotationally symmetrical type, slidingly reflectively symmetrical type, scaled symmetrical type, and other composite symmetrical type multiple-movable-platform parallel robot.

In all the embodiments, the branch base platform is symmetrical with the fundamental base platform; each auxiliary output end is symmetrical with the main output end; the auxiliary branch chain is symmetrical with the downstream main chain; the branch movable platform is symmetrical with the fundamental movable platform. It is the same in each of the embodiments. Thus, for saving words, we will describe this feature only for some typical multiplemovable-platform parallel robots and when it is necessary, and will not describe it repetitively.

In all the embodiments, a multiple-movable-platform parallel robot "comprises a fundamental parallel mechanism 11 and one (or more) branch parallel mechanism 11.1; the fundamental parallel mechanism comprises a fundamental base platform 12, a main chain 13 and a fundamental movable platform 15; the branch parallel mechanism comprises a branch base platform 12.1, the branch chain 13.1 and a branch movable platform 15.1." The above expression between the quotation marks as well as the reference numerals used here are applied in the same manner in all the embodiments. Thus, for saving words, they will not be cited and described repetitively except for some typical embodiments.

Generalized kinematic pairs on a main chain will be numbered in a sequence of from bottom to top. For a given main chain, the kinematic pairs and their reference numerals are determined, and the active pair and the active pair input end are determined accordingly. For example, when it mentions simply that "the main chain is an RUS-chain", it means equally that "the first generalized kinematic pair is a revolute pair, the second generalized kinematic pair is a Hooke joint, and the third generalized kinematic pair is a spherical pair", and it indicates at the same time that "the active pair is a revolute pair, which is a simple kinematic pair". If there is a complex kinematic pair, the complex kinematic pair will be expressed by its abbreviation within parentheses, with the first capital letter within the parentheses indicating the active pair input end. For example, a first generalized kinematic pair of chain (RGR) RR is (RGR), with the input end being the left one, a revolute pair. It is evident that this rule applies for all cases. Thus, unless necessary, we will not point out each of the first generalized kinematic pair, the second generalized kinematic pair and the third generalized kinematic pair, and will not point out each of the active pair or the active pair input end, etc.

In the following description, one or two embodiments will be described in details for each type of embodiments. For example, relatively detailed description is made to Embodiment 1, Embodiment 7, Embodiment 17 and Embodiment 19, while other embodiments are only simply described.

In the embodiments, capital letters with the following meanings are used: P represents sliding (translational) pair, R represents revolute pair or rotational DOF (degree of freedom), T represents translational DOF, H represents helical pair, U represents Hooke joint, U* represents pure-translational universal joint, S represents spherical (ball) pair. Capital letters appeared in some drawings have the same meanings. In addition, in the drawings, B0 represents fundamental base platform, B1, B2 and B3 represent various branch base platform.

(I) Reflectively Symmetrical Type Embodiments (Embodiments 1 to 8)

Embodiment 1

Embodiment 1 (FIG. 58) shows a first type of reflectively symmetrical type plane multiple-movable-platform parallel robot in which the fundamental parallel mechanism is 3-RRR (2T1R). The robot comprises a fundamental parallel mechanism 11 and a branch parallel mechanism 11.1. The fundamental parallel mechanism 11 comprises a fundamental base platform 12, main chains 13 and a fundamental movable platform 15. The branch parallel mechanism 11.1 comprises a branch base platform 12.1, a branch chain 13.1 and a branch movable platform 15.1. The fundamental base platform 12 is linear type base platform B0B0B0, having a fundamental base platform planar the plane of the fundamental parallel mechanism.

The fundamental parallel mechanism 11 is above the dotted line illustrated in this figure. The fundamental parallel mechanism 11 has a structure described below: the fundamental base platform 12 is a linear type base platform, and the fundamental base platform plane is within the plane of the parallel mechanism. The main chain 13 is an RRR chain, and the fundamental movable platform 15 is a line segment type movable platform. The first generalized kinematic pair of the main chain 13 is a revolute pair R, the revolute pair being formed as an active pair 12a, and the first generalized kinematic pair comprises a double-output kinematic pair 16 (with reference to Kinematic Pair No. 1, FIG. 1), the double-output kinematic pair 16 having a main output end 3 connected to a downstream main chain 14. The downstream main chain 14 is an RR chain. The downstream main chain is connected to the fundamental movable platform 15.

The branch parallel mechanism 11.1 is below the dotted line illustrated in this figure. The branch parallel mechanism has a structure described below: the branch base platform 12.1 is reflectively symmetrical with (can also be regarded as equivalent symmetry) the fundamental base platform 12. The branch chain 13.1 is an RRR chain, and the auxiliary branch chain 14.1 is an RR chain. The auxiliary branch chain 14.1 has the same structure with the downstream main chain 14, and the two are symmetrical with each other. The double-output kinematic pair 16 has an auxiliary output end 3.1 connected with the auxiliary branch chain 14.1. The auxiliary output end 3.1 is reflectively symmetrical with the main output end 3. The branch movable platform 15.1 is a line segment type movable platform. The branch movable platform 15.1 is reflectively symmetrical with the fundamental movable platform 15.

Embodiment 2

Embodiment 2 (FIG. 59) shows a first type of reflectively symmetrical type plane-symmetrical double-platform parallel robot in which the fundamental parallel mechanism is 3-PRR (2T1R). The main difference between it and Embodiment 1 is that they have different first generalized kinematic pairs, that is, Embodiment 1 has a revolute pair and Embodiment 2 has a sliding pair. The axis of the revolute pair of Embodiment 1 is perpendicular to the base platform plane, while the axis of the sliding pair of Embodiment 2 is within the base platform plane. Embodiment 2 is characterized in that the active pair 12.1 has a coincident axis, and the active pair is composed of three square tubes disposed one around another in movable fit. The smallest square tube is the active pair 12a of the right side chain with opposite ends of it being supported to form a sliding pair, upper and lower sides of the right part of the smallest square tube are provided with two output ends 3 and 3.1, and the two output ends are reflectively symmetrical with each other; the middle square tube is relatively shorter and is mounted around the smallest square tube, the middle square tube is the active pair of the middle chain, upper and lower sides of the right part of it are provided with two output ends 3 and 3.1, and the two output ends are reflectively symmetrical with each other; the largest square tube is the shortest one and is mounted around the middle square tube, the middle square tube is the active pair of the left side chain, upper and lower sides of the right part of it are provided with two output ends 3 and 3.1, and the two output ends are reflectively symmetrical with each other. The three main output ends 3 above the axis of the three square tubes are connected with three downstream main chains 14 (RR chain), and the three downstream main chains 14 are connected to a fundamental movable platform 15. The three auxiliary output ends 3.1 below the axis of the three square tubes are connected with three auxiliary branch chains 14.1 (RR chain), and the three auxiliary branch chains 14.1 are connected to a branch movable platform 15.1. The branch movable platform 15.1 is reflectively symmetrical with the fundamental movable platform 15. Other aspects can be understood with reference to Embodiment 1 and will not be described repetitively.

Embodiment 3

Embodiment 3 (FIG. 60) shows a second type of reflectively symmetrical type plane multiple-movable-platform parallel robot in which each main chain 13 is an RRR chain. Embodiment 3 may be regarded as a variant of Embodiment 1. Compared with Embodiment 1, the main difference between them is that they have different double-output kinematic pairs. In Embodiment 1, reflectively symmetrical double-output kinematic pairs are in the form of compasses as shown in FIG. 1, while in Embodiment 3, reflectively symmetrical double-output kinematic pairs are in the form of a straight rod as shown in FIG. 5. Structural change resulted from their different double-output kinematic pairs is that the lower branch parallel mechanism is shifted to the right side by a distance. Other aspects can be understood with reference to Embodiment 1 and will not be described repetitively.

Embodiment 4

Embodiment 4 (FIG. 61) shows a third type of reflectively symmetrical type plane-symmetrical multiple-movable-platform symmetrical parallel robot in which each main chain 13 is an RRR chain. This embodiment may also be regarded as a variant of Embodiment 1. Compared with Embodiment 1, the main difference between them is that they have different double-output kinematic pairs. In Embodiment 1, Kinematic Pair No. 1 is used, while in Embodiment 4, equivalent symmetrical Kinematic Pair No. 48 (FIG. 48) is used, and the movable platform is a two-point line segment type movable platform. The present embodiment has a symmetry characteristics during movement different from that of Embodiment 1. Other aspects can be understood with reference to Embodiment 1 and will not be described repetitively.

Embodiment 5

Figure 62:
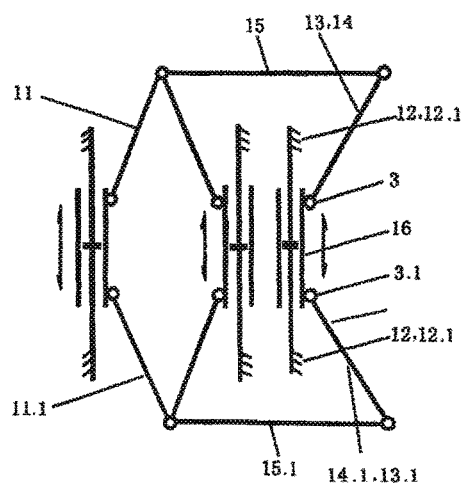

Embodiment 5 (FIG. 62) shows a reflectively symmetrical type plane-symmetrical multi-platform symmetrical parallel robot in which each chain is a PRR chain. This embodiment may be regarded as a variant of Embodiment 2. Compared with Embodiment 2, the main difference between them is that the double-output kinematic pair has a different mounting manner and the active pair axis is arranged in a different way. In Embodiment 2, the sliding pairs have a coincident axis and the output end moves in a left-right direction, while in Embodiment 5, the axes of the sliding pairs are parallel with each other, and the output end moves in an up-down direction. Two neighboring chains at the left side form an inverted V-shaped chain group and is connected with the movable platform via a composite hinge. The three-point line segment type movable platform is substituted here by a two-point line segment type movable platform, but the two types of platforms have no difference in function and thus we do not distinguish them. The present embodiment has a symmetry characteristics during movement different from that of Embodiment 1. Other structures can be understood with reference to Embodiment 2 and will not be described repetitively.

Embodiment 6

Embodiment 6 (FIG. 63) shows a reflectively symmetrical type plane multiple-movable-platform parallel robot in which the fundamental parallel mechanism is 1-(RP) RR&1-PRR&1-RRR (2T1R). In this embodiment, the main chains are different from each other. The robot comprises a fundamental parallel mechanism and a branch parallel mechanism. The fundamental parallel mechanism comprises a fundamental base platform 12, a main chain 13 and a fundamental movable platform 15. The branch parallel mechanism comprises a branch base platform 12.1, a branch chain 13.1 and a branch movable platform 15.1. The fundamental parallel mechanism 11 of it is above the dotted line illustrated in this figure. The fundamental base platform 12 is a linear type base platform, and the fundamental base platform plane is within the fundamental the plane of the parallel mechanism. (RH) of the main chain (RH) RR at left side is complex kinematic pair composed of a revolute pair and a helical pair, (RH) is an active pair 12a, and the revolute pair in (RH) is the active pair input end having an axis within the fundamental base platform plane. The complex kinematic pair (RH) is a double-output kinematic pair comprising a main output end 3 and an auxiliary output end 3.1. The main output end is reflectively symmetrical auxiliary output end. The main output end 3.1 of it is connected to a downstream main chain 14. The downstream main chain 14 is an RR chain. The auxiliary output end 3.1 is connected to a downstream branch chain (auxiliary branch chain) 14.1. The downstream branch chain 14.1 is an RR chain. The upstream portion of the main chain is an RH complex kinematic pair, and the upstream portion of the branch chain is also a complex kinematic pair, RH pair.

Figure 63:
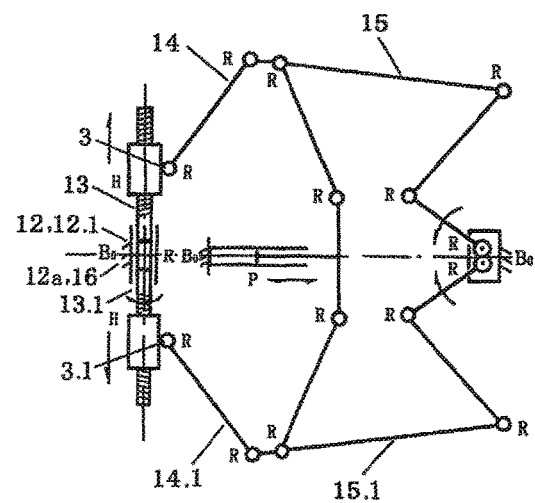

The main chain PRR in the middle of FIG. 63 is the same with the main chain of Embodiment 2, and can be understood with reference to Embodiment 2. The main chain RRR at the right side of FIG. 63 is the same with the main chain of Embodiment 1 and can be understood with reference to Embodiment 1.

Embodiment 7

Figure 64:
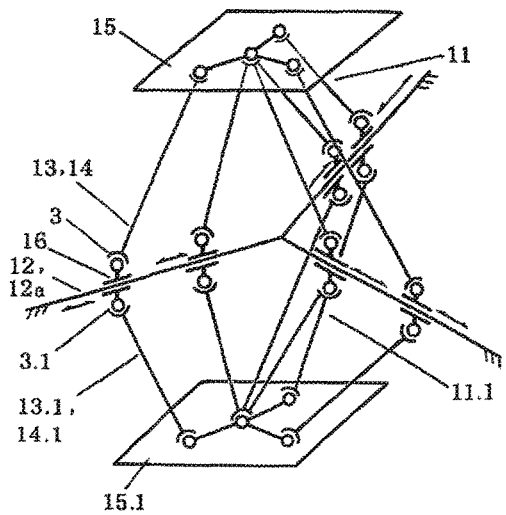

Embodiment 7 (FIG. 64) shows a reflectively symmetrical type spatial multiple-movable-platform parallel robot in which the fundamental parallel mechanism is 6-RSS (3T3R). The robot comprises a fundamental parallel mechanism 11 and a branch parallel mechanism 11.1. The fundamental parallel mechanism 11 is at the upper part of FIG. 64, and the branch parallel mechanism 11.1 is at the lower part of FIG. 64.

The fundamental parallel mechanism comprises a fundamental base platform 12, main chains 13 and a fundamental movable platform 15. The fundamental base platform 12 is a planar hexagonal base platform, and six main chains 13 are RSS chains connected to the fundamental movable platform 15. The fundamental movable platform 15 is a planar hexagonal moving platform. The revolute pair in each main chain 13 is an active pair 12a. The axis of each active pair 12a is perpendicular to the plane of the fundamental base platform 12, and the active pair 12a are uniformly distributed at the six apexes of the regular hexagon of the fundamental base platform 12. The revolute pair R is a double-output kinematic pair 16, and is also a boundary kinematic pair and expandable kinematic pair; the double-output kinematic pair 16 is a double-output kinematic pair which is symmetrical in the movement in the same direction (with reference to Kinematic Pair No. 4, FIG. 4). The main output end 3 is connected to a downstream main chain (SS chains) 14, and the downstream main chain is connected to the fundamental movable platform 15.

The branch parallel mechanism comprises a branch base platform 12.1, branch chains 13.1 and a branch movable platform 15.1.

The branch base platform 12.1 is reflectively symmetrical with the fundamental base platform 12. The double-output kinematic pair 16 has an auxiliary output end 3.1 connected with an auxiliary branch chain 14.1. The auxiliary branch chain is also an SS chain. Two output ends of the double-output kinematic pair 16 are reflectively symmetrical with each other with respect to the base platform plan. The branch movable platform 15.1 is a hexagonal movable platform is congruent to the fundamental movable platform 15. The branch movable platform 15.1 is reflectively symmetrical with the fundamental movable platform 14. Below the base platform plane is a reflectively symmetrical branch parallel mechanism 11.1. Six branch chains 13.1 are connected to a branch movable platform 15.1. The branch movable platform 15.1 and the fundamental movable platform 15 are reflectively symmetrical.

Embodiment 8

Figure 65:
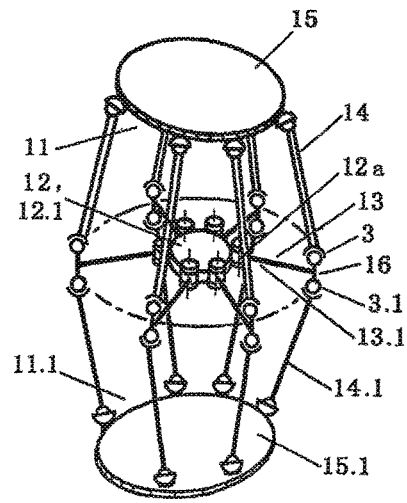

Embodiment 8 (FIG. 65) shows a reflectively symmetrical type spatial multiple-movable-platform parallel robot in which the main chains are of PSS type. The fundamental parallel mechanism 11 of it is a 6-PSS (3T3R) 6-DOF parallel spatial mechanism.

The fundamental base platform 12 is a planar base platform, and six main chains 13 (PSS chains) are connected to a fundamental movable platform 15. The fundamental parallel mechanism is located above the fundamental base platform plane, the sliding pairs P are the active pairs, the axes of the active pairs 12a are in the plane of the fundamental base platform 12, and the axes are arranged in Y-shape (starlike). On each of the three branch of the Y-shape, each branch has two sliding pairs, one at the inner side and the other at the outer side. Each sliding pair has two output ends, the upper one being a main output end 3, and the lower one being an auxiliary output end 3.1. The two output ends are reflectively symmetrical with each other. Above the base platform plane, there are six main output ends 3, with three main output ends on the outer side being connected with three downstream main chains 14. The three downstream main chains 14 are connected to the apexes of the triangle of the fundamental movable platform 15. Three main output ends on the inner side are connected with three downstream main chains, and then the three downstream main chains is connected with the fundamental movable platform 15 via a composite spherical pair. The composite spherical pair is located at the center of the triangle of the fundamental movable platform 15.

Below the plane of the fundamental base platform 12, there are six auxiliary output ends 3.1, with three auxiliary output ends 3.1 on the outer side being connected with three auxiliary branch chains 14.1. The three auxiliary branch chains 14.1 are connected to the apexes of the triangle of the branch movable platform 15. Three auxiliary output ends on the inner side are connected with three auxiliary branch chains 14.1, and then the three auxiliary branch chains 14.1 are connected with the branch movable platform 15.1 via a composite spherical pair. The composite spherical pair is located at the center of the triangle of the branch movable platform 15.1.

Six branch chains 13.1 are connected to a branch movable platform. The branch movable platform is reflectively symmetrical with the fundamental movable platform. below the base platform plane, there is a reflectively symmetrical branch parallel mechanism. The branch movable platform and the fundamental movable platform are reflectively symmetrical. The two parallel mechanisms are reflectively symmetrical with each other.

(II) Translationally Symmetrical Type Multi-Platform Symmetrical Parallel Robot Embodiments (Embodiments 9-19)

Embodiment 9

Figure 66:
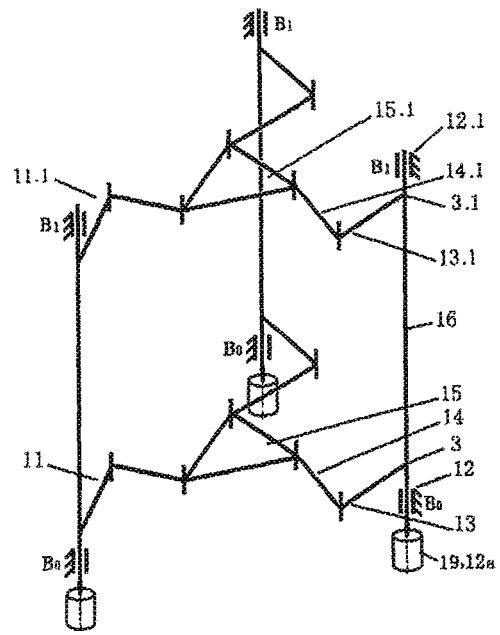

Embodiment 9 (FIG. 66) has a fundamental parallel mechanism that is a 3-RRR (2T1R) planar parallel mechanism. This embodiment comprises a fundamental parallel mechanism 11 and a branch parallel mechanism 11.1. The fundamental parallel mechanism is at the lower part of FIG. 66. The branch parallel mechanism is at the upper part of FIG. 66. All the axes of the revolute pairs are perpendicular to the base platform plane.

The fundamental parallel mechanism comprises a fundamental base platform 12, main chains 13 and a fundamental movable platform 15. The fundamental base platform 12 is a triangular base platform (triangle B0B0B0) in the planar parallel mechanism plane, each main chain 13 is an RRR chain, the first revolute pair is an active pair 12a, and the first revolute pair comprises an expandable kinematic pair 16a which becomes a double-output kinematic pair 16 when an output end is expanded from it. The main output end 3 is connected to a downstream main chain 14, and the axes of three active pairs are perpendicular to the plane of the base platform 12. Each active pair is driven by a servo motor 19. The fundamental movable platform 12 is a triangular movable platform. The fundamental base platform triangle is larger, while the triangle of the fundamental movable platform 15 is smaller.

The branch parallel mechanism 11.1 comprises a branch base platform 12.1, branch chains 13.1 and a branch movable platform 15.1. The axis of each revolute pair is perpendicular to the plane of the base platform 12. The branch base platform 12.1 is a triangular base platform (triangle B1B1B1), and is translationally symmetrical with the fundamental base platform 12; each main chain 13 is an RRR chain, the first revolute pair is a multiple-output kinematic pair 16, the main output end 3 is translationally symmetrical auxiliary output end 3.1. The main output end 3.1 is connected to a downstream branch chain 14.1. The downstream branch chain 14.1 is the same with the downstream main chain 14, that is, being an RR chain. The branch movable platform 15.1 is a triangular movable platform, and the branch movable platform 15.1 is translationally symmetrical with the fundamental movable platform 15. The direction of translation coincides with the axis of the revolute pair. The direction of translation is perpendicular to the base platform plane (upwards).

Embodiment 10

Figure 67:
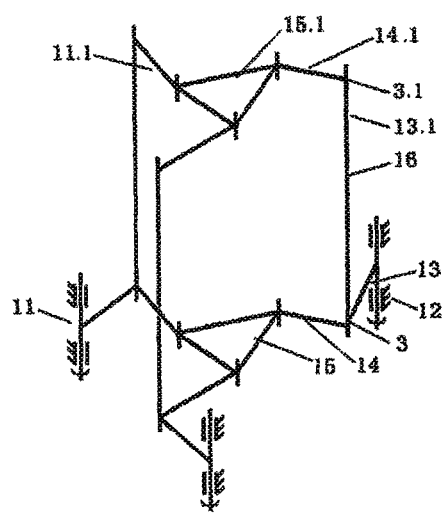

Embodiment 10 (FIG. 67) is a variant of Embodiment 9. In Embodiment 9, the multiple-output kinematic pair is the first generalized kinematic pair, the downstream main chain and the auxiliary branch chain are each an RR chain, and this auxiliary branch chain is a large branch chain. In Embodiment 22, the multiple-output kinematic pair 16 is the second generalized kinematic pair, the downstream main chain 14 and the auxiliary branch chain are each an R chain, and this auxiliary branch chain is a middle sized branch chain. The fundamental parallel mechanism 11 is at the lower part of FIG. 67. The branch parallel mechanism 11.1 is at the upper part of FIG. 67.

Embodiment 11

Figure 68:
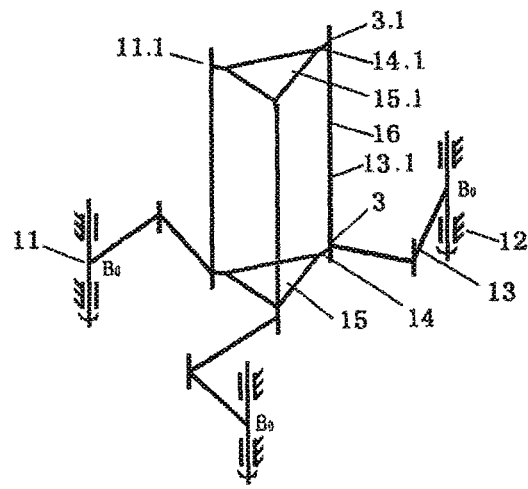

Embodiment 11 (FIG. 68) is another variant of Embodiment 9. In Embodiment 9, the multiple-output kinematic pair is the first generalized kinematic pair. The multiple-output kinematic pair 16 of Embodiment 11 is the third generalized kinematic pair, the downstream main chain 14 and the auxiliary branch chain 14.1 are each a rod element, the rod elements are connected with the movable platform. This auxiliary branch chain 14.1 is a small branch chain, and is a rod element (as shown in this Figure, is directly connected with the movable platform). The fundamental parallel mechanism is at the lower part of FIG. 68. The branch parallel mechanism is at the upper part of FIG. 68.

All of Embodiments 9, 10 and 11 have a translationally symmetrical multi-platform planar parallel mechanism. The three embodiments are different with each other in that their multiple-output pairs have different locations and the expanding points of the branch chains are different with each other. From Embodiments 9, 10 and 11, another type of multiple-movable-platform parallel robot can be derived. An auxiliary branch chain (large branch chain) is expanded from the first kinematic pair on one main chain, an auxiliary branch chain (middle sized branch chain) is expanded from the second kinematic pair on another main chain, and an auxiliary branch chain (small branch chain) is expanded from the third kinematic pair on the last main chain. The three branch chains are connected to a branch movable platform to form a branch parallel mechanism. In this symmetrical multi-platform planar parallel robot, different structural characteristics of Embodiments 9, 10 and 11 are incorporated.

Embodiment 12

Figure 69:
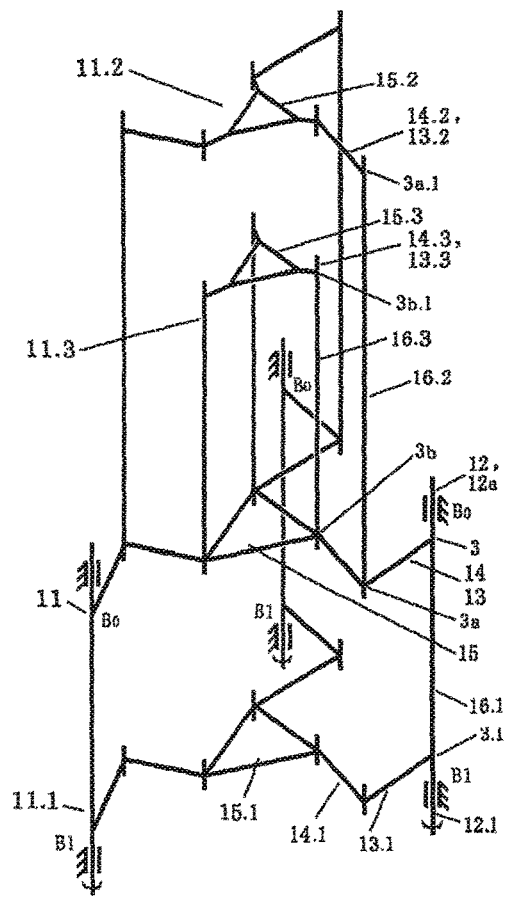

Embodiment 12 (FIG. 69) is an example in which the fundamental parallel mechanism has three branch parallel mechanisms. Three kinematic pairs on the main chain are each an expandable kinematic pair, each being a multiple-output kinematic pair having an expanded chain. This is resulted from the integration of Embodiments 9, 10 and 11. The three branch parallel mechanisms are translationally symmetrical with the fundamental parallel mechanisms.

The fundamental parallel mechanism is the second planar parallel mechanism 11. The lowermost one is a branch parallel mechanism 11.1, having a multiple-output kinematic pair 16.1 expanded from the first kinematic pair of the main chain. The main chain 13 and the branch chain 13.1 have the same structure and are translationally symmetrical. The downstream main chain 14 and the auxiliary branch chain 14.1 have the same structure and are translationally symmetrical.

The uppermost on is a branch parallel mechanism 11.2 which has a multiple-output kinematic pair 16.2 expanded from the second kinematic pair of the main chain. The downstream main chain 14 is an R chain, the auxiliary branch chain 14.2 is also an R chains, and the two are translationally symmetrical with each other. The two share the same upstream main chain.

The third one is a branch parallel mechanism 11.3 which has a multiple-output kinematic pair 16.3 expanded from the third kinematic pair of the main chain. The downstream main chain is a rod element fixedly connected with the branch movable platform directly. The auxiliary branch chain 14.2 is a rod element which is translationally symmetrical with the downstream main chain. The two share the same upstream main chain.

The two upper planar parallel mechanisms illustrated in the figure of the present embodiment share the same fundamental base platform with the fundamental parallel mechanism.

For the two lower planar parallel mechanisms illustrated in the figure of the present embodiment, only by switching the reference numerals of them, the two upper branch parallel mechanisms can be regarded as generated from the first branch parallel mechanism. That is to say, the first branch parallel mechanism 11.2 in the present embodiment can be used as a generating element for generating a new branch parallel mechanism. This is resulted from the symmetrical transfer characteristics.

In the direction of translation, more branch parallel mechanisms can be generated.

Embodiment 13

Embodiment 13 (FIG. 70) shows a first type of translationally symmetrical type plane-symmetrical double-moving-platform parallel robot in which the fundamental parallel mechanism is 3-PRR (2T1R). The robot comprises a fundamental parallel mechanism 11 and a branch parallel mechanism 11.1. The fundamental parallel mechanism comprises a fundamental base platform 12, a main chain 13 and a fundamental movable platform 16. The branch parallel mechanism comprises a branch base platform 12.1, a branch chain 13.1 and a branch movable platform 15.1.

Figure 21:
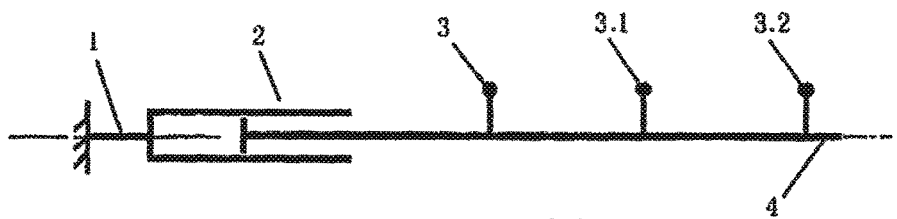
Figure 22:
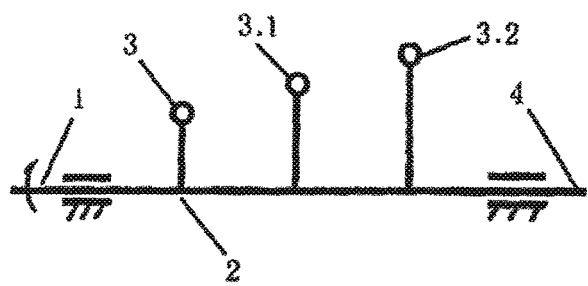
Figure 23:
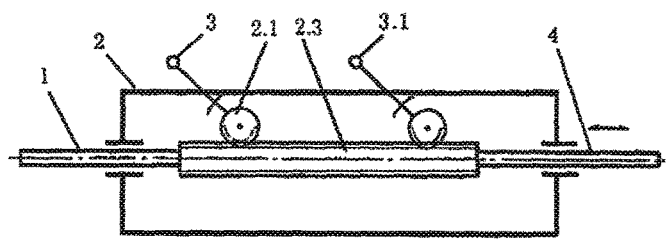
Figure 38:
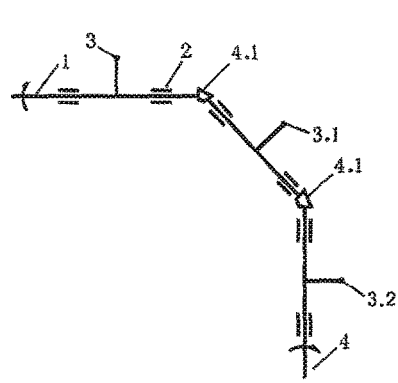
Figure 39:
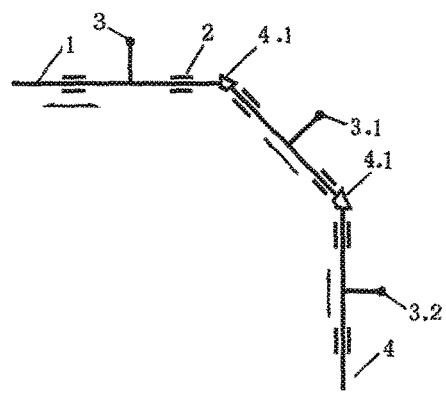
Figure 70:
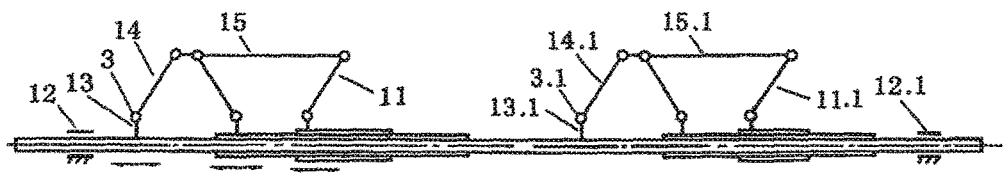

The fundamental parallel mechanism is located at the left side in FIG. 70. The fundamental parallel mechanism has a structure described below: the fundamental base platform 12 is a linear type base platform, and the fundamental base platform plane is within the plane of the parallel mechanism. The main chain 13 is a PRR chain, and the fundamental movable platform 15 is a line segment type movable platform. The first generalized kinematic pair of chain PRR is a sliding pair P, this sliding pair being an active pair, and the active pair having a coincident axis. The first generalized kinematic pair comprises a double-output kinematic pair 16 (with reference to FIG. 21), the double-output kinematic pair 16 having a main output end 3 connected to the downstream main chain 14. The downstream main chain 14 is an RR chain. The downstream main chain is connected to the fundamental movable platform 15. The fundamental movable platform is a line segment type movable platform, and the left side in FIG. 70 shows the fundamental parallel mechanism. The right side in FIG. 70 shows a translationally symmetrical branch parallel mechanism.

The active pair of Embodiment 13 is the same as the active pair of Embodiment 2, which is composed of three square tubes disposed one around another in movable fit, and the concrete structure of it can be understood with reference to Embodiment 2 (FIG. 59). The translationally symmetrical transformation of the active pair is achieved in the following way: there are three square tubes; the smallest square tube on the fundamental parallel mechanism is directly connected with the square tube on the branch parallel mechanism at a middle portion to form an integral body, and is supported at opposite ends, to be moveable synchronously; the middle square tube on the fundamental parallel mechanism is connected with the middle square tube on the branch parallel mechanism via two sides (not illustrated in this figure) where no output end is mounted, and thus the middle square tubes form an integral body to be moveable synchronously; the largest square tube on the fundamental parallel mechanism is connected with the largest square tube on the branch parallel mechanism via two sides (not illustrated in this figure) where no output end is mounted, and thus the largest square tubes form an integral body to be moveable synchronously.

The branch parallel mechanism has a structure described below: the branch base platform 12.1 is translationally symmetrical with the fundamental base platform 12. The branch chain 13.1 is a PRR chain, the auxiliary branch chain 14.1 is an RR chain. The auxiliary branch chain 14.1 is the same with the downstream main chain. The double-output kinematic pair 16 has an auxiliary output end 3.1 connected with the auxiliary branch chain 14.1. The auxiliary output end 3.1 is reflectively symmetrical with the main output end 3. The branch movable platform 15.1 is a line segment type movable platform. The branch movable platform is translationally symmetrical with the fundamental movable platform.

Embodiment 14

Figure 71:
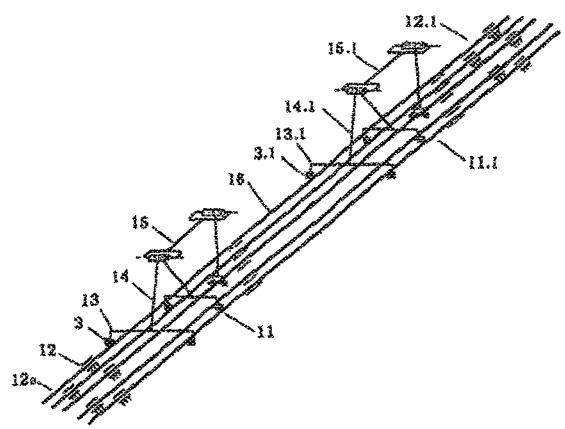

Embodiment 14 (FIG. 71) shows another type of planar parallel mechanism in which the fundamental parallel mechanism (generating element) is 3-PRR (2T1R). Embodiment 14 is fundamentally the same with Embodiment 13. The difference between them lies in the way of forming active pairs having a coincident axis. The parallel mechanism at the lower left side in FIG. 71 is the fundamental parallel mechanism, and the parallel mechanism at the upper right side is the branch parallel mechanism. Three active pairs have the following structures: three sliding pairs shown in the middle-to-lower portion in the figure are formed by five cylinder pairs. The middle cylinder pair acts as a sliding pair, and the other two sliding pairs are each formed by two parallel cylinder pairs, having an axis defined by the symmetrical axis of the two cylinder pairs; the outermost two cylinder pairs each have a revolute pair perpendicular to the axis of the cylinder pair at one end of the fundamental parallel mechanism, with the two revolute pairs being collinear, and the two co-axial revolute pairs are connected with a rod element to form a sliding pair. Another two cylinders each have a revolute pair perpendicular to the axis of the cylinder pair at one end of the fundamental parallel mechanism with the two revolute pairs being collinear, and the two co-axial revolute pairs are connected with a rod element to form a sliding pair. Other aspects can be understood with reference to Embodiment 2.

Embodiment 15

Embodiment 15 (FIG. 72) shows a multiple-movable-platform symmetrical planar parallel mechanism in which the fundamental parallel mechanism is 3-(RGR) RR (2T1R) parallel mechanism. The left side in FIG. 72 shows the fundamental parallel mechanism. This is a variant of Embodiment 9. The fundamental parallel mechanism of Embodiment 9 is a 3-RRR (2T1R) parallel mechanism, having an active pair axis perpendicular to the fundamental base platform plane. Embodiment 15 is distinguished in that: the first kinematic pair of the main chain is changed to a complex direction-varying kinematic pair (RGR) (with reference to Kinematic Pair No. 25) from the simple kinematic pair (revolute pair) in the former embodiment; the expression "(RGR)" means that the mechanism within the parentheses is a kinematic pair which is an integral pair. The axes of the main chain input end are changed to be coincident with the base platform plane and are parallel with each other from to be perpendicular to the base platform plane in the former embodiment. Thus, translational transformation can be achieved on the fundamental base platform plane to form a translationally symmetrical branch parallel mechanism.

The fundamental base platform 12 is a triangular base platform, the main chain 13 is (RGR) RR, and the fundamental movable platform 15 is a smaller triangular movable platform. The first generalized kinematic pair is an orthogonal-direction-varying multiple-output complex kinematic pair (RGR) (with reference to FIG. 25), with an input end axes being perpendicular to an output end axis. The input end is an active pair 12a. The input end axes of the three active pairs are all in the plane of the fundamental base platform 12, and are parallel with each other. The output ends of the orthogonal direction-varying complex kinematic pair (RGR) are parallel with each other and are perpendicular to the base platform plane; the main output end 3 is connected to a downstream main chain 14, and the downstream main chain 14 is connected to the fundamental movable platform 15. The branch parallel mechanism 11.1 is formed by means of translational transformation of the fundamental parallel mechanism 11 in the axis of the revolute pair, with details that can be seen FIG. 72 and will not be described repetitively. Embodiment 15 can be incorporated with Embodiments 9, 10 and 11 to achieve translational transformation in two directions. In this way, more translationally symmetrical branch parallel mechanisms in different directions can be formed.

Embodiment 16

Embodiment 16 (FIG. 73) shows a multiple-movable-platform parallel robot in which the fundamental parallel mechanism is 3-(RGR) (4S) (3T0R) spatial parallel mechanism and which has two branch parallel mechanisms. This fundamental parallel mechanism 11 is actually an improved Delta mechanism. In the original Delta mechanism, the first kinematic pair axis coincides with one side of the triangle, and can act as a reflectively symmetrical fundamental parallel mechanism based on which a reflectively symmetrical double-platform parallel robot can be obtained by means of structural synchronization, but no translationally symmetrical transformation can be made to it. Now we change the first kinematic pair (revolute pair) of the original Delta mechanism to a complex direction-varying kinematic pair (RGR), the complex direction-varying kinematic pair (RGR) having input end axes that are parallel with each other and output end axes that coincide with that of the input ends of the original Delta mechanism, and the structure of the original Delta mechanism remain unchanged. Now the Delta mechanism, after being changed, may act as a translationally symmetrical transformed fundamental parallel mechanism in the present embodiment.

The lower part in FIG. 73 shows the fundamental parallel mechanism (3-(RGR) (4S)) 11. The first generalized kinematic pair is a multiple-output complex direction-varying kinematic pair (RGR) 16, which can be understood with reference to Kinematic Pair No. 24 in FIG. 24. The complex direction-varying kinematic pair (RGR) 16 is an active pair. The input end axes 12a of the active pairs are parallel to the plane of the base platform 12 and are parallel with each other. By expanding an input end axes of the complex direction-varying kinematic pair (RGR), and performing translationally symmetrical transformation in the direction of this axis, an auxiliary output end 3.1 is formed. The translationally symmetrical transformation is performed to each complex direction-varying kinematic pair (RGR) to form three auxiliary output ends 3.1, the three auxiliary output ends are connected to a Delta mechanism, this Delta mechanism and the complex direction-varying kinematic pair which includes the auxiliary output end 3.1 form a branch parallel mechanism 11.1 (the middle parallel mechanism in FIG. 73), and the branch parallel mechanism 11.1 is translationally symmetrical with the fundamental parallel mechanism 11. using the same generation method performed to the first branch parallel mechanism 11.1, a second branch parallel mechanism 11.2 is obtained by the same translational transformation.

FIG. 73 shows three parallel mechanisms, one fundamental parallel mechanism and two branch parallel mechanisms. The three parallel mechanisms act as generating elements at the same time, so that three new branch parallel mechanisms are obtained by reflective transformation. In this way, a multiple-movable-platform parallel robot having five branch parallel mechanisms is obtained.

Embodiment 17

Embodiment 17 (FIG. 74) shows a reflectively symmetrical type spatial multiple-movable-platform parallel robot in which the first type of a fundamental parallel mechanism is 6-PSS (3T3R). The fundamental parallel mechanism of it is a 6-PSS (3T3R) spatial parallel mechanism. It comprises a fundamental parallel mechanism 11 and two branch parallel mechanisms 11.1. The fundamental parallel mechanism 11 is shown at the lower part in FIG. 74, and the two branch parallel mechanisms 11.1 are shown at the middle and upper parts in FIG. 74.

The fundamental parallel mechanism 11 comprises a fundamental base platform 12, a main chain 13 and a fundamental movable platform 15. The branch parallel mechanism comprises a branch base platform 12.1, a branch chain 13.1 and a branch movable platform 15.1.

The fundamental base platform 12 is a planar base platform, the main chain 13 is a PSS chain, and six main chains 13 (PSS chains) are connected to a fundamental movable platform 15.

The fundamental movable platform 15 is a triangular movable platform, the P pair is an active pair, and the active pair axes are within the base platform plane and are parallel with each other. The fundamental parallel mechanism 11 is located above the fundamental base platform plane, the axis of the active pair is in the plane of the fundamental base platform 12, the axes of the six active pairs are parallel with each other (not coincide). The sliding pair is an active pair, the active pair is driven by a servo-motorized push rod 20, the active pair is a double-output kinematic pair 16, and the double-output kinematic pair 16 is a double-output kinematic pair which is translationally symmetrical in the movement in the same direction (with reference to FIG. 21). One of the output ends is the main output end 3 which is connected to a downstream main chain 14, the downstream main chain is an SS chain, and the downstream main chain is connected to the fundamental movable platform 15.

The branch parallel mechanisms are described by using the middle branch parallel mechanism 11.1 as an example.

The branch base platform 12.1 is a planar base platform which is translationally symmetrical with the fundamental base platform. The branch chain 13.1 is an PSS chain, the branch chain is the same with the main chain, the branch chain is connected to the branch movable platform 13.1, and the branch movable platform is a triangular movable platform. The active pair axes are within the base platform plane and are parallel with each other. The double-output kinematic pair 16 has an auxiliary output end 3.1 which is translationally symmetrical with the main output end 3, and the auxiliary output end is connected with the auxiliary branch chain 13.1. The auxiliary branch chain is also an SS chains. Six branch chains 13.1 are connected to a branch movable platform 15.1. The branch movable platform 15.1 is a triangular movable platform congruent to the fundamental movable platform 15. The branch movable platform 15.1 is translationally symmetrical with the fundamental movable platform 15.

Embodiment 17 has two branch parallel mechanisms, wherein the upper part in FIG. 74 further shows a translationally symmetrical branch parallel mechanism 11.2. The generation method and the structure are the same with the middle branch parallel mechanism of FIG. 74 and will not be described repetitively.

Embodiment 18

Figure 75:
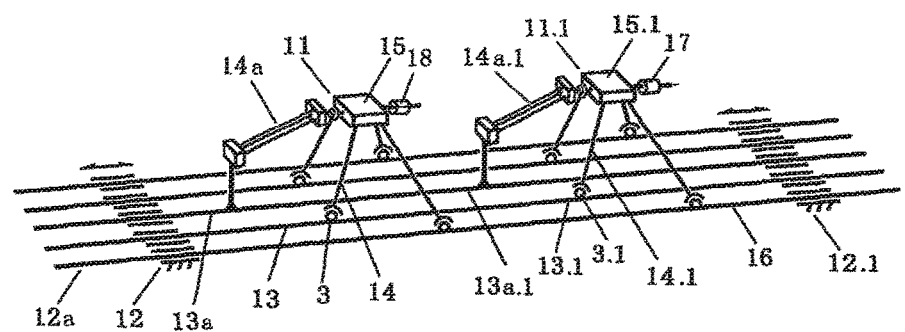

Embodiment 18 (FIG. 75) shows a fundamental parallel mechanism 11 is a 6-RSS (3T3R) spatial parallel mechanism. The fundamental base platform 12 is a planar hexagonal base platform (B0B0B0B0B0B0), the main chain 13 is an RSS chain, the fundamental movable platform 15 is a planar triangular movable platform, the R pair is an active pair 12a, and the active pair axes are within the base platform plane and are parallel with each other. The R pair is a multiple-output kinematic pair having translationally symmetrical output ends. At the left side of FIG. 75, under the horizontal plane of the fundamental base platform, there is a fundamental parallel mechanism 11. At the right side of FIG. 75, under the horizontal plane of the base platform, there is a branch parallel mechanism 11.1. The branch base platform is also a planar hexagonal base platform (B1B1B1B1B1B1). basic reference numerals in this figure are the same with those mentioned above, and the structure of them can be understood with reference to Embodiment 17 and will not be described repetitively.

Embodiment 19

Figure 76:
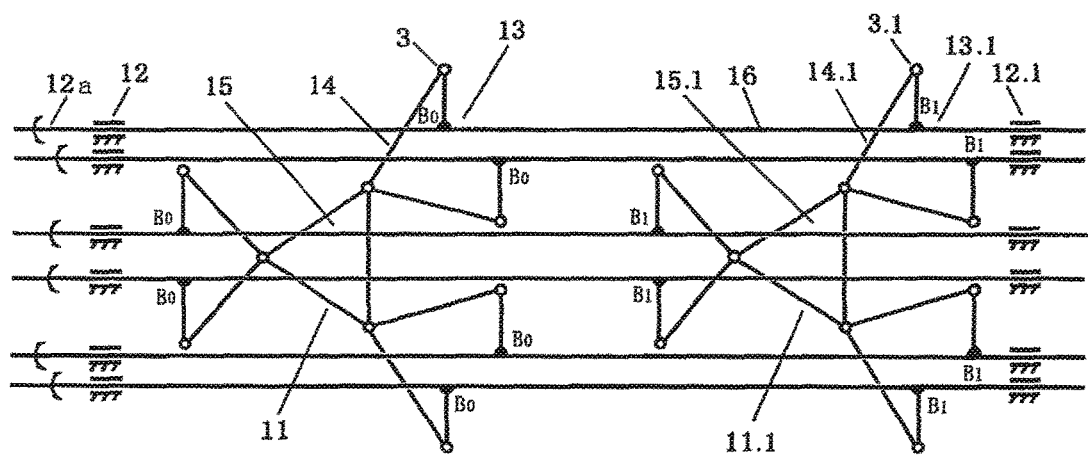

Embodiment 19 (FIG. 76) shows a horizontal parallel machine tool robot in which the fundamental parallel mechanism is a 4-PSS&1-PU*U type 5-DOF (3T2R). There are two types of main chains, one is PSS chain, the other is PU*U chain. The fundamental base platform 12 is a planar base platform. The main chains 13 comprise four PSS chains 13 and one PU*U chain 13a. The active pair 12a is a sliding pair. The axes of the active pairs are parallel with each other and are in the same plane. The sliding pair of the PU*U chain is located between other four active pairs. The active pair axis is co-planar with the fundamental base platform plane. The sliding pair is a translational type multiple-output kinematic pair 16, and the fundamental movable platform 15 is a pentagonal movable platform. The lower left side of the figure shows a fundamental parallel mechanism 11. The upper right side of the figure shows a branch parallel mechanism 11.1. The middle branch chains on the branch parallel mechanism are a PU*U branch chain 13a.1 and an auxiliary branch chain 14a. 1. On the fundamental movable platform, there is mounted with a sensor or probe 18 for sensing and detecting component boundary. On the branch movable platform, there is mounted with a manipulator 17. The fundamental parallel mechanism is translationally symmetrical with the branch parallel mechanism. basic reference numerals in this figure are the same with those mentioned above and will not be described repetitively. This is a profiling parallel machine tool robot, which can also act as a safe parallel machine tool robot.

By further conducting translationally symmetrical transformation along the direction of the axis of the active pair, more branch parallel mechanisms can be obtained to form a translational multiple-movable-platform parallel robot having more branch parallel mechanisms.

(III) Rotationally Symmetrical Type Multi-Platform Symmetrical Parallel Mechanism Embodiments (Embodiment 20-23)

Embodiment 20

Embodiment 20 (with reference to FIG. 59) is a planar parallel mechanism in which the fundamental parallel mechanism is 3-PRR (2T1R). The fundamental parallel mechanism is completely the same with Embodiment 2. Actually, Embodiment 2 is also a type of rotationally symmetrical type multiple-movable-platform parallel robot, which is formed by rotating the fundamental parallel mechanism around the axis of the sliding pair by 180 degrees. In the present embodiment, a branch parallel mechanism is added; that is, at the same side of each square tube, a new auxiliary output end is expanded from a symmetrical location that is rotated by 90 degrees from the original output end; three auxiliary output ends are each connected with an auxiliary branch chain, the three auxiliary branch chains are connected to a branch movable platform, and the branch movable platform is rotationally symmetrical with the fundamental movable platform. In this way, a new branch parallel mechanism is obtained, the new branch parallel mechanism being rotationally symmetrical with the fundamental parallel mechanism. The new branch parallel mechanism, together with the original branch parallel mechanism, a symmetrical three-moving-platform parallel robot having two branch parallel mechanisms is formed.

Embodiment 21

Figure 77:
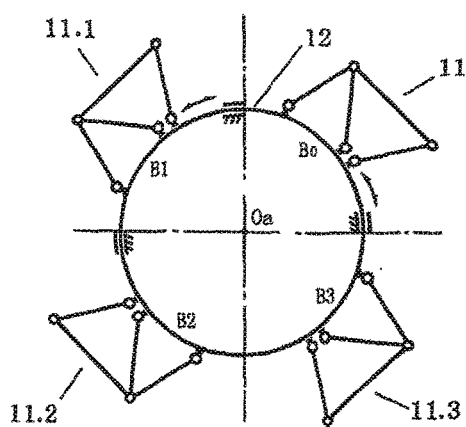

The fundamental parallel mechanism of Embodiment 21 (FIG. 77) is a 3-PRR (2T1R) planar parallel mechanism. The generating element is the same as that of Embodiment 14 (FIG. 71). Embodiment 21 is formed as a variant based on Embodiment 14. Embodiment 21 is formed in the following way: 1, the axis of the sliding pair of Embodiment 14 is expanded, and two branch parallel mechanisms 11.2 and 11.3 of the same type are added; together with the original branch parallel mechanism 11.1, a symmetrical four-moving-platform parallel robot is formed. The distance between two neighboring parallel mechanisms is $\pi D/4$, and the length of the axis of the sliding pair $\pi D$. Drawing a straight line Oa, which is perpendicular to the active pair axis, under the base platform plane, and with this straight line as an axis, bending the base platform plane around this axis to form a cylinder having a radius of D/2, and connecting the five cylinder pair axes as five circular rings. Four parallel mechanisms are located at the outer side of the cylinder. In this way, a rotationally symmetrical multiple-movable-platform parallel robot is obtained. The four parallel mechanisms each occupy a 90-degree sector space. FIG. 77 is a view of Embodiment 21 in the direction of axis Oa.

Embodiment 22

Figure 78:
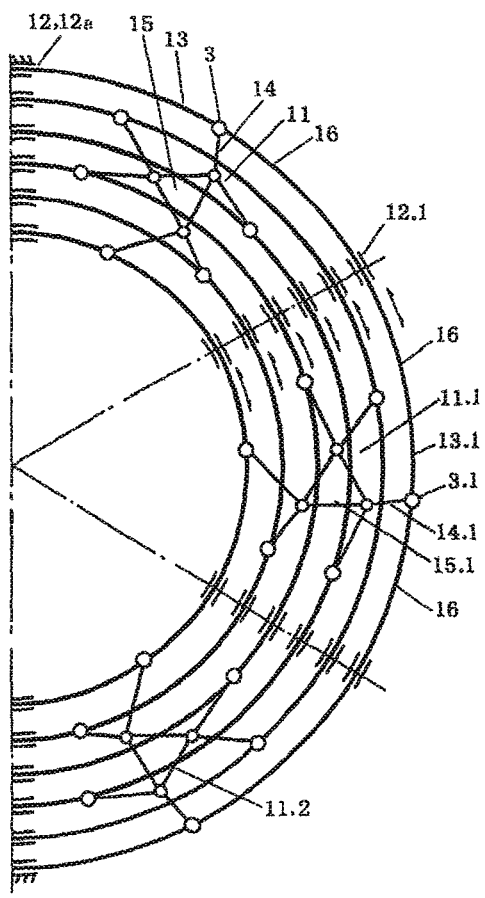

The fundamental parallel mechanism of Embodiment 22 (FIG. 78) is a 6-PSS (3T3R) parallel mechanism. Embodiment 22 is formed as a variant from Embodiment 17. The active pair axis of Embodiment 17 is further expanded, and three branch parallel mechanisms are added, so that there are totally six parallel mechanisms. The distance between two neighboring parallel mechanisms is $\pi D/6$, and the total length of the axis of the sliding pair is $\pi D$. At a side of six sliding pairs, drawing a straight line that is perpendicular to the base platform plane, and with this straight line as an axis, turning the axis of the inner side sliding pair into a circle having a radius of D/2, and turning the other five axes of the sliding pairs into five circles. The distance between the six circles remains to be the original distance when the axes are parallel with each other. In this way, a symmetrical six-platform parallel robot having a rotationally symmetrical configuration is obtained. The six parallel mechanisms are located respectively in six sector spaces. The six parallel mechanisms each occupies a 60-degree sector space. FIG. 78 is a top view of Embodiment 22. After variation, the base platform is still a planar platform; on the base platform plane, the active pair axes became circular rings (see the Figure), the six circles are concentric, and the six circular rings are all within the base platform plane. The six circular rings have different radius, each circular ring being supported on its own sliding track. The circular ring is divided into six sectors, and each sector occupies 60 degrees. The upper right sector is the fundamental parallel mechanism, and other sectors are the branch parallel mechanisms.

Figure 40:
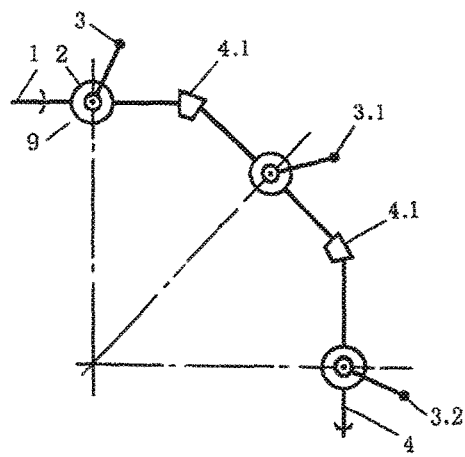
Figure 41:
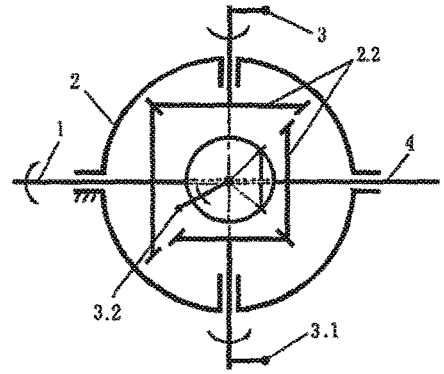
Figure 42:
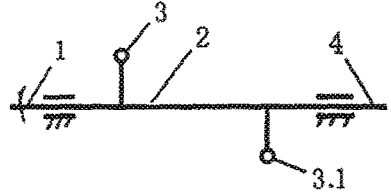
Figure 43:
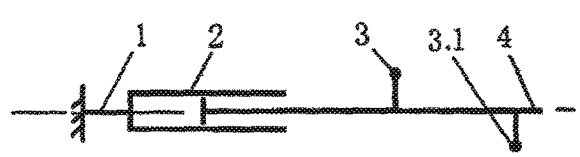
Figure 44:
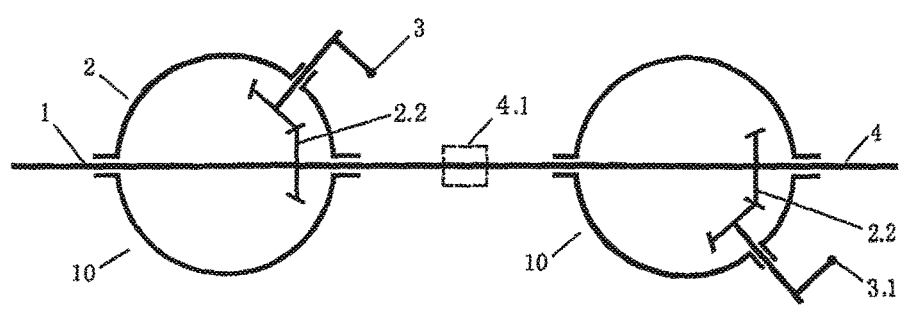
Figure 53:
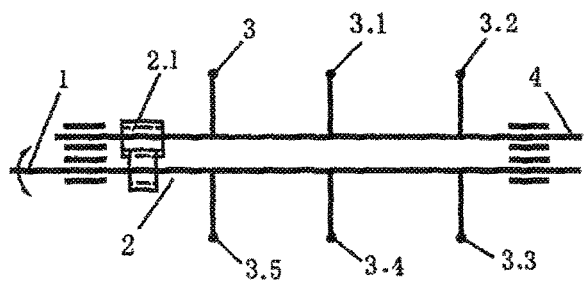
Figure 54:
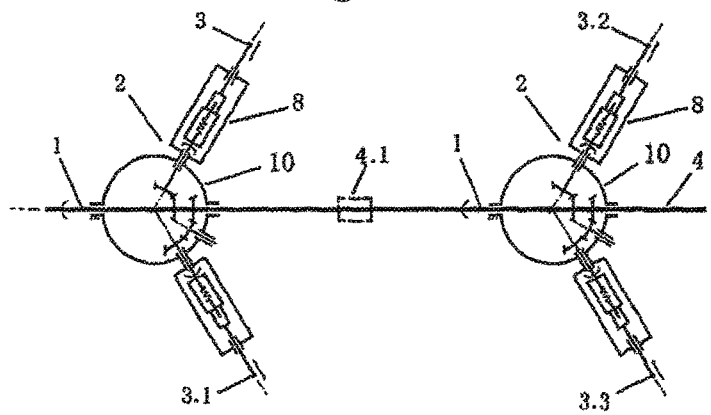
Figures 55, 56:
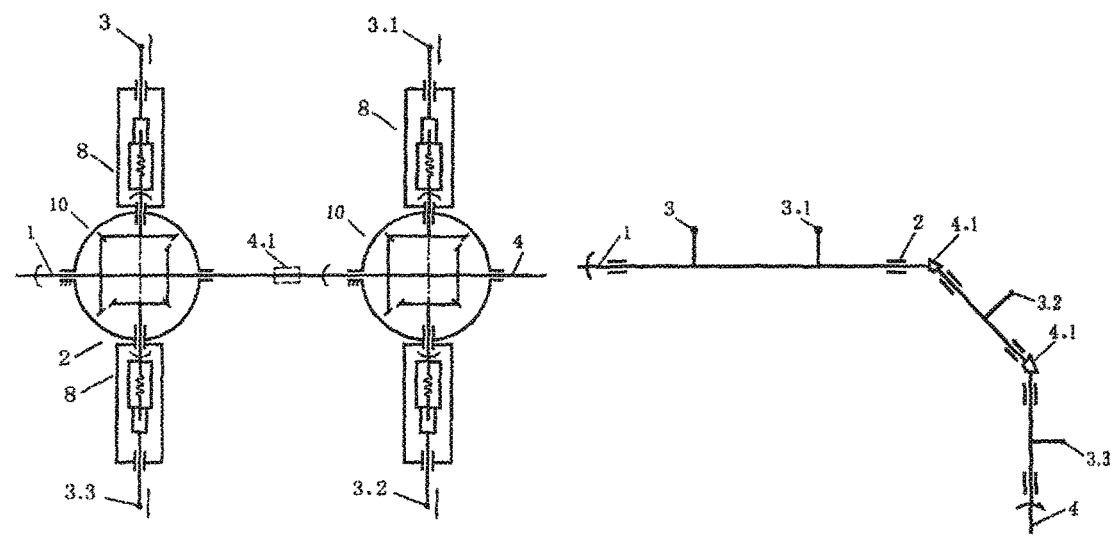

Embodiment 22 can also be formed from Kinematic Pair No. 40 shown in FIG. 40. The six circular rings become six regular hexagons.

The generating element of Embodiment 22 can also become a 6-RSS parallel mechanism. The double-output kinematic pair is substituted by Kinematic Pair No. 36 shown in FIG. 36.

(IV) Sliding Reflectively Symmetrical Type Multi-Platform Symmetrical Parallel Mechanisms Embodiments (Embodiments 23 and 24)

Embodiment 23

Figure 79:
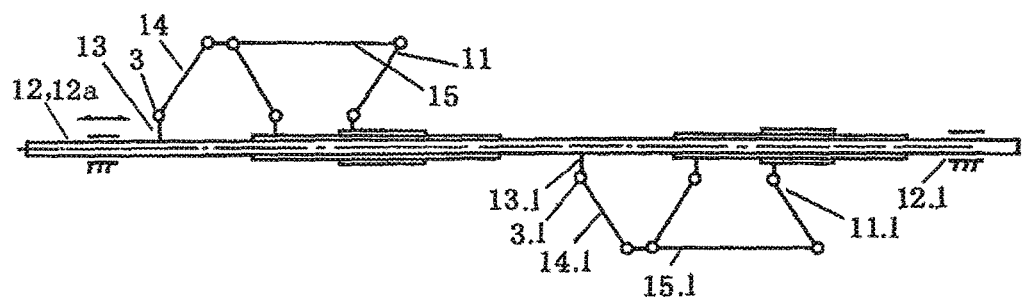

The fundamental parallel mechanism Embodiment 23 (FIG. 79) is a 3-PRR planar parallel mechanism which is the same as the fundamental parallel mechanism of Embodiment 13. Embodiment 23 is formed as a variant from Embodiment 13: the branch parallel mechanism at the right side in FIG. 70 undergoes a reflective symmetrical transformation, the branch parallel mechanism at the right side is moved to be under the axis, and the original branch parallel mechanism at the upper right side is removed. In this way, a slidingly reflectively symmetrical type multiple-movable-platform parallel robot is obtained. reference numerals can be understood with reference to Embodiment 13.

Embodiment 24

Figure 80:
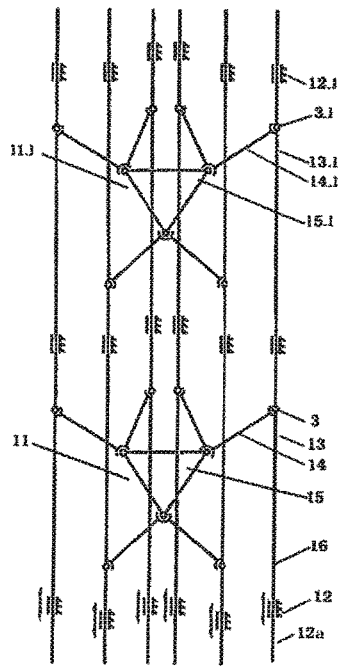

Embodiment 24 (FIG. 80): the fundamental parallel mechanism of Embodiment 24 is a 6-PSSspatial parallel mechanism. Embodiment 24 is formed as a variant from Embodiment 17 (with reference to FIG. 74): the middle branch parallel mechanism undergoes a reflectively symmetrical transformation, the middle branch parallel mechanism is moved to be above the fundamental base platform, the original branch parallel mechanism is removed, and the uppermost branch parallel mechanism 11.2 in the figure. In this way, a slidingly reflectively symmetrical type multiple-movable-platform parallel robot is obtained.

(V) Scaled Multiple-Movable-Platform Parallel Robot Embodiments (Embodiments 25-28)

Embodiment 25

Figure 81:
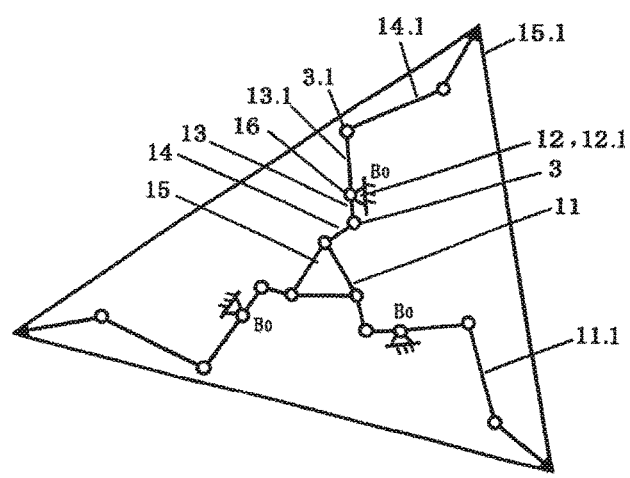

The fundamental parallel mechanism of Embodiment 25 (FIG. 81) is a 3-RRR (2T1R) planar parallel mechanism. The fundamental base platform 12 is a triangular base platform in the plane of the planar parallel mechanism, the main chain 13 is an RRR chain, the first revolute pair is an active pair 12a, the axes of three active pairs are perpendicular to the fundamental base platform plane, the active pair axis extends through the apex of the fundamental base platform triangle B0B0B0, and the fundamental movable platform 15 is a triangular movable platform. The triangle of the fundamental movable platform is a smaller one, and the fundamental base platform triangle is a larger one.

The first revolute pair comprises a double-output kinematic pair 16, which is a reflectively symmetrical type double-output kinematic pair (with reference to Kinematic Pair No. 5, FIG. 5). Two output ends are on a straight line and are reflectively symmetrical with each other. The inner one is a main output end 3, and the outer one is an auxiliary output end 3.1. The two output ends have different sizes (although they may alternatively have the same size). The inner smaller triangular movable platform is a fundamental movable platform 12, the outer larger triangular movable platform is a branch movable platform 15.1, and the branch movable platform has the largest triangle. The fundamental base platform 12 is equivalent symmetrical with the branch base platform 12.1.

In order to avoid structural interference, the fundamental base platform, the fundamental movable platform and the branch movable platform are disposed on three planes which are parallel with each other, with the fundamental base platform being located at a middle location and the fundamental movable platform and the branch movable platform being located at opposite sides. The fundamental movable platform is scaled symmetrical with the branch movable platform.

Embodiment 26

Figure 82:
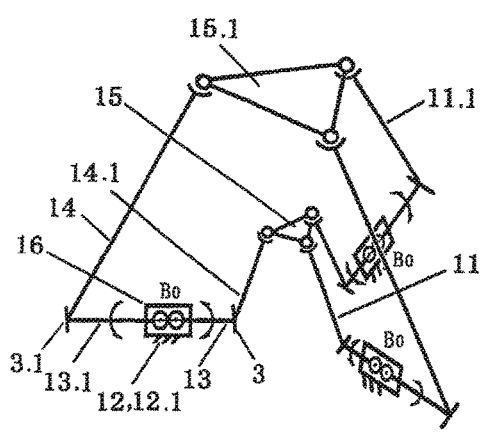

The fundamental parallel mechanism of Embodiment 26 (FIG. 82) is a 3-RRS (1T2R) spatial parallel mechanism. The fundamental base platform 12 is a triangular base platform, the main chain 13 is an RRS chain, the first revolute pair is an active pair, the axes of three active pairs are in the plane of the fundamental base platform B0B0B0, the axes of three active pairs are respectively parallel with the sides of the base platform triangle, the angle between the axes of three active pairs are 120 degrees, and the fundamental movable platform 12 is a triangular movable platform.

The multiple-output kinematic pair 16 is a reflectively symmetrical type sliding pair (with reference to Kinematic Pair No. 2, FIG. 2), with two output ends that are reflectively symmetrical with each other. The main output end 3 is at the inner side of the base platform triangle, and the auxiliary output end 3.1 is at the outer side of the fundamental base platform triangle. The fundamental base platform 12 is equivalent symmetrical with the branch base platform 12.1. The smaller triangular movable platform above the fundamental base platform plane is a fundamental movable platform 15, and the larger triangular movable platform above the fundamental base platform plane is a branch movable platform 15.1. The auxiliary branch chain is scaled symmetrical with the downstream main chain; the branch movable platform is scaled translationally symmetrical with the fundamental movable platform. The branch parallel mechanism is scaled translationally symmetrical with the fundamental parallel mechanism.

Embodiment 27

Figure 83:
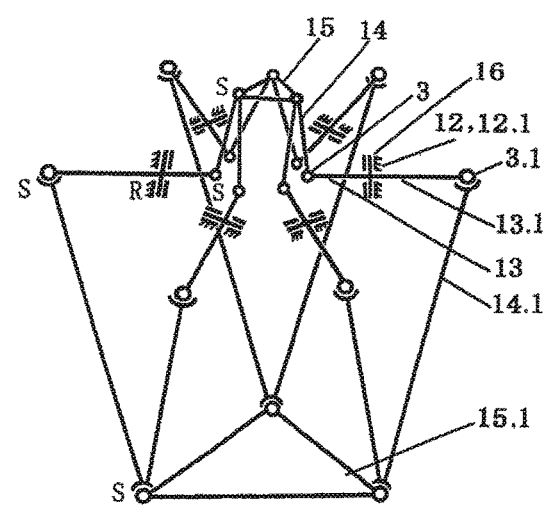

The fundamental parallel mechanism of Embodiment 27 (FIG. 83) is a 6-RSS (3T3R) spatial parallel mechanism. The fundamental base platform 12 is a planar regular-hexagonal base platform, the main chain 13 is an RSS chain, the first revolute pair is an active pair, the axes of the six active pairs are within the base platform plane, the axes of the six active pairs respectively coincide with the six sides of the base platform regular-hexagonal, and the fundamental movable platform 15 is a triangular movable platform.

The multiple-output kinematic pair 16 is a reflectively symmetrical type revolute pair (with reference to Kinematic Pair No. 5, FIG. 5), with two output ends that are on a straight line and are reflectively symmetrical with each other. The main output end 3 is at the inner side of the base platform hexagon, and the auxiliary output end 3.1 is at the outer side of the hexagon of the fundamental base platform 12. The two output ends have different sizes (although output ends having the same size may also form a scaled multiple-movable-platform parallel robot). The fundamental base platform 12 is equivalent symmetrical with the branch base platform 12.1. Six main output ends are respectively connected with six downstream main chains (SS chains). The smaller triangular movable platform above the fundamental base platform plane is a fundamental movable platform 15, and the downstream main chains are connected to a fundamental movable platform.

The branch parallel mechanism 11.1 is located below the fundamental base platform 12. The larger triangular movable platform below the plane of the fundamental base platform 15 is a branch movable platform 15.1. Six auxiliary output ends are respectively connected with six auxiliary branch chains (SS chains). The auxiliary branch chains 14.1 are connected to a branch movable platform 15.1. The auxiliary branch chains are scaled symmetrical with the downstream main chains; the branch movable platform 15.1 is scaled reflectively symmetrical with the fundamental movable platform 15.

At a home position, the main output ends and the auxiliary output ends are all within the base platform plane. The branch movable platform is scaled reflectively symmetrical with the fundamental movable platform, and the branch parallel mechanism is scaled reflectively symmetrical with the fundamental parallel mechanism.

Embodiment 28

The fundamental parallel mechanism of Embodiment 28 (FIG. 84) is a 3-PRS (1T2R) spatial parallel mechanism. The structure of it is similar to that of Embodiment 26. The difference between them is that they have different double-output kinematic pairs. Embodiment 26 uses Kinematic Pair No. 2, while Embodiment 28 uses Kinematic Pair No. 26. The fundamental base platform 12 is a triangular base platform (the black triangle of FIG. 84), the main chain 13 is a PRS chain, the sliding pair is an active pair 12a, the axes of three active pairs are within the base platform plane, the axes of three active pairs are arranged in Y-shape, the angle between the axes of three active pairs is 120 degrees, and the fundamental movable platform 12 is a triangular movable platform.

The multiple-output kinematic pair is a scaled translationally symmetrical type sliding pair (with reference to Kinematic Pair No. 26, FIG. 26), with two output ends that are scaled translational symmetrical with each other. For the sake of clear and simple expression, a straight line extending through two rectangles in this figure represents Kinematic Pair No. 26. Three main output ends are respectively located at three apexes of a regular triangle, and three auxiliary output ends are also respectively located at three apexes of a regular triangle. The auxiliary output end triangle is the largest one, the main output end triangle is next to it in size, and the fundamental base platform triangle is the smallest one. The three triangles are co-planar. The three main output ends 3 are respectively connected with three downstream main chains 14, and the three downstream main chains 14 are connected to a fundamental movable platform 15; the three auxiliary output ends 3.1 are respectively connected with three auxiliary branch chains 14.1, and the three branch chains 13.1 are connected to a branch movable platform 15.1. The auxiliary branch chains are scaled symmetrical with the downstream main chains; the fundamental base platform is equivalently symmetrical with the branch base platform. The smaller triangular movable platform above the fundamental base platform plane is a fundamental movable platform 15, and the larger triangular movable platform above the fundamental base platform plane is a branch movable platform 15.1. The branch movable platform is scaled translationally symmetrical with the fundamental movable platform. The branch parallel mechanism is scaled translationally symmetrical with the fundamental parallel mechanism.

(VI) Walking Parallel Robot Embodiments (Embodiments 29-31)

Embodiment 29

Embodiment 29 (FIG. 85.1, FIG. 85.2) is a double-sided walking parallel robot having a fixed returning ring. The robot comprises two reflectively symmetrical double-moving-platform parallel robots (one is called as Leg A, and the other one is called as Leg B) and one returning ring. Leg A 21.1 is a reflectively symmetrical with double-moving-platform parallel robot, and Leg B 21.2 is also a reflectively symmetrical with double-moving-platform parallel robot. Leg A and Leg B each have a fundamental parallel mechanism, and the two fundamental parallel mechanisms are each a 6-PSS parallel leg mechanism. Sliding pairs comprise an active pair and a double-output kinematic pair, and the main output end is reflectively symmetrical auxiliary output end. The double-output kinematic pair of Leg A is represented by 16.4, and the double-output kinematic pair of Leg B is represented by 16.5. The axes of the active pairs coincide with respective sides of the hexagon.

Two fundamental parallel mechanisms are located at the same side of the fundamental base platform plane. Since the two parallel mechanisms at the same side of the fundamental base platform are reflectively symmetrical with the two parallel mechanisms at the opposite side, only the two parallel leg mechanisms at the same side of the fundamental parallel mechanism will be described here for simplicity. Two parallel mechanisms located at the same side of the fundamental base platform form a walking parallel robot.

The fundamental base platform of Leg A is a smaller regular hexagon, and the fundamental base platform of Leg B is a larger regular hexagon. The two regular hexagons are on a plane and are concentric with each other. The sides of the two regular hexagons are parallel with each other. In FIG. 85.1, Leg A is inside the smaller regular hexagon 22.1, and Leg B is outside the larger regular hexagon 22.2. The two regular hexagons are fixedly connected with to each other at their apexes to form hip joints 23. The length of the side of the larger regular hexagon is the radius Rc of the hip joint.

The parallel leg mechanism A is larger, and parallel leg mechanism B is smaller, with the smaller one within the larger one (FIG. 85.1). The movable platforms each form a foot arch, and each movable platform foot arch is equipped with three toes. The three toes are respectively located at the apexes of the corresponding equilateral triangle. Of the fundamental movable platform Leg A is foot arch A, the foot arch A being smaller and forming an Y-shape convex foot arch 25.1 on which toes 26.1 are provided; the fundamental movable platform of Leg B is foot arch B, the foot arch B being larger are forming a ring-like expanded convex foot arch 25.2 on which toes 26.2 are formed. In this figure, Ra represents the radius of the circumscribed circle of the three toes 26.2 on the outer legs, Rb represents the radius of the circumscribed circle of the three toes 26.1 on the inner legs. Ra is larger than or equal to Rb.

Two branch parallel mechanisms are reflectively symmetrical with the fundamental parallel mechanism. The symmetrical plane is the base platform plane.

The returning ring 27 is mounted to the hip joint 23 via a link rod 28 (FIG. 85.2). The returning ring 27 and the hip joints 23 share the same center.

Two branch parallel mechanisms located at another side of the fundamental base platform have similar structures and are not described repetitively.

The radius of the returning ring has three sets of suggested data. For each group of data, the radius of the returning ring is larger than the radius of the hip joints. The double-sided walking parallel robot having a fixed returning ring is suitable to be used in the case where the height of the double-sided walking parallel robot is smaller.

The first set of data: the radius of the circumscribed circle of the toe triangle is 50 cm. When the foot arch extends to a longest position, the distance from the toe to the base platform plane is 30 cm, the minimum height of the whole double-sided robot is about 40 cm, and the radius of the returning ring is 63 cm. In various standing-by-side states, the walking robot can always return to its vertical upstanding state.

The second set of data: the radius of the circumscribed circle of the toe triangle is 50 cm. When the foot arch extends to a longest position, the distance from the toe to the base platform plane is 30 cm; if the radius of the returning ring is 63 cm, the walking robot can return to its vertical upstanding state even in the worst condition. For a configuration having a radius of the returning ring of 50 cm (minimum value), when the walking robot is standing-by-side, walking robot can return to its vertical upstanding state only if the parallel leg mechanism is shortened to a certain degree. Although the ability of returning to vertical upstanding state is relatively weak, the structure is more compact and flexible and the passing-through ability is relatively high.

The third set of data: the radius of the circumscribed circle of the toe triangle is 50 cm. When the foot arch extends to a longest position, the distance from the base platform plane to the toes is smaller than 26 cm, and the minimum height of the whole double-sided robot is about 36 cm; then, only the radius of the returning ring is set to be the minimum value of 50 cm, the walking robot can always return to its vertical upstanding state in various conditions. In the configuration having these dimensions, the structure is compact and flexible, the ability of returning to vertical upstanding state is relatively high, and the passing-through ability is relatively high.

For the double-sided walking parallel robot having the fixed returning ring, if the foot arch of the outer leg is in the form of a Y-shape convex foot arch, the mechanism will become more compact.

Embodiment 30

Embodiment 30 (FIG. 86, a partial view) is a double-sided walking parallel robot having an adjustable returning ring.

The returning ring is composed of three arched rods 29, opposite ends of each arched rod are formed with slots extending in the direction of the tangent line of the circle. The three arched rods are overlapped with each other. The base platform and the returning ring are connected by three CR serial mechanism 30. The cylinder pair of the CR serial mechanism 30 is connected to the hip joint 23, and the revolute pair is connected to slot in the arched rod 29; the revolute pair movably fits with slots in two neighboring arched rods so that the revolute pair is slidable in the slots in the arched rods; the three arched rods 29 are connected to form a circle. The structure of the returning ring can be seen from FIG. 86. In FIG. 86, for the sake of clarity, detailed structures of two legs are not shown, and two hexagonal are used for representing the hip joints and the parallel leg mechanisms.

When the cylinder pair of the CR serial mechanism extends to its largest length, the returning ring is in the form of a circle, and now the returning ring has two functions. First, when the walking parallel robot is in a standing-by-side state, the returning ring helps the walking parallel robot to return to a normal upstanding state (or a reversed state); second, when the walking parallel robot is in a standing-by-side state and cannot return to the normal upstanding state, the returning ring can be used as a rolling ring. When the cylinder pair of the CR serial mechanism extends to the shortest length, the returning ring is shrunk to become smaller, and now the walking robot has better passing-through ability.

Now a group of reference dimensions of the returning ring are given below: the radius of the circumscribed circle of the toe triangle is 50 cm. When the foot arch extends to a longest position, and the distance from the base platform plane to the toes is 40 cm, the maximum radius of the returning ring is 92 cm, so that in various conditions walking robot can always return to its vertical upstanding state. After the returning ring ix contracted, the minimum radius is about 53 cm. In the state of the minimum radius, the robot still has a certain degree of returning ability. That is, only when the parallel leg mechanism is the shortest one, the walking robot has the ability of returning to vertical upstanding state.

For a double-sided walking parallel robot having an adjustable returning ring, we suggest using it in a configuration that the overall height is larger. Since the returning ring has the ability of retracting, the passing-through ability and the returning ability can both be achieved. A walking parallel robot having a larger size can be manufactured, which is benefit to increasing walking speed and enlarging carrying space.

Embodiment 31

Embodiment 31: by slightly modifying Embodiment 30, Embodiment 31 is formed. In Embodiment 30, the CR serial mechanism connecting the returning ring and the hip joints is substituted by an RR serial mechanism. The axis of the revolute pair is perpendicular to the base platform plane. The revolute pair connected with the base platform is a driving pair, and the returning ring can be contracted by rotating the driving pair. Other aspects can be understood with reference to Embodiment 30.

(VII) Embodiments of a Symmetrical Double-Platform Parallel Robot Having Combined Downstream Chains (Embodiments 32-33)

Embodiment 32: the fundamental parallel mechanism of Embodiment 32 uses a 6-DOF parallel mechanism proposed by Ben-Horin as prototype. Ben-Horin's 6-DOF parallel mechanism has three chains, each chain being composed of a planar 2-DOF dolly and an SR chain which are connected in series. In the present disclosure, the planar 2-DOF dolly is substituted by a 2-translational-DOF planar parallel mechanism. For example, the 2-DOF dolly is substituted by (2-RR>R) (">" represents that two chains are combined into one chain). The planar parallel mechanism substituting the 2-DOF dolly is called as a 2-DOF planar mechanism. In the present embodiment, the planar 2-DOF dolly is substituted by (2-RR>R). A (2-RR>R) chain is on the base platform plane, and all the axes of the revolute pairs are perpendicular to the base platform plane. Thus, there are six chains connected with the base platform. The third revolute pair on the chain comprises a double-output kinematic pair. Two neighboring main chains share one double-output kinematic pair, and their two downstream main chains are combined into one downstream main chain. The SR chains remain unchanged. The modified Ben-Horn parallel mechanism has six main chains and still three downstream chains, and thus we call it as a new Ben-Horin parallel mechanism. The new Ben-Horin parallel mechanism meets the requirements of certain embodiments of the present application to the fundamental parallel mechanism. Thus, it can be used as a generating element in the present embodiment.

Embodiment 32

Embodiment 32 (FIG. 87) shows a symmetrical double-platform parallel robot having combined downstream chains. A single main chain can be represented as an RRRSR chain, and the third revolute pair comprises a double-output kinematic pair. Two neighboring main chains share one double-output kinematic pair 31, and the two neighboring main chains and the branch chains form structure of (2-RR>R<2-SR) (">" represents that two front chains are connected to one kinematic pair; "<" represents that the front kinematic pair has two output ends which are connected with two downstream chains). The two neighboring main chains which share one double-output kinematic pair 31 are called as combined double chains.

The fundamental base platform is in the form of a ring or a hexagon, with three planar parallel mechanisms (2-RR>R) being mounted to the base platform B1 or being parallel with the base platform plane.

Three planar parallel mechanisms (2-RR>R) are distributed inside the hexagon. The double-output kinematic pair is on the inner side of the hexagon. An upper end of the double-output kinematic pair is a main output end 32 connected to the downstream main chain 33 (SR), and the lower end of the double-output kinematic pair is an auxiliary output end 32.1 connected to an auxiliary branch main chain 33.1 (SR). Three downstream main chains SR on the upper ends are connected to the fundamental movable platform 15, and three auxiliary branch chains SS on the lower ends are connected to the branch movable platform 15.1. The branch movable platform 15.1 is reflectively symmetrical with the fundamental movable platform 15. The branch parallel mechanism is reflectively symmetrical with the fundamental parallel mechanism.

Embodiment 33

Embodiment 33 (FIG. 88): Embodiment 33 is a double-sided walking parallel robot embodiment with combined downstream chains. Embodiment 33 is formed by slightly modifying two robots of Embodiment 32. The hexagon of the fundamental base platform of Embodiment 32 is modified to a regular hexagon. The upstream portions of original chains are on the inner side of the fundamental base platform hexagon; in the present embodiment, the upstream portions of the chains are all modified as located on the outer side of the hexagon of the fundamental base platform. The original first kinematic pair is mounted to the apex of the hexagon; in the present embodiment, it is modified to be mounted to the sides of the hexagon. Three double chains of the same symmetrical double-platform parallel robot are combined and mounted to three sides of the regular hexagon which are not neighboring to each other. Three double chains of the other symmetrical double-platform parallel robot are combined and mounted to the other three sides of the regular hexagon which are not neighboring to each other. The moving platform is modified as a foot arch structure. In this way, a double-sided walking parallel robot with combined downstream chains is formed. This embodiment will be additionally described with reference to the figure.

FIG. 88 is a top view of Embodiment 33. The regular hexagon in the middle part of the figure are four common base platforms, which are hip joints 23 in the present embodiment. Each side is mounted with a set of combined chains, three chains which are not neighboring to each other are combined to form a symmetrical double-moving-platform parallel robot.

The axes of three front revolute pairs of three combined double chains of the same parallel leg mechanism are perpendicular to the base platform plane. Six combined double chains are located on the outer side of the regular hexagon. The third revolute pair comprises a double-output kinematic pair. Two neighboring chains of Leg A share a double-output kinematic pair 31*a*, and two neighboring chains of Leg B share a double-output kinematic pair 31*b*. The downstream main chains are SR chains, Two fundamental parallel mechanisms have six double-output kinematic pairs 31*a*, 31*b*, each occupying a 60 degree sector area, so that their working spaces are not interfered with each other (the circles of dashed lines in the figure). In order to increase the working spaces of the double-output kinematic pairs, two neighboring planar parallel mechanisms (2-RR>R) may be provided on two parallel planes, so that the projections of the neighboring second revolute pairs of two sets of different combined chains on the base platform plane have an overlapped area, but the working of two neighboring planar parallel mechanisms is not affected.

The movable platform (foot arch A) of the fundamental parallel mechanism A is a Y-shaped convex foot arch 25.1. The movable platform (foot arch B) of the fundamental parallel mechanism B is also a Y-shaped convex foot arch 25.2. The two foot arches are connected with respective output ends via corresponding auxiliary branch chains (the downstream main chains). The projections of the two foot arches on the base platform plane are offset from each other by 60 degrees; in addition, foot arch A is relatively high, and foot arch B is relatively low, so that they are not interfered with each other.

According to this solution, the space occupied by the upstream portions (RRR) of the chains in the base platform plane is a surface (theoretically having no volume), the interference area is small and it is easy to design their layout. The number of downstream portions (SR) of the chains is decreased by half, and the interference space is decreased accordingly. For example, above the fundamental base platform of Embodiment 29, there are 12 auxiliary branch chains, each branch chain having its interference space, so the space available for accommodating and arranging equipment is occupied. On the contrary, above the fundamental base platform of the present embodiment, there are only 6 auxiliary branch chains, so that interference space of six branch chains is released to be free, and thus the space available for accommodating and arranging equipment is increased. This is benefit to increasing the step length and accommodating space and reducing the structure size.

If the present embodiment is mounted with a returning ring, the radius of the returning ring shall be large enough for encircling the area indicated by the dashed lines. In Embodiment 33, it is also possible to mount generalized sliding pairs on the toes.

The invention claimed is:

1. A method of construction a multiple-movable-platform parallel robot, characterized in that:
the parallel robot is composed of a fundamental parallel mechanism and N1 (N1≥1) branch parallel mechanism (s), each parallel mechanism having the same N2 (2≤N2≤6) degrees-of-freedom (DOFs) and the same DOF property;
the fundamental parallel mechanism comprises a fundamental base platform, a fundamental movable platform and N2 (2≤N2≤6) main chains connecting the fundamental base platform with the fundamental movable platform, each main chain being composed of two or more generalized kinematic pairs which are connected in series;
the branch parallel mechanism comprises a branch base platform, a branch movable platform and N2 (2≤N2≤6) branch chains connecting the branch base platform with the branch movable platform; the method comprising the steps of:
(1) constructing the fundamental parallel mechanism:
wherein the fundamental parallel mechanism meets the following five requirements: (a) the fundamental base platform is a planar base platform; (b) a first generalized kinematic pair in each main chain is an active pair; each main chain has only one active pair; an input end of the first kinematic pair of the main chain is a revolute pair or a sliding pair; (c) the input end axes of the first generalized kinematic pairs are arranged in one or two or three orientations of: being parallel to the plane of the base platform, lying in the base platform plane, or being perpendicular to the base platform plane; (d) in two or three preceding generalized kinematic pairs of the main chain, at least one generalized kinematic pair is an expandable output kinematic pair; (e) the fundamental movable platform is located at one side of the plane of the fundamental base platform or is co-planar with the fundamental base platform plane; in the main chain, a portion for connecting the expandable output kinematic pair with the fundamental movable platform is called as downstream main chain;

(2) constructing the branch parallel mechanism(s):
  a) selecting and constructing a multiple-output kinematic pair and constructing the branch base platform:
    in each main chain of the fundamental parallel mechanism, selecting an expandable kinematic pair, the expandable kinematic pair being also called as boundary kinematic pair; to this expandable kinematic pair, adding an output end which is called as an auxiliary output end, the original output end being called as main output end; totally N1 auxiliary output ends being added, the auxiliary output ends having the same function and symmetrical structure with the main output end; the symmetricity includes equivalent symmetricity, translational symmetricity, rotational symmetricity, reflective symmetricity, slidingly reflective symmetricity, as well as scaled symmetricity;
    the expandable kinematic pair becomes a multiple-output kinematic pair which has one more output end than the original generalized kinematic pair; in the branch chain, a portion for connecting the boundary generalized kinematic pair with the branch movable platform is called as downstream branch chain; the downstream branch chain is also called as auxiliary branch chain;
    a lower end point of the branch chain is a hinge point between the branch chain and the branch base platform; the hinge points of the N2 branch chains form the branch base platform; the branch base platform has the same, similar or substantially the same shape with the fundamental base platform; the symmetricity includes equivalent symmetricity, translational symmetricity, rotational symmetricity, reflective symmetricity, slidingly reflective symmetricity, as well as scaled symmetricity;
  b) constructing the auxiliary branch chains:
    to each newly added auxiliary output end, connecting an auxiliary branch chain or an auxiliary branch rod element (the auxiliary branch chain and the auxiliary branch rod element will both be called as auxiliary branch chain below); the downstream main chain in this auxiliary branch chain is the same or substantially the same with that of the main chain; all the auxiliary branch chains form a group of N2 auxiliary branch chains; the auxiliary branch chain is symmetrical with the downstream main chain; the symmetricity includes translational symmetricity, rotational symmetricity, reflective symmetricity, slidingly reflective symmetricity, as well as scaled symmetricity;
  c) connecting the branch movable platform:
    to an tip end of each one of the group of the auxiliary branch chains, a branch movable platform is connected, the branch movable platform has the same, similar or substantially the same shape with the fundamental movable platform, and the branch movable platform is symmetrical with the fundamental movable platform; in this way, a branch parallel mechanism symmetrical with the fundamental parallel mechanism is formed; the symmetricity between the branch movable platform and the fundamental movable platform includes translational symmetricity, rotational symmetricity, reflective symmetricity, slidingly reflective symmetricity, as well as scaled symmetricity;
(3) repeating substeps a), b) and c) of step (2); in this way, one more new symmetrical branch movable platform is obtained, and one more new symmetrical branch parallel mechanism is also obtained; repeating the above operation by N1-1 times; in this way, N1 new symmetrical branch movable platforms and N1 new symmetrical branch parallel mechanisms are obtained.

2. A multiple-movable-platform parallel robot in which the method of claim 1 is effected, the parallel robot comprising a fundamental parallel mechanism (11) and N1 (N1≥1) branch parallel mechanisms, each parallel mechanism having the same N2 (2≤N2≤6) DOFs and the same DOF property;
(1) the fundamental parallel mechanism has the following structure:
  the fundamental parallel mechanism comprises a fundamental base platform, a fundamental movable platform and N2 (2≤N2≤6) main chains connecting the fundamental base platform with the fundamental movable platform, each main chain being composed of two or more generalized kinematic pairs which are connected in series;
  the fundamental parallel mechanism meets the following five requirements:
    (a) the fundamental base platform is a planar base platform;
    (b) a first generalized kinematic pair in each main chain is an active pair; each main chain has only one active pair; an input end of the first kinematic pair of the main chain is a revolute pair or a sliding pair;
    (c) the input end axes of the first generalized kinematic pairs are arranged in one or two or three orientations of: being parallel to the plane of the base platform, lying in the base platform plane, or being perpendicular to the base platform plane;
    (d) in two or three preceding generalized kinematic pairs of the main chain, at least one generalized kinematic pair is an expandable output kinematic pair; the expandable output kinematic pair has (N1+1)*N2 output ends, in which there are N2 main output ends, the main output ends are located on the main chain, and the remaining (N1*N2) output ends are called as auxiliary output ends; the main output end is symmetrical in structure with the auxiliary output end and has the same function, and the expandable kinematic pair is also called as boundary kinematic pair or symmetrical multiple-output kinematic pair; the main chain is divided into two portions by the boundary kinematic pair, in which a portion between the main output end of the boundary kinematic pair and the fundamental movable platform is called as downstream main chain; the main output end is symmetrical auxiliary output end; the symmetricity includes equivalent symmetricity, translational symmetricity, rotational symmetricity, reflective symmetricity, slidingly reflective symmetricity, as well as scaled symmetricity;

(e) N2 downstream main chains are connected to the fundamental movable platform, and the fundamental movable platform is located at one side of the plane of the fundamental base platform or is co-planar with the fundamental base platform plane;

(2) the branch parallel mechanisms each have the following structure:

the branch parallel mechanism comprises a branch base platform, a branch movable platform and N2*N1 branch chains connecting the branch base platform with the branch movable platform; the branch parallel mechanism has the following characteristics in structure:

(a) in the expandable output kinematic pair of the main chain, each auxiliary output end is connected with an auxiliary branch chain; a portion between the auxiliary output end of the boundary kinematic pair and the branch movable platform is called as downstream branch chain; the downstream branch chain portion is also called as auxiliary branch chain; the auxiliary branch chain is the same or substantially the same with the downstream main chain of the main chain; their structures are symmetrical, and the symmetricity includes translational symmetricity, rotational symmetricity, reflective symmetricity, slidingly reflective symmetricity, as well as scaled symmetricity;

(b) a lower end point of the branch chain is a hinge point between a branch chain and the branch base platform, called as branch lower-end hinge point; the branch lower-end hinge points of a group of N2 branch chains having the same symmetrical characteristics form a branch base platform; there are totally N1 branch base platforms; the branch base platform is symmetrical with the fundamental base platform, and the symmetricity includes equivalent symmetricity, translational symmetricity, rotational symmetricity, reflective symmetricity, slidingly reflective symmetricity, as well as scaled symmetricity;

(c) the auxiliary branch chains having the same symmetrical characteristics form a group of auxiliary branch chains, and each group of auxiliary branch chains include N2 auxiliary branch chains; there are totally N1 groups of branch chains;

(d) each group of auxiliary branch chains are connected to a movable platform to form a parallel mechanism, the movable platform being called as branch movable platform (15.1), and the parallel mechanism being called as branch parallel mechanism; N1 groups of auxiliary branch chains are connected to N1 branch movable platforms; the branch movable platform is the same, similar or substantially the same with the fundamental movable platform; the branch movable platform is symmetrical with the fundamental movable platform; there are N1 branch movable platforms, and there are also N1 branch parallel mechanisms; the branch parallel mechanism is also symmetrical with the fundamental parallel mechanism; the symmetricity between the branch movable platform and the fundamental movable platform includes translational symmetricity, rotational symmetricity, reflective symmetricity, slidingly reflective symmetricity, as well as scaled symmetricity; the symmetricity between the branch parallel mechanism and the fundamental parallel mechanism also includes translational symmetricity, rotational symmetricity, reflective symmetricity, slidingly reflective symmetricity, as well as scaled symmetricity.

3. The multiple-movable-platform parallel robot of claim 2, characterized in that:

the input end axes of the active pairs are within the base platform plane, and at least three axes intersect at one point.

4. The multiple-movable-platform parallel robot of claim 2, characterized in that:

the input end axes of the active pairs are within the base platform plane, and the axes are tangent lines of the same circle or ellipse, or are tangent lines of two concentric circles on the same plane.

5. The multiple-movable-platform parallel robot of claim 2, characterized in that:

the input end axes of the active pairs are parallel to or lie in the base platform plane and are parallel or coincide with each other.

6. The multiple-movable-platform parallel robot of claim 2, characterized in that:

all the input end axes of the active pairs are perpendicular to the base platform plane.

7. The multiple-movable-platform parallel robot of any one of claim 2, characterized in that:

each movable platform is mounted with a manipulator.

8. A parallel machine tool robot, comprising a symmetrical multi-platform parallel robot of any one of claim 2, characterized in that:

a detecting sensor or probe is mounted on one of the movable platforms, and a manipulator is mounted on each of the other movable platforms.

9. The multiple-movable-platform parallel robot of any one of claim 2, characterized in that:

the multiple-movable-platform parallel robot is a symmetrical double-moving-platform parallel mechanism, the pair of the fundamental movable platform and the branch movable platform and/or the pair of the main output end and the auxiliary output end are scaled symmetrical with each other, and the branch chain is the same or substantially the same with the main chain.

10. The multiple-movable-platform parallel robot of claim 2, characterized in that:

the multiple-movable-platform parallel robot is a double-moving-platform parallel robot, the input end axes of the active pairs are within the base platform plane, and the axes are tangent lines of the same circle or coincide with the radius of the circle, or are tangent lines of two concentric circles on the same plane or coincide with the radii of the circles; the multiple-output kinematic pair comprises a double-output kinematic pair; all the main output ends are at the inner side of the circle or ellipse, and all the auxiliary output ends are at the outer side of the circle or ellipse; the auxiliary branch chain is the same or substantially the same with the downstream main chain; the fundamental movable platform is scaled symmetrical with the branch movable platform scaled symmetrical.

11. The multiple-movable-platform parallel robot of claim 2, characterized in that:
the fundamental parallel mechanism is a low-DOF parallel mechanism; the fundamental parallel mechanism comprises, in addition to the main chain, a redundant chain connecting the fundamental base platform with the branch base platform; the redundant chains is a passive chain; the number of DOF of the redundant chain is more than or equal to two, and is less than six; the main chain is an unrestraint 6-DOF chain.

12. A double-sided walking parallel robot, characterized in that:
it comprises two multiple-movable-platform parallel robots of claim 2; the fundamental parallel mechanism of each multiple-movable-platform parallel robot is a parallel leg mechanism; each multiple-movable-platform parallel robot comprises a fundamental parallel mechanism and a branch parallel mechanism, the fundamental parallel mechanism being reflectively symmetrical with the branch parallel mechanism; one multiple-movable-platform parallel robot is called as Leg A, and the other is called as Leg B; the fundamental parallel mechanism of Leg A and the fundamental parallel mechanism of Leg B or the branch parallel mechanism of Leg B are located at the same side to form a single-sided parallel walking robot; the branch parallel mechanism of Leg A and another parallel mechanism of Leg B are located at another side to form another single-sided parallel walking robot; the fundamental base platforms of Leg A and Leg B are located in a plane, and the two fundamental base platforms are fixedly connected to each other form a hip joint; all the four movable platforms are of a foot arch structure; the fundamental parallel mechanism of Leg A is composed of the fundamental base platform of Leg A, the main chain of Leg A and the fundamental movable platform foot arch of Leg A; and the fundamental parallel mechanism of Leg B is composed of the fundamental base platform of Leg B, the main chain of Leg B and the fundamental movable platform foot arch of Leg B;
the two parallel leg mechanisms are arranged in one of the following ways:
(1) one of the two multiple-movable-platform parallel robots at the left side, and the other one at the right side;
(2) one of the two multiple-movable-platform parallel robots is larger, and the other one is smaller, the smaller one being within the larger one; two movable platforms foot arches located at the same side of the fundamental base platform have different sizes or have different heights or have different sizes and heights;
(3) the two multiple-movable-platform parallel robots are disposed in a cross manner; two movable platforms foot arches located at the same side of the fundamental base platform have different sizes or have different heights or have different sizes and heights.

13. The double-sided walking parallel robot of claim 12, characterized in that:
the smaller one of the two double-moving-platform parallel robots is within the larger one; two movable platforms foot arches located at the same side of the fundamental base platform have different sizes or have different heights or have different sizes and heights;
the hip joints on the base platform plane are provided with a returning ring which is larger than base platform; the returning ring is in the form of a circular ring, for connecting link rods with the hip joints together; the returning ring and the hip joints share the same center; the radius of the returning ring is larger than L/cos θ, and the radius of the returning ring is not smaller than the larger one of the radius of the circumscribed circle of the toes and the radius of the circumscribed circle of the hip joints;
wherein in the expression L/cos θ, L is the distance from the mid-point between two neighboring toes to the center of the fundamental base platform, the mid-point between two neighboring toes being call in a simplified way as mid-point of toes; and
when drawing a connecting line from the mid-point of toes to the center of the fundamental base platform, θ is the angle between a connecting line and the fundamental base platform plane.

14. The double-sided walking parallel robot of claim 13, characterized in that:
the returning ring is substituted by N3 (N3≥2) segments of arched rods; opposite ends of each arched rod is formed with a slot, the slot extending in the direction of a tangent line of the returning ring; neighboring arched rods are overlapping with each other; the N3 arched rods form the returning ring; the rod elements for connecting the hip joints with the arched rods are substituted by N3 contracted mechanisms; each contracted mechanism is one of the following serial mechanisms: PR mechanism (the axis of the revolute pair is perpendicular to the axis of the sliding pair), CR mechanism (the axis of the revolute pair is perpendicular to the axis of the cylinder pair), HR mechanism (the axis of the revolute pair is perpendicular to the axis of the helical pair), RR mechanism (axes of the two revolute pairs are parallel with each other), RRR mechanism (the axes of the three revolute pairs are parallel with each other); from one or more of above mechanisms, N3 serial mechanisms are selected as a group of contracted mechanisms; the axes of the revolute pairs of the contracted mechanism are perpendicular to base platform plane; one end of each revolute pair of the contracted mechanism movably fits with slots in two neighboring arched rods so that the revolute pair is slidable in the slots, and the other end of the revolute pair is connected with a hip joint.

15. The double-sided walking parallel robot of claim 12, characterized in that:
in each foot arch of the movable platform, at least one toe is mounted with a generalized sliding pair which has an axis perpendicular to the base platform plane.

16. The multiple-movable-platform parallel robot of claim 2, characterized in that:
it comprises only one branch parallel mechanism; the branch parallel mechanism is reflectively symmetrical with the fundamental parallel mechanism; the number of the main chains is at least three to at most seven; the third generalized kinematic pair of the main chain comprises a double-output kinematic pair; the output ends of the double-output kinematic pair are reflectively symmetrical with each other; at least one pair of neighboring main chains share a double-output kinematic pair, with the original two downstream main chains being combined into a downstream main chain and then being connected with the fundamental movable platform, and the original two auxiliary branch chains being combined into an auxiliary branch chain and then being connected with the branch movable platform; the branch parallel mechanism is reflectively symmetrical with the fundamental parallel mechanism.

17. A double-sided walking parallel robot, characterized in that:
   it comprises two multiple-movable-platform parallel robots of claim 16; the fundamental parallel mechanisms of two multiple-movable-platform parallel robot are each a parallel leg mechanism; the two fundamental base platforms are arranged on a plane and are fixedly connected with each other; the projections of the double-output kinematic pairs of the two multiple-movable-platform parallel robots onto the base platform plane are located in different sector spaces; the movable platform has a foot arch structure; the foot arch is provided with toes; two movable platforms foot arches located at the same side of the fundamental base platform plane have different sizes or have different heights or have different sizes and heights.

* * * * *